United States Patent [19]
Sandow

[11] Patent Number: 5,909,220
[45] Date of Patent: Jun. 1, 1999

[54] INTERACTIVE COMPUTERIZED IMAGE COLORING SYSTEMS AND METHODS FOR PROCESSING COMBINATIONS OF COLOR WITH AUTOMATED SUBROUTINES AND COLOR STANDARDIZATION FOR DIVERSE COLOR SYSTEMS

[76] Inventor: Robin Sandow, 20164 Charest St., Detroit, Mich. 48234

[21] Appl. No.: 08/567,106

[22] Filed: Dec. 4, 1995

Related U.S. Application Data

[63] Continuation-in-part of application No. 08/302,098, Sep. 7, 1994, Pat. No. 5,473,738, which is a continuation of application No. 08/059,068, May 10, 1993, abandoned.

[51] Int. Cl.⁶ .............................. G06T 11/40; G06T 11/80
[52] U.S. Cl. ........................................... 345/431; 358/518
[58] Field of Search ........................... 395/131; 358/518, 358/520, 523, 524

[56] References Cited

U.S. PATENT DOCUMENTS

| | | | |
|---|---|---|---|
| 4,972,257 | 11/1990 | Birnbaum et al. | 395/520 |
| 5,103,407 | 4/1992 | Gabor | 395/131 |
| 5,233,684 | 8/1993 | Ulichney | 395/131 |
| 5,317,678 | 5/1994 | Osawara et al. | 395/126 |
| 5,334,992 | 8/1994 | Rochat et al. | 345/22 |
| 5,461,493 | 10/1995 | Venable | 358/520 |
| 5,463,480 | 10/1995 | MacDonald et al. | 395/520 |
| 5,473,738 | 12/1995 | Hamlin et al. | 395/131 |
| 5,528,261 | 6/1996 | Holt et al. | 345/150 |
| 5,615,320 | 3/1997 | Lavendel | 395/131 |
| 5,630,038 | 5/1997 | Itoh et al. | 395/131 |

OTHER PUBLICATIONS

Grotta et al., Digital Imaging for Visual Artists, Windcrest/McGraw–Hill, pp. 420–421, 1994.
Ostwald, Colour Science, Winsor & Newton Limited, Plates 1–4, 1931.

*Primary Examiner*—Almis R. Jankus
*Assistant Examiner*—Jae-Hee Choi
*Attorney, Agent, or Firm*—Laurence R. Brown

[57] ABSTRACT

This invention provides improved automated methods and systems for color processing on personal computers whereby an interactive user may intervene to introduce creative and selective choices. Various automatic coloring procedures process coloring. Visual color reproduction is standardized for visual image reproduction using a color gamut matching that of a computer monitor. The color artist may exchange groups of colors automatically en masse. For example, several colors of an image may be changed simultaneously by rotation of hues about a color wheel icon. The system has a novel operating system enriched by abstract notational format and visual shorthand icons. About 600 standardized sample colors proportioned across different color gamuts comprise color standard collections storing recipes for permitting faithful colored image viewing and reproduction of the sample colors on different output devices. Substantially any color can be reproduced in a color gamut spectrum by extending the available hues and color samples available within a basic framework of color sample niches. Abstract visual icon patterns of color groupings enhance the artist's color visualization, intuition and creativity automated coloring procedures. Both stored video image snapshots and abstract color groupings are viewable for automatic interactive adoption in color images. Thus, an artist friendly automated color change engine is provided for expediting creative coloring.

44 Claims, 40 Drawing Sheets

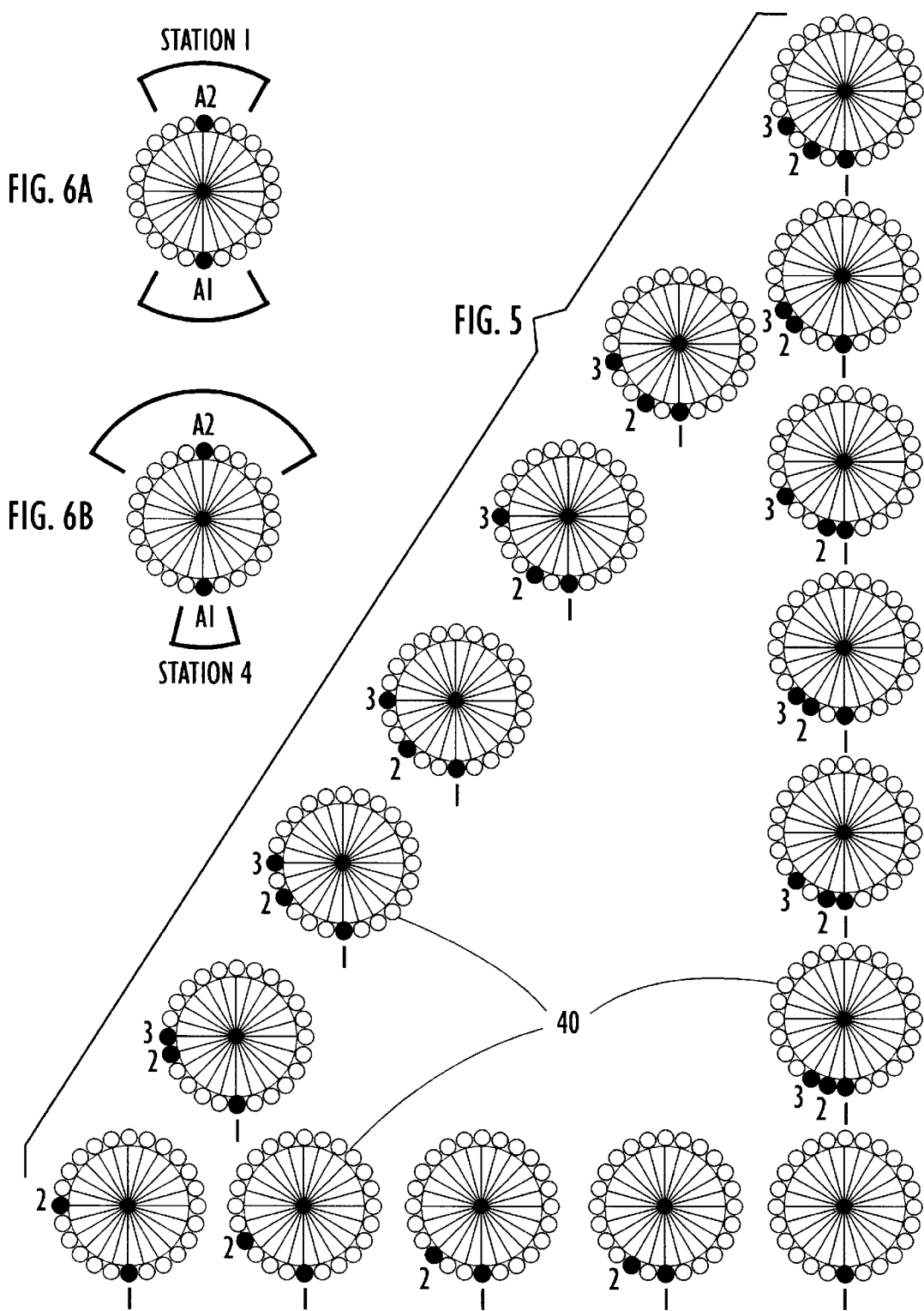

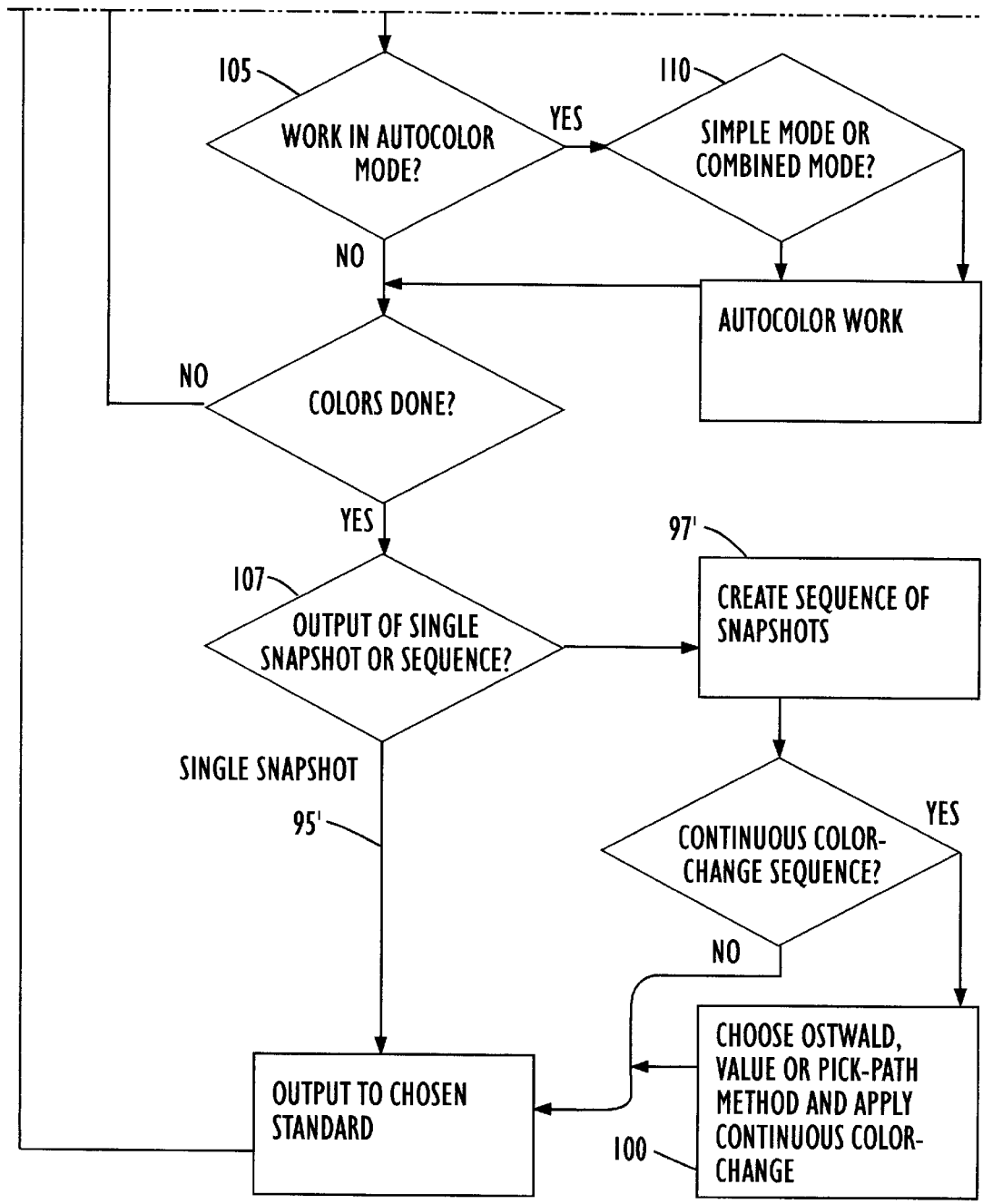
FIG. 16"

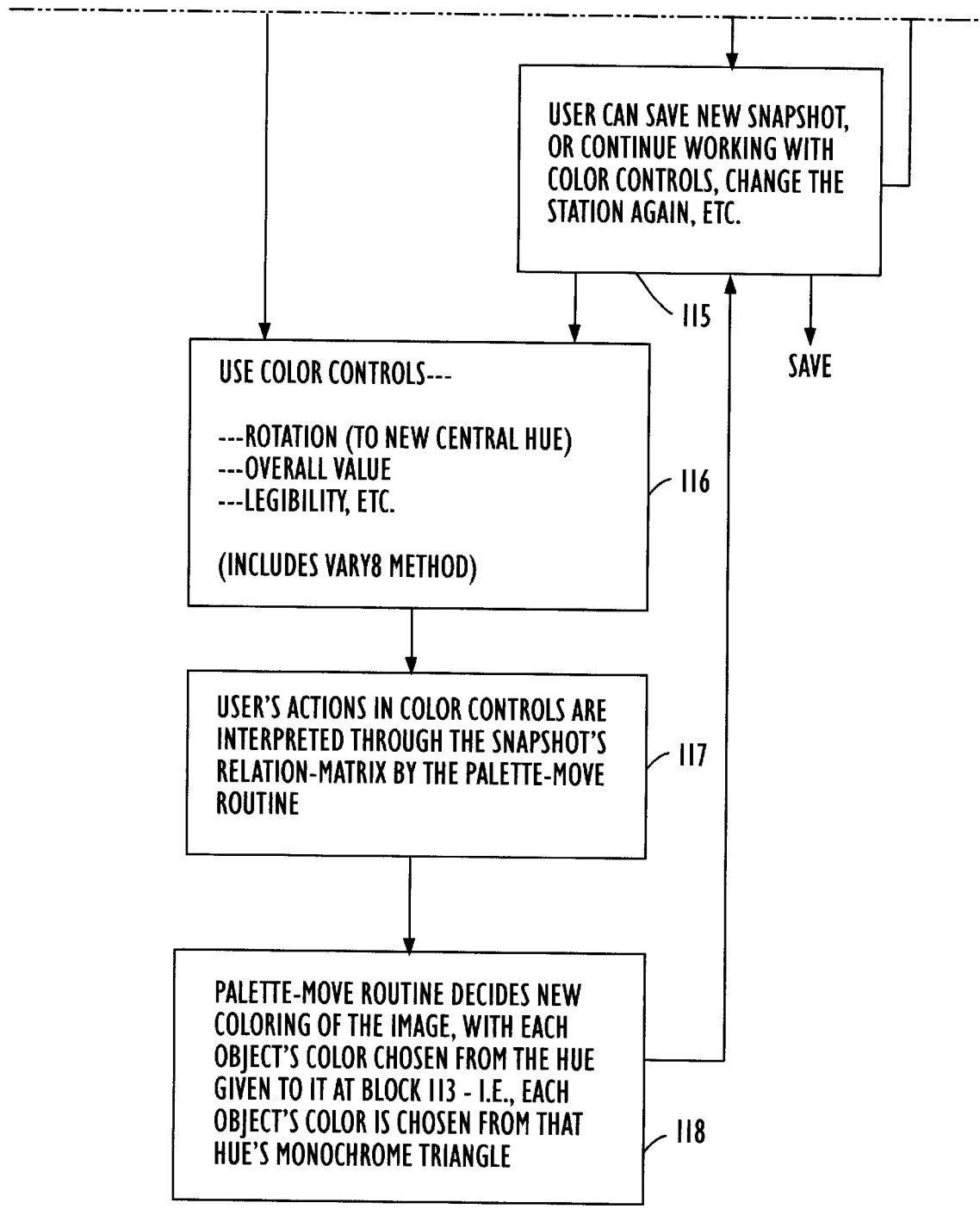
FIG. 17"

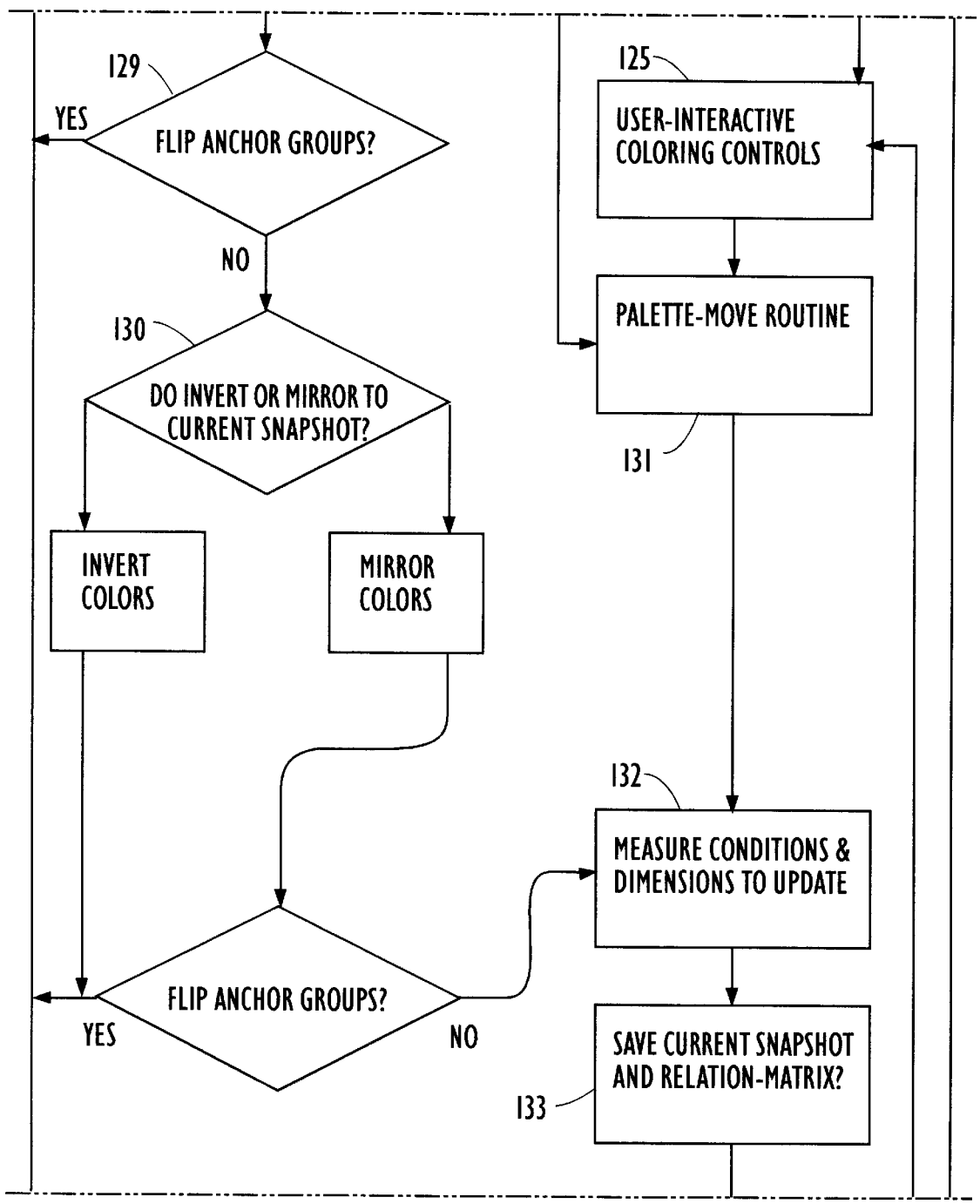
FIG. 18"

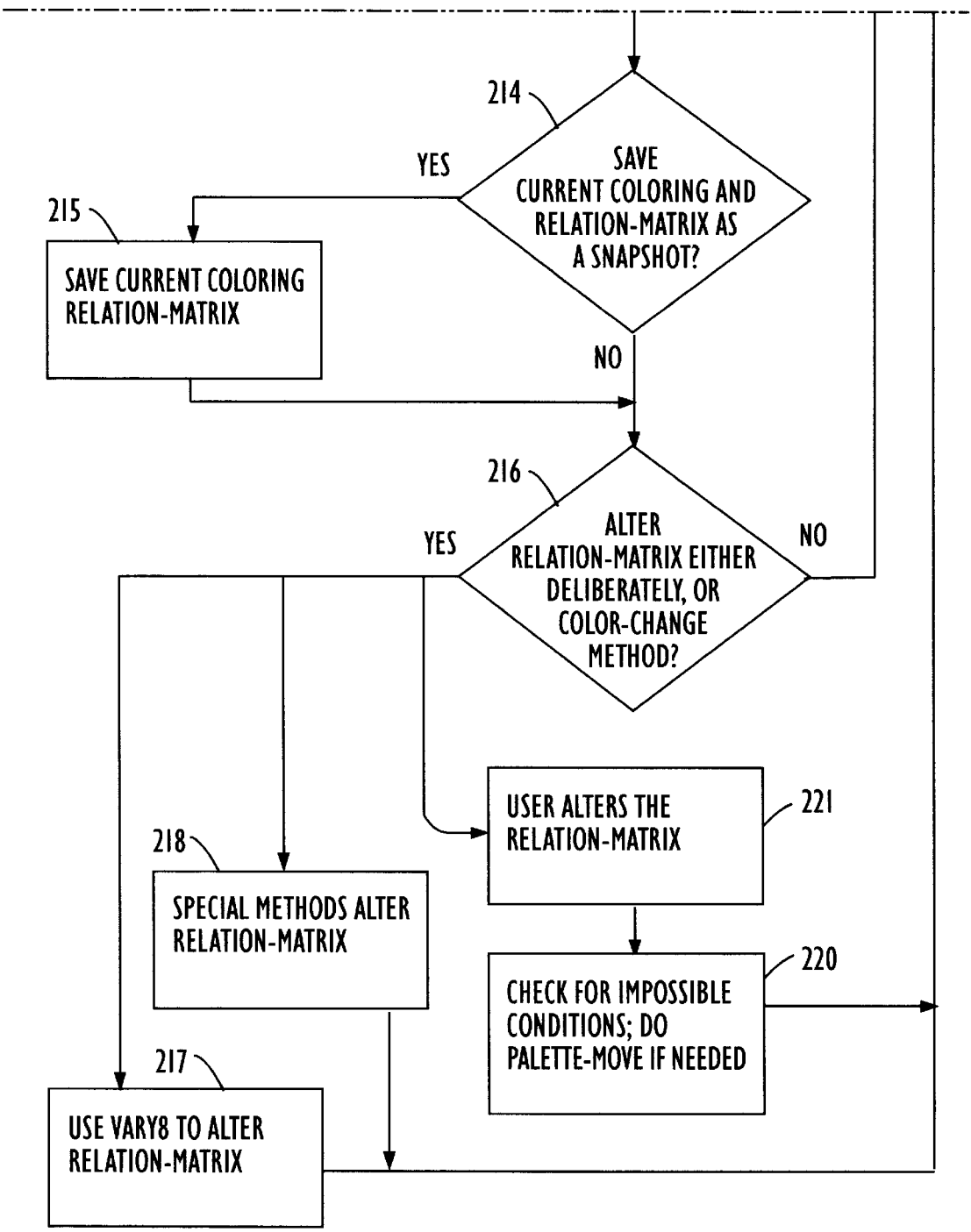
FIG. 21"

NAMES & BASIC FACTS

GRAPHIC CATEGORY:
ILLUSTRATION

IMAGE ELEMENTS (OBJECT NAMES)
STANDARD SET NAMES ☐  USER NAMES ☒
LIST BY ANCHOR GROUPS ☒  BY STANDARD SET NAMES ☐

HUE HARMONY

| ANCHOR GROUP 2 | ANCHOR GROUP 3 |
|---|---|
| 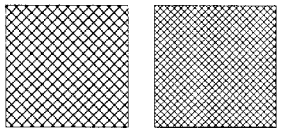 | 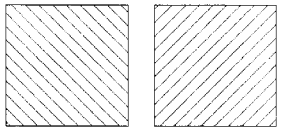 |
| 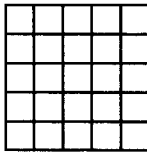 | 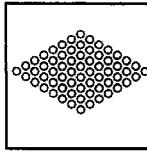 |
| ANCHOR GROUP 1 | ANCHOR GROUP 4 |

ANCHOR GROUP 1
- MOON-FACE
- $1 LETTERING
- ALL THE STARS
- MOONBEAM MOVIES LETTERING

ANCHOR GROUP 2
- STELLAR LETTERING
- MAIN BACKPANEL
- DARK SIDE OF MOON
- MOONBEAM MOVIES SHADOWING
- 3 SHOWS LETTERING

ANCHOR GROUP 3
- TOP PANEL
- BAR #1
- BAR #2
- BAR #3
- PAIR OF DIAMONDS

ANCHOR GROUP 4

LEGIBILITY & CONTRASTS

CHOOSE RELATION TYPE: FOCUS, LEGIBILITY, CONTRAST OR ALL

ALL ▽

STANDARD SET NAMES ☐    USER NAMES ☒

FOCUS

| FOCAL OBJECT | BACKGROUND |
|---|---|
| MOON-FACE | DARK SIDE OF MOON |

LEGIBILITY

| LETTERING | BACKGROUND | CONTROL OR GAUGE? |
|---|---|---|
| $1 LETTERING | DARK SIDE OF MOON | C |
| MOONBEAM MOVIES LETTERING | MAIN BACKPANEL | G |
| STELLAR LETTERING | TOP PANEL ▽ | G |

CONTRAST-DISTINCT

| ADVANCE | RECEDE | |
|---|---|---|
| PAIR OF DIAMONDS | MAIN BACKPANEL | C |
| TOP PANEL | MAIN BACKPANEL | G |

CONTRAST -FUSED

| FIRST OBJECT | SECOND OBJECT | |
|---|---|---|
| ALL THE STARS | MAIN BACKPANEL | C |

DOUBLE-CLICK ON ANY OBJECT'S NAME TO SEE ALL ITS COLOR RELATIONS

FIG. 24

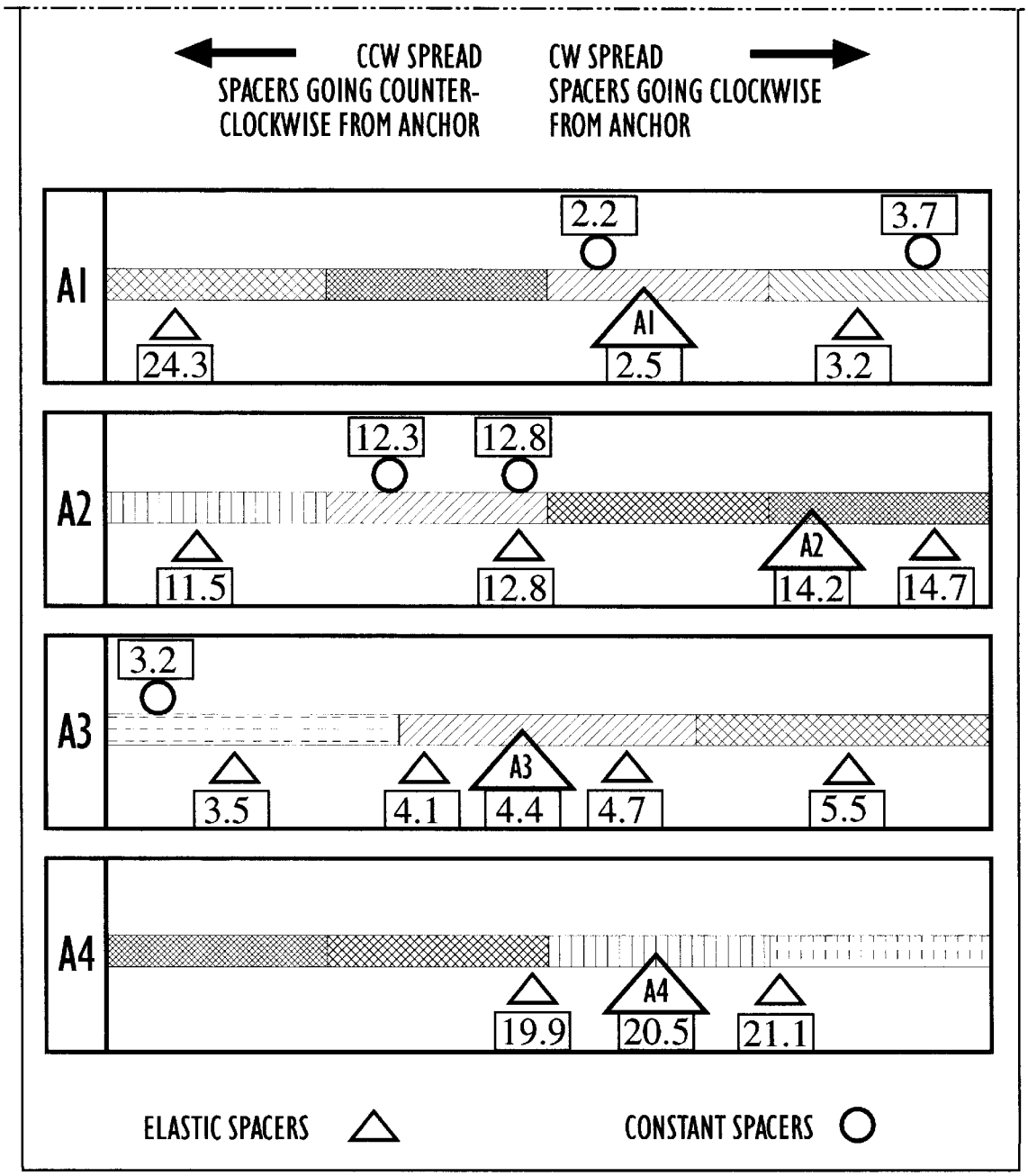
FIG. 27"

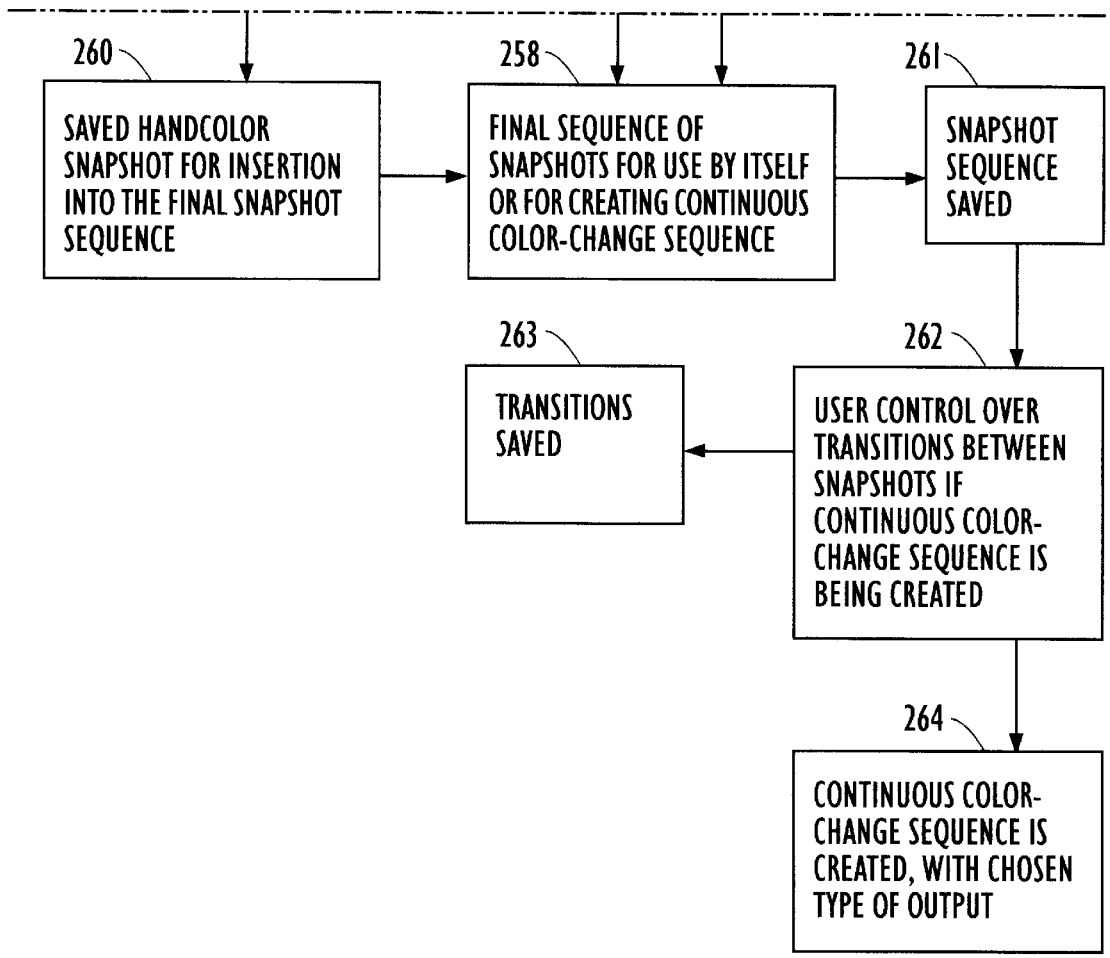
FIG. 28"

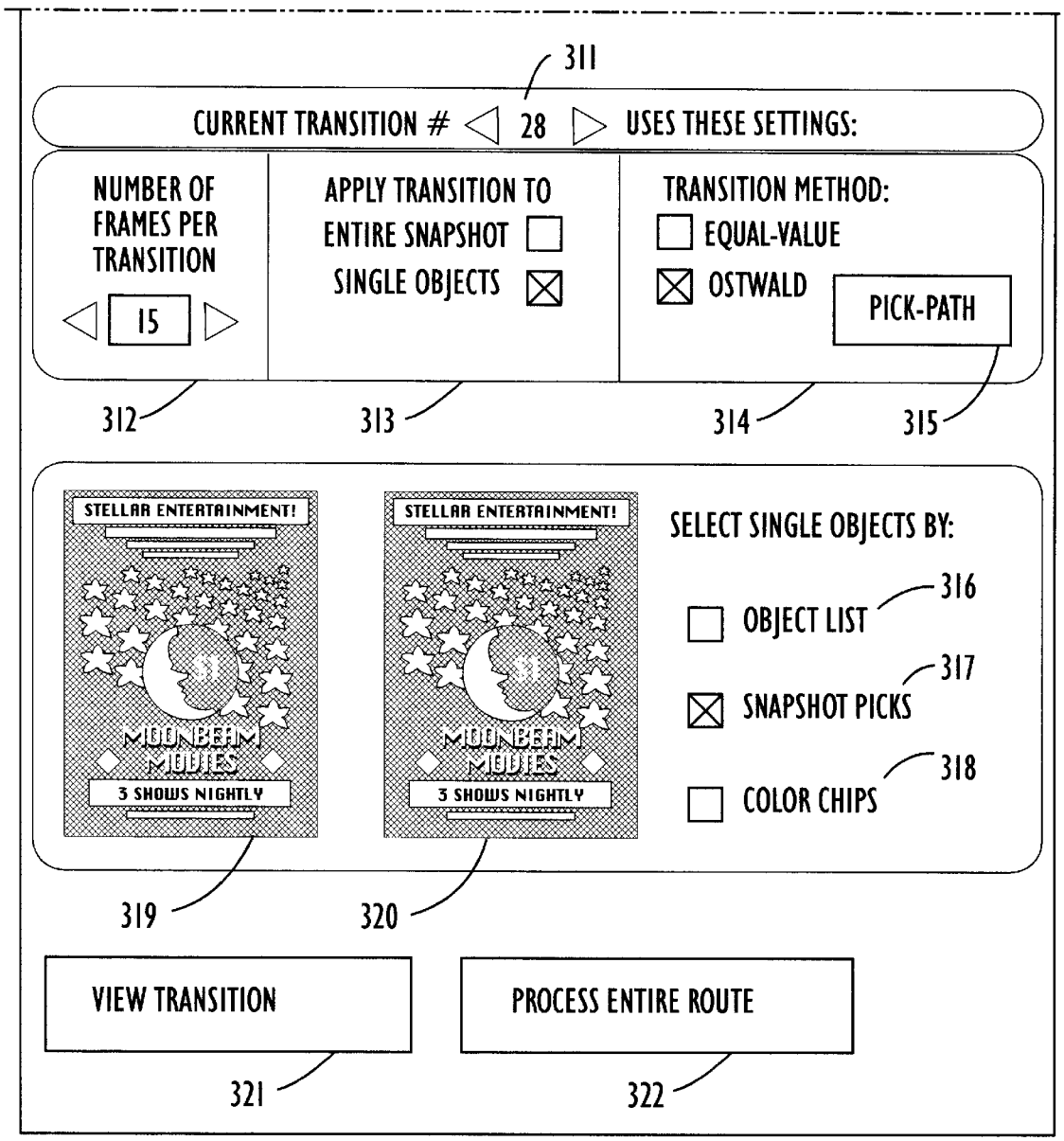
FIG. 29"

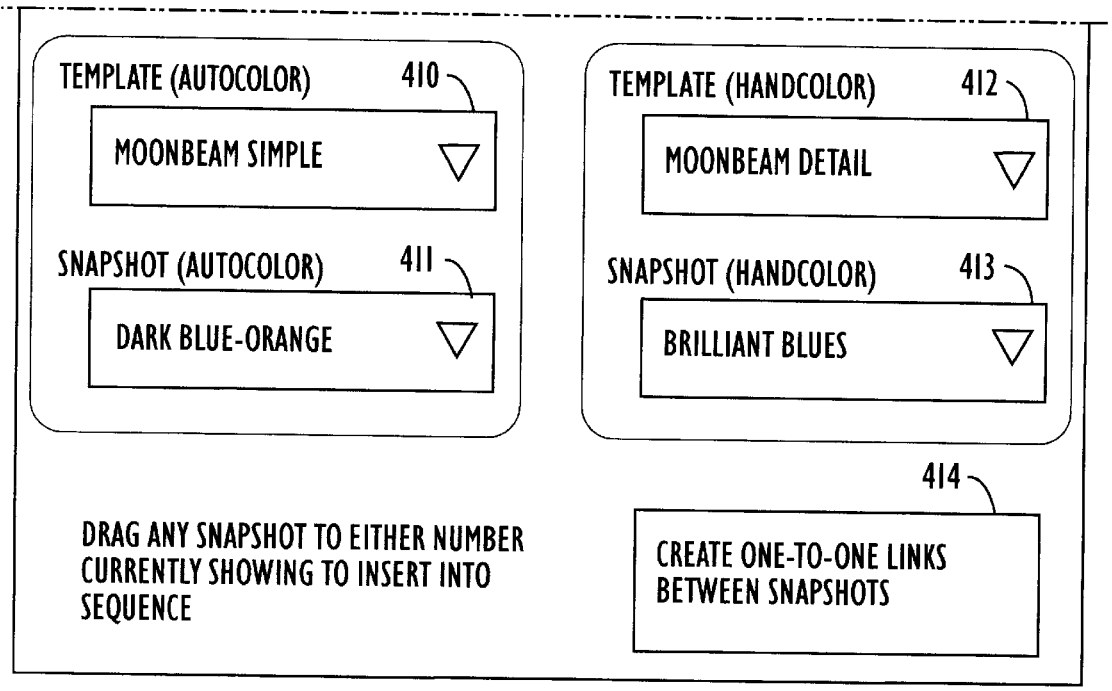
FIG. 30"
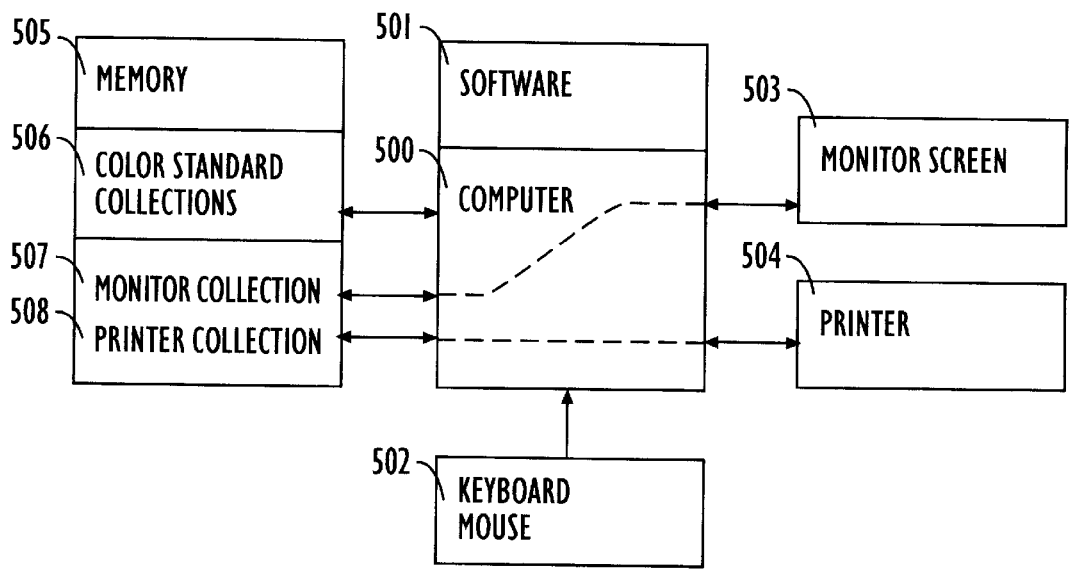
FIG. 31

5,909,220

INTERACTIVE COMPUTERIZED IMAGE COLORING SYSTEMS AND METHODS FOR PROCESSING COMBINATIONS OF COLOR WITH AUTOMATED SUBROUTINES AND COLOR STANDARDIZATION FOR DIVERSE COLOR SYSTEMS

This application is a continuation-in-part of the application Ser. No. 08/302,098, filed Sep. 7, 1994 for Interactive Color Harmonizing Methods and Systems by Jay Hamlin, et al., now U.S. Pat. No. 5,473,738, issued Dec. 5, 1995, which was a continuation of Ser. No. 08/059,068 filed May 10, 1993, now abandoned.

TECHNICAL FIELD

This invention relates to a computer processing system affording visually monitored interactive computerized processing of color combinations for coloring images, and more specifically it relates to computer operating systems for implementing and automating interactive coloring of images with standardized colors reproducible on diverse output devices.

BACKGROUND ART

The disclosure of copending U.S. Pat. No. 5,473,738 to Jay Hamlin, et al. for Interactive Color Harmonizing Methods and Systems is adopted herein in its entirety.

Computerized color selection, display and editing systems are well developed in the art. Thus, computer systems are known that provide generally for coloring and editing color images by interactive selection and substitution of colors being displayed in images one at a time while being monitored visually by a computer operator. Examples of these are: A. P. Gabor, U.S. Pat. No. 5,103,407 issued Apr. 7, 1992 for Apparatus and Method for Color Selection and H. Okawara, et, al., U.S. Pat. No. 5,317,678 issued May 31, 1994 for Method of Changing Color of Displayed Images by Use of Color Components. The Hamlin, et al. U.S. Pat. No. 5,473,738 has extended that art by introducing methods of processing several colors in unison.

Colors are commonly- synthesized -for color reproduction by instruments having unique color gamuts based upon a set of color coordinates comprising various combinations of basic colors. For example, the well known three color RGB system is commonly employed for reproduction of a gamut of colors on computer and television monitors. A gamut of reproducible colors substantially encompassing a visual color spectrum thus may be generated from the additive color emission characteristic of corresponding RGB phosphors. Similarly a CYMB color system is used for subtractive color characteristics in color printer output systems.

Hues are defined quantitatively by frequency and constitute attributes of color but are not to be confused with colors. Colors vary visually with black and white content. Even dilution from white "noise" such as may be present in a printed white paper sheet or in a phosphor screen color reproducer can effect changes of color, therefore. Thus, for example the colors pink and red may have a common hue, but pastel pink has a greater white constituency. Also, the nature of the prior art is that individual colors of existing color images may be subjectively modified by the personal choice of artists or intermediate computer technicians who prefer to modify coloring to subjective tastes, and further coloring may be contaminated from deterioration of colors incurred in various processing systems. Accordingly, it has been difficult in the computer arts to process and reproduce color artistry faithfully with standardized colors.

The Ostwald color reference system attempts to standardize colors by defining and, processing colors referenced to a comprehensive set of eight to twenty four standardized hue sample steps arranged in a spectrum array such as a color wheel. However, colors are defined by both their hue and black-white constituents. Accordingly the Ostwald system displays a set of colors for each hue, which colors include a range of white and black content. Such "Ostwald" colors are adopted in the Hamlin, et al. U.S. Pat. No. 5,473,738 system for computerized processing with visual reproduction of colors and color images on computer monitors. More explicitly, coordinated changes of several colors are converted simultaneously to different color combinations by mass rotation of corresponding hues about a multiple step Ostwald hue spectrum wheel. In the Hamlin, et al. patent, all of the hues were rotated and were kept separated the same number of steps apart about the spectrum wheel to preserve color harmony.

It has been a serious problem in prior art color computer processing that initial color creations of artists on a given color gamut are distorted by color compression or expansion over portions of the color spectrum when reproduced in another color gamut such as for a color printer. Thus, a standard set of color samples may not be proportionately distributed in the two color gamuts. Thus processing on a RGB phosphor monitor color gamut, where a set of color samples (standards) are proportionately spaced, will not assure proportionate spacing of colors when reproduced on printers or other systems having different color gamuts.

Furthermore, prior art interactive color processing by user/artists on personal computers involves myriads of tedious and precise operator induced manual steps, thus making likely operator neglect, fatigue or error and certainly distracting the artist from creative coloring procedure. Thus even the true colors of an original artistic creation may deteriorate during such computer processing. Accordingly there is a need for a computer system that is artist friendly, thereby encouraging artistic creativity.

Also to assure faithful rendering of artistic creations, there is a need for development of standardized color collections or samples with colors proportioned over a given color gamut that may be created and controlled with computerized systems and methods for faithful reproduction with similarly proportioned color samples over another color gamut.

Also in the aforesaid "Ostwald" color control system of the Hamlin, et al. U.S. Pat. No. 5,473,738, which controls the brightness or darkness along with the hue, thereby establishing definable standardized colors, there is no provision to process value. The value parameter is associated with the lightness/darkness attribute of each color apart from the color itself, for example the reproducible characteristics on a black-white print of a colored image. The value parameter thus supplements the "Ostwald" hue and black-white color constituents to define a feature of each color sample in the present invention.

Thus it is an objective of this invention to provide for color processing of a more comprehensive standardized collection of color samples in an abstract color operating system that is computer friendly and assures faithful storage, processing and reproduction of colored images without undesired mutation by interactive processing or distortion when reproduced in a different color gamut than that of the computer visual monitor upon which an image is colored by the artist.

The prior computerized coloring art is also deficient in providing the artist creator a way to develop color images with considerable aid and little interruption to the primary act of creative coloring of images. There is in essence so much tediousness and detail in computerized coloring of an image having complex combinations of colors, and in choosing compatible and artistic combinations of colors that the creativity of the artist is apt to be lost in the process when attention need be directed primarily to computer processing details. Thus, less extensive interactive routines are desirable for incorporating, viewing and comparing color changes in the development of colored images. A system is desired such that an artistic user may color images in the way a painter might use auxiliary sketches, and might make color observations by mixing just the right pigments to derive that desired color for a painting.

Accordingly it is an objective of this invention to provide a color engine that makes it simpler for the artist to make visual comparisons and selections of colors and combinations of colors, thereby providing automated routines for producing and editing color images without significant tedium and diversion.

Another prior art coloring deficiency is incurred when processing text set forth by the contrasts of two colors, since that contrast may change drastically when the colors involved in the lettering are changed. Thus should a combination of colors that includes text be rotated about an Ostwald hue wheel and a corresponding new combination of colors is created, the same text legibility is apt to be lost.

Accordingly a further objective of this invention is to provide improved color processing apparatus with apparatus and methods for automated control of the legibility of lettering portrayed by two colors when the colors are changed.

For viewing on different output devices having differing color gamuts, algorithmic adjustments have been made in prior art systems to adjust coloring. However, different gamuts do not assure that colors are proportionately located within diverse color gamuts thus avoiding color distortion by compression or expansion in portions of the visible color spectrum.

Therefore, it is a general object of this invention to provide color control apparatus and methods for processing standard color collections in a manner that those standards are proportionately distributed in different color gamuts.

Furthermore it is a general object to provide color processing systems having comprehensive automation procedures for enhancing the interactive creativity phases of coloring images and editing color images, thereby to eliminate tedium and fatigue of an interactive operator. In particular the elimination of many interactive manual coloring step details for making simultaneous color changes of groups of colors is an objective. A still further objective is to provide automatically dynamic color linkage frames between images of different color in dynamic sequences of colored images.

For example, automatic color changes are made feasible in the processing of dynamic color transitions between two significantly different colors of a moving image for a cartoon or moving picture. Thus, typical dynamic scenes such as ripening of cherries, require corresponding color changes from green through yellow to a dark red. Typically visible color jumps are noticeable in the transition from one color to another. Color discontinuities are visible in prior art fading process which passes through a gray color. The prior art does not afford automated interactively controlled system techniques for processing seamless intermediate color changes linking two different colors.

Another prior art problem is that color processing is so complicated that visual reference systems for monitoring coloring functions in process are inadequate. This is the case particularly when simultaneous changes occur with groups of colors.

Computerized coloring systems of the prior art are not generally capable of compactly storing, indexing and recalling for viewing and adoption catalogs of creative color combinations adaptable for color changes to facilitate automated coloring of live images.

A more general objective of this invention is to correct the foregoing problems and to provide improved comprehensive color processing methods and systems that will simplify coloring procedures and produce colored images that may be simply stored and recalled for visual monitoring and faithful color reproduction.

Other objects, features and advantages of the invention will be found throughout the following description, drawings and claims.

DISCLOSURE OF THE INVENTION

This invention provides improved methods and systems for color processing on personal computers whereby an interactive user may introduce creative and selective coloring patterns automatically.

The system defines, standardizes and processes collections of color samples proportionately distributed in diverse types of color gamuts, thus making feasible faithful color reproductions in various output color gamuts with similarly proportionately distributed colors.

Novel expedients and procedures for the color artist are provided for interactive choices to color images, including automatic subroutines for adopting color changes and substitution of one group of colors for another.

In order to create, control, store and produce colors uniformly, collections of color sample standards for different color gamuts are compiled and stored. These collections provide recipes for color processing and reproduction of colored images on different output devices which would heretofore otherwise have produced distorted colorings. Thus, a novel computer operating system processes and stores colored images by reference to different collections of color sample standards.

In the coloring process, several colors may be processed in unison. In one example a group of selected hues in an image may be rotated en masse about an Ostwald hue spectrum wheel icon for effecting corresponding color changes in a live image.

This invention in a preferred embodiment provides visible standardized color samples in an "Ostwald" format referenced to a hue spectrum icon wheel typically with 24 defined hue steps. A corresponding diamond display pattern identifies for each of two displayed hues a set of twenty-eight sample colors arranged with black-white content ordered in an array ranging from the pure hues at opposite diamond points to an intermediate common black-white junction line where color samples extend from saturated white to pure black. Thus a collection of about 600 separate color standard sample slots are available for inserting a proportioned set of colors extending over any one of the color gamuts presented by a collection of color standards visually formatted into this "Ostwald" type array. Thus, corresponding sets of standard colors are stored for processing different color gamuts with visible monitoring of the colors by arranging the standard color samples in the Ostwald-format slots.

Furthermore, the invention permits the expansion of each of these 600 odd Ostwald sample color slots into a volume niche for residence of a number of additional (traveler) colors, thus providing a tool for producing substantially an infinite number of color samples over a substantially continuous color spectrum.

Additional colors in the volume niches are associated to the volume by means of relative location in the three dimensional color volume of that niche or unit, thus allowing the volumes to be 'normalized' relative to each other for color changes. Accordingly, complex changes to continuous or arbitrary colors can be made by means of the Ostwald interface notation, and non-linear color changes can be made by simplified procedures using this framework.

To preserve color images for faithful reproduction and to simplify internal computer coloring procedure, colors are identified and processed in an abstract notational format that is convertible to the basic color samples of the coloring system. Typically an RGB phosphor emitting system color gamut will visually reproduce the colors, for coloring, reproduction and viewing in response to a corresponding set of stored recipes defined by the standard color collection in use for the particular computer monitor.

A basic color definition in the form of a color vector in the CIE three dimensional color space may be introduced to define universally any color of a selected color gamut. This provides a universally accepted reference to permit standardized colored images to be identified or produced in other color systems and media. Any color sample also may be identified physically by a color spectro photometer.

Provision is made for viewing and manipulating groupings of colors reproduced and processed in abstract notation and presented as visual icon patterns. Abstract notation is thus introduced permitting simple processing and comprehensive viewing of color relationships while interactively processing color combinations and networks of related color combinations for use in coloring live images. This system visually introduces color samples in icon formats that permit an interactive operator intuitive insight into color changes. It furthermore provides a powerful tool for adopting en masse formerly created color combinations in response to visual comparisons. Such automated routines eliminate the tedium of making myriads of manual coloring changes.

Colors within the color gamuts of standard color collections are precisely defined both by conventional hue characteristics and by black-white content in visible reference to the Ostwald type color format. Each color sample is further defined by a value dimension for more comprehensive color processing and standardization. The abstract terms and visible icon indicia introduced relate visually color group combinations in a format assuring user comprehension and simplified automated computerization of complex color changes. Thus, the interactive operator can now depend upon heretofore unavailable automated routines and subroutines to process, store or adopt defined and indexed color groups or color processing networks.

Active color images, termed snapshots, are formatted as both uncolored images (templates) accompanied by explicit coloring patterns and procedures for those templates in abstract notation. Stored snapshots may be selected, altered, and monitored visually by an operator through various automated color manipulation routines. Stored color patterns may be used to substitute new colors en masse into active snapshots being processed.

By this invention, families or groups of several colors in an image are visualized abstractly in a group identifying current colors positioned about a common "anchor" color handle in an "anchor group" arranged on a hue spectrum to abstractly indicate current colors of separate image objects. Families of color groupings are conveniently arranged in grid-like network patterns that abstractly identify the color properties for different color groups of stored image snapshots. Indexing and recall of any desired image and viewing the colors in such shorthand icon format expedites interactivity. Different groups of color patterns are thus creatable, storable and accessible for automation of image color processing steps. Abstract coloring notation disassociated with any particular image template permits adoption of stored viewable color patterns for live interactive color changes on live images being colored.

For achieving smooth dynamic transition of color changes in moving scenes, sequences of linking color change frames are created between two color images of a dynamic color change sequence. The colors may be changed individually frame by frame or en masse by adoption of stored linkage routes. For example, such stored color change sequences may be used with a cherry branch template to develop a sequence of images dynamically ripening cherries starting out green and changing to dark red in a smooth seamless transition.

In this respect, color changes are afforded for progressing through a range of explicitly defined colors which could approach a substantially continuous color spectrum. Such color change sequences might be used in development of a smoothly changing color pattern in a cartoon series of images, for example. In changing color patterns, the color value characteristic may be held substantially constant during color changes, as one explicit example of the novel automated color manipulation capabilities of this invention.

There is the capability to segment template images into individual objects available for live interactive color changes where desired, while freezing the coloring of remaining portions.

Thus, powerful, comprehensive novel automated color manipulation procedures are provided for working on either a full span of colors or selected subgroups of colors.

Interactivity control windows permit visual monitoring of the colors being processed for both single colors and groups of colors, with reference to simplified abstract icons. Thus, color relationships between colors in groups may be visualized by viewing corresponding hues arrayed about an Ostwald hue wheel, schematically represented in shorthand notation. For example, the user can visualize color changes resulting during rotation of a group, a subgroup or several groups of colors. Comprehensively, the relationships between the colors of a group may be interactively changeable to add, subtract or change individual colors and the spacings between the hues. All such color manipulations are processed simply through abstract computer friendly notation, which simplifies the extensive automation of coloring routines made available. Interactive operator choice is available for maintaining constant magnitude levels while colors are changed for both value and legibility.

Visual monitoring of individual colors, palettes, color image groups, and color image sequences through various color changes is provided in icon format. In the coloring process, operator choice, intuition and creativity is maintained and enhanced because extensive automation of routine computer processing steps prevents distraction of the artist while creating coloring innovations.

Thus, this invention introduces a novel automated color engine that automates complex color processing steps formerly necessitating manually produced microsteps by interactive operators. Truly automated systems and methods are introduced for creating, storing, editing and viewing stored color collections for adoption into uncolored template images related abstractly to associated color properties. Thus, various colorings with related color processing steps are defined by an identification tag (called a "relation matrix") carried along with an uncolored template image and updated with various processing steps. Colored snapshots can be recalled in this manner for visual review.

In this invention, a plurality of discrete color collections, each tuned to a particulars colors gamut, are available for processing more than 600 color samples presented visually in an Ostwald color sample configuration. Different color gamuts relate to different image reproduction devices, such as a color phosphor screen and a color printer.

The nature, spirit and preferred embodiments of this invention will be better understood by reference to the more detailed following description and the accompanying drawings.

BRIEF DESCRIPTION OF THE DRAWINGS

In the accompanying drawing, wherein like reference characters represent similar features throughout the various views to facilitate comparison:

FIG. 5 is a fragmental anchor pattern array, taken from the FIG. 4 region identified by the arrow for illustrating the interconnecting grid link intermediate color patterns schematically shown in FIG. 4;

FIGS. 6A and 6B show respective anchor color patterns having a color "spread" notation, respectively showing different bracketed anchor group spread ranges in which the hues abstractly presenting image colors of anchor groups A1, A2 are combined;

FIG. 23 shows a names and basic facts interaction window;

FIG. 24 shows a legibility and contrasts interaction window;

FIG. 31 is a computer block diagram illustrating the color operating system afforded by this invention.

THE PREFERRED EMBODIMENTS

Simultaneous processing of groups of colors on personal computers of limited size with comprehensive automated interactive color processing methods and corresponding apparatus are afforded by this invention. Thus coloring steps formerly requiring detailed operator manual attention are automatically achieved by the color engine afforded by this invention, and are controlled in such a way that the user need not be an expert in color theory. A novel operating system for processing colors is introduced. This operating system provides for processing color images in diverse systems while preserving and evaluating the initially created color relationships, thereby eliminating the propensity to expand or compress colors by transfer to a different system or viewing images formed by a different reproduction device.

Novel simplified, computer-friendly notation terms and protocol for comprehensively addressing the basic color properties are introduced. Processing simplicity, small storage space for processing complex colorations, and simplified storage of both in-process and retained color images are advantages gained from the abstract notation herein introduced in applicant's operating system. The notation is computer processable and is accompanied by visual icons permitting visible monitoring of colors and coloring procedures during coloring steps. It provides the basic procedural functions for viewing images, for interactively interjecting color choices and for implementing complex color change procedures responding to either interactive operator direction or automated computer direction defined by abstract notation. The visibility of colors by abstract shorthand icon pattern notation further instills in the operator a sense of organization and intuitive feel for the processing of colors and is a key to user-friendly relationships between the user and automated features of this invention.

The seemingly inconsistent factor of notation simplicity for complex color schemes as achieved by this invention nevertheless processes highly complex color characteristics and color changes in the computer under full interactive control of the operator. The user thus visually monitors the color groupings being processed either alone or in group relationships by way of shorthand icon patterns to give perspective and enabling the color engine to accomplish such functions as automatic en masse substitution of groups of colors into live images being colored.

Figure 1:
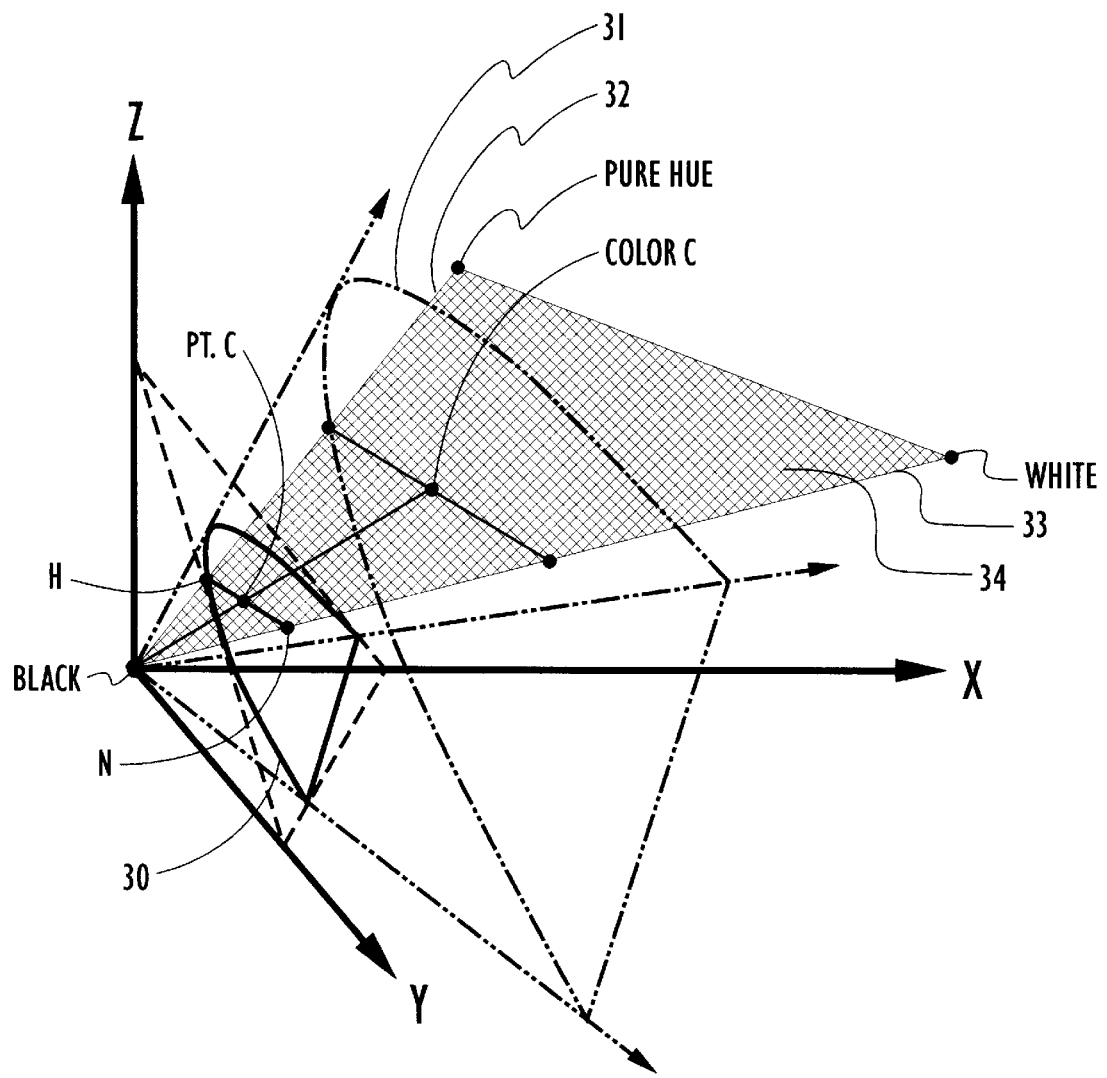
FIG. 1 is a three dimensional (CIE) color coordinate system for identifying the basic properties of color that are scientifically defined and measurable, wherein monochrome triangles are shown in a three dimensional portrayal of conventional chromaticity diagrams.

For basic universal definition of the entire theoretical range of colors visible to the human eye, reference may be made to the comprehensive CIE color coordinate system of FIG. 1. This coordinate system permits definition of any specific color including hue and black-white components by means of the X,Y,Z coordinates of the three-dimensional colorspace and the x,y coordinates used for standard two-dimensional CIE chromaticity diagram calculations, from which can be derived a number of dimensions including excitation purity, otherwise known as the ratio of full-color content to white content. The X,Y,Z coordinate vectors thus allow proportionate calculations of the pure hue, white component and black component of any visible color, or of the colors in any defined range or gamut. Furthermore, for any color defined by X,Y,Z coordinates, a "value" dimension can be defined or derived from the Y coordinate, sometimes known as the luminance factor. The elements of the original 1931 CIE XYZ colorspace and its derivative colorspaces such as CIE LUV and CIE Lab are well known in the art and are used as necessary for measurements of color.

According to the usual terminology of the 1931 CIE standard, any color C is located in the three-dimensional coordinate system according to its X,Y,Z coordinates and the vector from this point is projected or intersected with the unit plane defined by $X+Y+Z=1$. Thus the point c is located on the unit plane by this projection or intersection, giving the location of the color C in the conventional two-dimensional chromaticity diagram which is visualized in FIG. 1 by the spectrum locus 30. The color C is also located in the three-dimensional X,Y,Z space on the three-dimensional plane of its hue, shown in simplified form as monochrome triangle 34, and all colors in this hue appear in the two-dimensional chromaticity diagram as the straight line going from the neutral point N, sometimes call the "white point", through the point c to the spectrum locus 30. At the intersection of this straight line with the spectrum locus is found representation of the pure hue in the two-dimensional chromaticity diagram, denoted by H. The line 32 shows a visualization of the vector going through H to the pure hue for color C in the three-dimensional color space, and line 33 shows a visualization of the vector defined by the equal-energy stimulus, commonly called the white vector for a specified achromatic color stimulus, commonly called the illuminant vector or the white vector or grayscale vector. The color C and lines 32 and 33 all lie on the hue plane for color C in the three-dimensional colorspace, with lines 32 and 33 converging to the origin which has X,Y,Z coordinates (0,0,0) representing black in the three-dimensional colorspace. The vector for any color in the three-dimensional colorspace is by convention considered to originate at this point. Line 31 shows a simplified partial visualization of the "cone" of all visible colors created by the hue spectrum as it radiates outwards from the origin in the three-dimension colorspace.

If the vector of color C is fully extended in the three-dimensional colorspace it then includes all visible colors of this same chromaticity, thus giving a "shadow line" which corresponds to the appearance of constant chromaticity under varying levels of illumination. Using this "shadow line" for proportional spacing of colors of constant chromaticity, a "shadow series" can be created which appears as a single point on the said straight line in the two-dimensional chromaticity diagram. Thus by appropriate spacing of a series of points along the said straight line in the two-dimensional chromaticity diagram, and then by taking said "shadow-line" vectors through these points, by an appropriate proportionate spacing of points along said three-dimensional "shadow-line" vectors in the three-dimensional colorspace a collection or "shadow-series" may be defined for any specified hue. By utilizing the said hue planes and said "shadow-lines" such "shadow-series" can be created for any specified three-dimensional range of colors, for as many specified hues as desired, such as for the gamut of any device located in the three-dimensional CIE colorspace, or for the common gamut of two different colorproducing devices or processes.

The three-dimensional vector notation X,Y,Z then abstractly defines the hue and the white and black components of the color, either in comparison to the range of all visible colors of this chromaticity, or in comparison to any specified range of visible colors of this chromaticity defined inside the range of visible color. Thus the three-dimensional vector notation X,Y,Z abstractly sets forth all the properties necessary for identification of any one of an infinite number of colors in the computer system. This system can identify a set of standards for the colors of the system which permits those colors to be referenced to various types of colored media and color-producing equipment, as is well known in the art. Also the colors may be compared with other reproduction media such as an artist's created palette of paints by spectro-photometer measurements.

Figure 2:
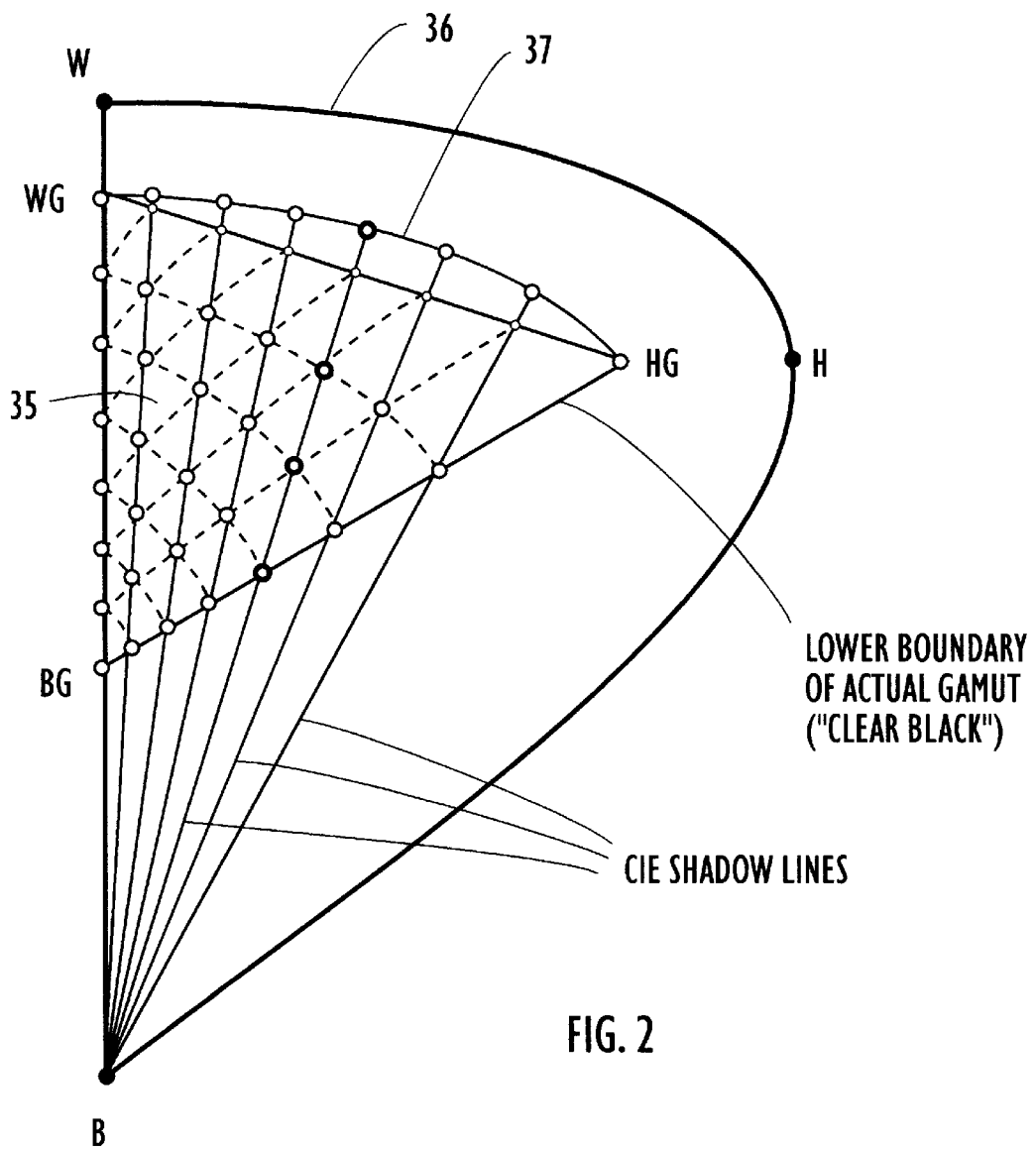
FIG. 2 is a graphical representation showing shadow lines of constant chromaticity crossing a monochrome slice through the X,Y,Z space of FIG. 1, in one hue.

It should be noted that in practice any actual output device or output process has a limited range of color it can produce, commonly called its "gamut". Thus practical questions of color production usually are concerned with actual gamuts, and for any given gamut a specified "pure" hue, or a "pure" white or a "pure" black are in fact not theoretically pure, but rather are just the purest attainable in that gamut. Thus the invention makes provision for working with different actual color gamuts or ranges of color, as shown in FIG. 2, including provision for those ranges which constitute a common gamut between two or more different output devices or output processes or output mediums. It should be noted that even in the case of those devices which use the same notation for color production, such as RGB monitors and RGB slide-makers, the color gamut of these devices is usually different, thus creating problems of color matching and color standards which the present invention addresses.

Because of "noise" components, and due to the inherent limitations of color-production mechanisms working by either additive qualities of colored light or by subtractive qualities of colored pigments, actual color-producing systems have a limited color boundary range commonly called gamut, shown in simplified form in FIG. 2 for one hue. FIG. 2 corresponds to a more detailed visualization of the monochrome triangle 34 in FIG. 1, and shows that the range of visible colors in any hue 36 is larger than the gamut of a typical device or medium in that hue, shown in simplified form by the smaller enclosed area 35 with upper boundary 37. "Shadow-lines" are shown for this one hue with "shadow-series" spaced along each shadow-line, thus giving a color collection for this hue comprised of a number of shadow-series. It must be recognized that practical limitations and variations in colorproducing systems such as printers, monitors, video, slide-makers, paint-mixing, fabric dyes, plastic pigmentation processes and so on prevent completely identical reproductions of theoretical colors. However, by creation of color standards within the gamut of the intended output device or medium, with appropriate "recipes", the color-producing device will closely reproduce a designated standard color in actual output. By way of the three-dimensional CIE coordinates X,Y,Z color collections can also be correlated between different devices or different color mediums.

For purposes of the present invention, the Ostwald twenty-four step color circle system is employed as an abstract notation for designating a comprehensive range of about six hundred standard colors. To produce and visually present the different color gamuts encountered in practical color output, this Ostwald system is used as a framework to hold and display different collections of standard color samples. Thus several standard color collections are provided with recipes for producing standard color samples proportionately spaced over corresponding color gamuts for different color-producing devices or different color media. Each color collection is tuned for the task at hand. It must be recognized that according to different situations the user of this system may wish to employ a standard color collection which spans the full gamut of the chosen output device, and in other cases the user may wish to employ a standard color collection which spans the common gamut of two or more devices, such as a color monitor and a color printer. Further, it must be recognized that by use of such standardized color collections it is possible to achieve the desired standard output colors even if these colors are not accurately represented on the monitor screen for viewing. Thus any standard color collection in the present invention represents a discrete library of available color samples defined by an associated stored color recipe collection for reproduction of those colors in a selected color coordinate system.

In FIG. 2 the gamut of colors in one hue for a standard color collection is shown in area 35, termed the monochrome triangle, with the discrete colors of the color collection contained in the shadow-lines passing through the origin B. The theoretical range of colors in this hue is shown by the boundary 36, while the upper boundary of the actual gamut is shown by 37, showing each shadow-series descending from a point on the upper boundary of the defined range, sometimes called "clear white", and going to a point on the lower boundary of the defined range, sometimes called "clear black".

Thus as illustrated by the three dimensional color coordinates of FIGS. 1 and 2 in combination with the Ostwald twenty-four step color circle system, introduced in U.S. Pat. No. 5,473,738, it is seen that all computerized colors involved in the various procedures and functions of coloring an image can be simply organized in this notation. Now some basic notational terminology and accompanying visual icon patterns used hereinafter for the computerized coloring procedures of this invention are introduced, so that the terminology of the following description may be more precisely understood.

TEMPLATE—a particular uncolored graphical design or image, which has a set of separable physical objects of known size and which serves as a viewable video pattern for producing a colored image by interactive coloring.

OBJECT—a separable part of a template adapted to receive a single color.

SNAPSHOT—a saved or temporary colored image referenced to a particular template storable in the computer for recall, viewing and automated coloring processes, and in autocolor mode carrying an associated identification tag indicating the coloring characteristics and color processing instructions.

RELATION MATRIX—the abstract computer processable identification tag notation by which the snapshot color relations in the template are defined and processed in autocolor mode.

SLIDERS—interactive operator selectable controls for establishing selected color characteristics.

ANCHOR—abstract notation for a hue presented to the user which serves as an index, handle or location for an anchor group. The anchor is visually presented in a hue location in icon format.

ANCHOR HUE—a hue located on a hue spectrum such as an Ostwald hue wheel or its shorthand icon representation, shown to the user as a visible representation of an anchor's hue, and abstractly relating to the current or potential coloring of an image.

CENTRAL ANCHOR—a locating indicia for a pattern of hues about a hue spectrum wheel.

ANCHOR PATTERN—the abstract visible icon notation showing the pattern of anchors around a twenty four hue step circle skeleton to give a simplified visual representation of where on the hue spectrum the various anchors for an image are located.

ANCHOR GROUP—a notation referring to one or more objects of a template associated to an anchor and thereby receiving their hue or hues referenced to spectrum wheel locations.

ANCHOR PATTERN GRID—an abstract visual arrangement of different related anchor patterns in a grid network, with a plurality of STATIONS networked together with schematic linkages between the nodes representing transition paths.

VALUE—the characteristic of a color or a colored image addressing lightness or darkness and excluding color, for example, pure yellow is lighter than pure purple as would show up in a black-white print.

LEGIBILITY—the visual contrast for lettering presented by two colors of an image.

ROTATION—the rotation of one or more colors about a color spectrum wheel, or the corresponding simultaneous replacement of one color group or several color groups in an image by a new color group or new color groups containing a different hue or hues.

VARY 8—the notation for the procedure and window pattern providing a visual viewing of eight colored snapshots with different color combinations arranged about a live central snapshot permitting the interactive operator to visualize and implement automatic interactive color changes by saving or adopting the coloring of any one of the peripheral snapshots for substitution into the central live snapshot.

COLOR CHANGE ENGINE—the systems and procedures that provide automatic subroutines for producing intermediate procedural steps to institute coloring changes in an image thereby replacing manually introduced steps of an interactive user.

SATELLITE HUES—hues tethered to an anchor hue in an anchor hue group with hues visible in icon format presenting the hues about a hue spectrum wheel.

SPREAD—an anchor group dimensioning system notation for deriving a set of satellite hues within a defined range of the hue spectrum surrounding an anchor, or for determining the distance of a satellite hue from its anchor's hue, used for implementing procedures rearranging one or more satellite hues in relation to an anchor hue.

VOLUMES—incremental regions or units of continuous color space each associated to one of the six hundred or so (Ostwald) color locations in a standard color collection and each potentially containing a number of traveler colors thereby permitting the presentation and processing of arbitrary colors in a substantially continuous color spectrum by means of definable standardized color samples.

TRAVELERS—individual colors within the color volumes comprising Ostwald color units visually identified in diamond icon notation.

Figure 3A:
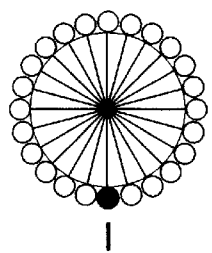
FIGS. 3A and 3B are sketches of abstract color icon anchor patterns for visually presenting respectively a single color group or two color groups positioned about an Ostwald twenty four step color wheel coordinate system skeleton.
Figure 3B:
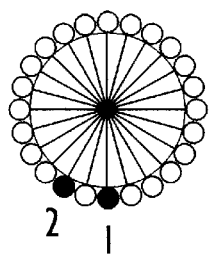

Now with reference to FIGS. 3A and B, two anchor patterns are shown, each having the central anchor (hue 1) visibly appearing at the six O'clock notational base position referenced to the twenty four step hue spectrum circle icon skeleton. FIG. 3B has the additional anchor (hue 2) in its corresponding hue location about the icon circle. The two anchor patterns are related and commonly referenced by a common central anchor (hue 1) handle. There are no restrictions upon the numbers of anchors in an anchor pattern. The anchor patterns are visually identified in icon circle notation visibly showing anchors patterned as if they were hues located about the Ostwald hue spectrum wheel.

Figure 4:
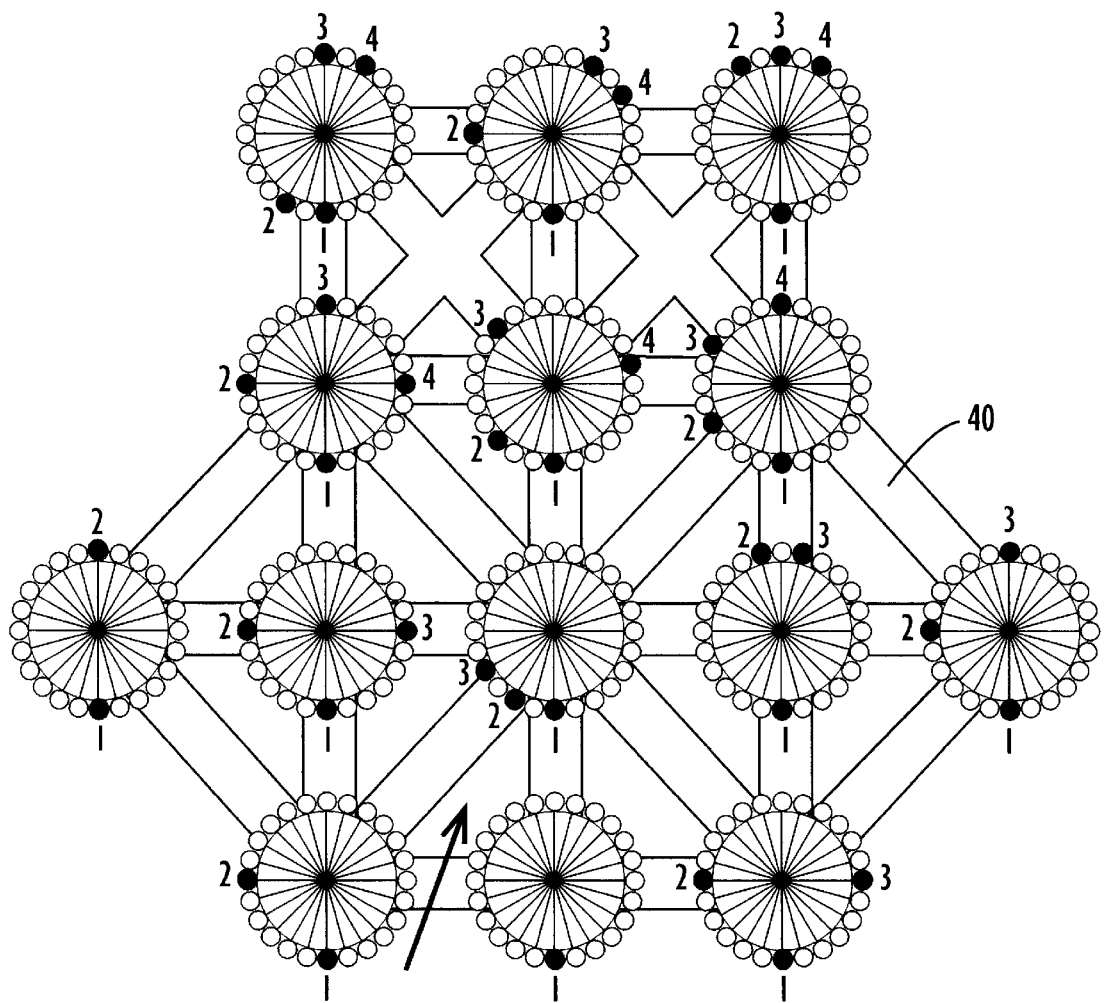
FIG. 4 shows a hypothetical visually presented anchor pattern grid network identifying several related anchor patterns positioned as color station nodes schematically interlinked by a commonly referenced hue (1) located by convention at the six O'clock position.

FIG. 4 illustrates an arbitrary and abstract anchor grid pattern of related anchor patterns, having the common central anchor (hue 1) handle. Different anchor patterns representing different current image colors are located at nodes (stations). The stations are linked together by schematic interconnection linkage lines 40. Each linkage line can represent a series of transition anchor patterns for changing colors between stations. The color change linkages represented by those interconnection lines 40 illustrated between the terminal nodes at the apices of the triangular array of anchor patterns in FIG. 5 correspond to the explicit linkage lines bounding the region identified by the arrow in FIG. 4. The intervening anchor patterns between the three nodes at the triangle apices represent sequential intermediate anchor patterns traversed in the respective linkage arms 40 as interim color changes are made from one station node anchor pattern to another station node anchor pattern.

Two different spreads of FIGS. 6A and 6B are functionally operable at respective stations numbered 1 and 4 in some unshown grid network. The spread dimension of hues about the anchor hue is shown notationally by the brackets for anchor groups A1, A2. The spread function can serve to confine anchors and satellite hues of specified anchor groups (A1, A2) in a proportionately spaced group within a designated portion of the hue spectrum identified by the brackets (or other indicia such as found on the icon of FIG. 27). As will be later explained in more detail, the computer system and methods afforded by this invention automatically processes coloring of images relative to the abstract notation of the different color groups (A1, A2) representing current image colors of designated snapshots. Thus, image colors may be automatically substituted or rearranged proportionately within the spread portions of the hue spectrum, if desired, thereby effectively expanding or compressing the range of image colors visually designated in color groups. Automated computer subroutines of the color engine thus are fashioned to perform a proportionate spacing of substituted colors within the hue spectrum as notationally referenced in the spread patterns.

The "spread" thus constitutes and identifies a color group characteristic. Thus, snapshots exhibiting the spread feature carry notational computer instructions for automatically conforming image colors proportionately within the visibly observed spread limits. The spread function, when exercised, confines entering colors in the anchor groups A1, A2, to positions within the respective clockwise (CW) and counter clockwise (CCW) boundaries to thereby spread out or compress image color combinations within the spread boundaries. For example in FIG. 6B at anchor group A1, all of the incoming A1 group of colors must be confined within the specified maximum of three hue steps. As later described, a number of satellite hues arranged in designated decimal substeps are proportionately distributed about the anchors A1, A2 within the designated spread bracket dimensions. By means of this spread function, any satellite hues of an anchor group located about an anchor designated at a hue location thus may be automatically confined or spread out within the bracketed span on the hue spectrum wheel. Visual inspection of anchor patterns thus provides the user artist with intuitive conceptions of what color changes will do in the image, so that corresponding image coloring changes may be adopted.

Similarly, as shown in FIG. 6A, the desired grouping of satellite hues in anchor group A2 may be expanded outwardly or otherwise proportioned within the five hue span bracket. The spread dimensions at a station, subject to user selection, are associated to the anchor pattern at that station and for each anchor its spread dimension will act upon the corresponding anchor of an incoming snapshot to either keep the hue spacing of that anchor group constant or else rearrange the hues of the objects within the spread bracket dimension identified on the icon. These automated color changes are accomplished when a live image leaves its current station and enters a new station which can differ from the first station in either its anchor pattern or its spreads or both. When a snapshot is saved in autocolor mode it retains spread indicia for its anchor groups and for the station at which it was saved, thus connecting the actual coloring of the snapshot to this mechanism. Note that the anchor pattern of both FIGS. 6A and 6B corresponds to the leftmost anchor patterns of FIGS. 4 and 7, which are in a shorthand icon notation that does not show or define the spread.

Figure 7:
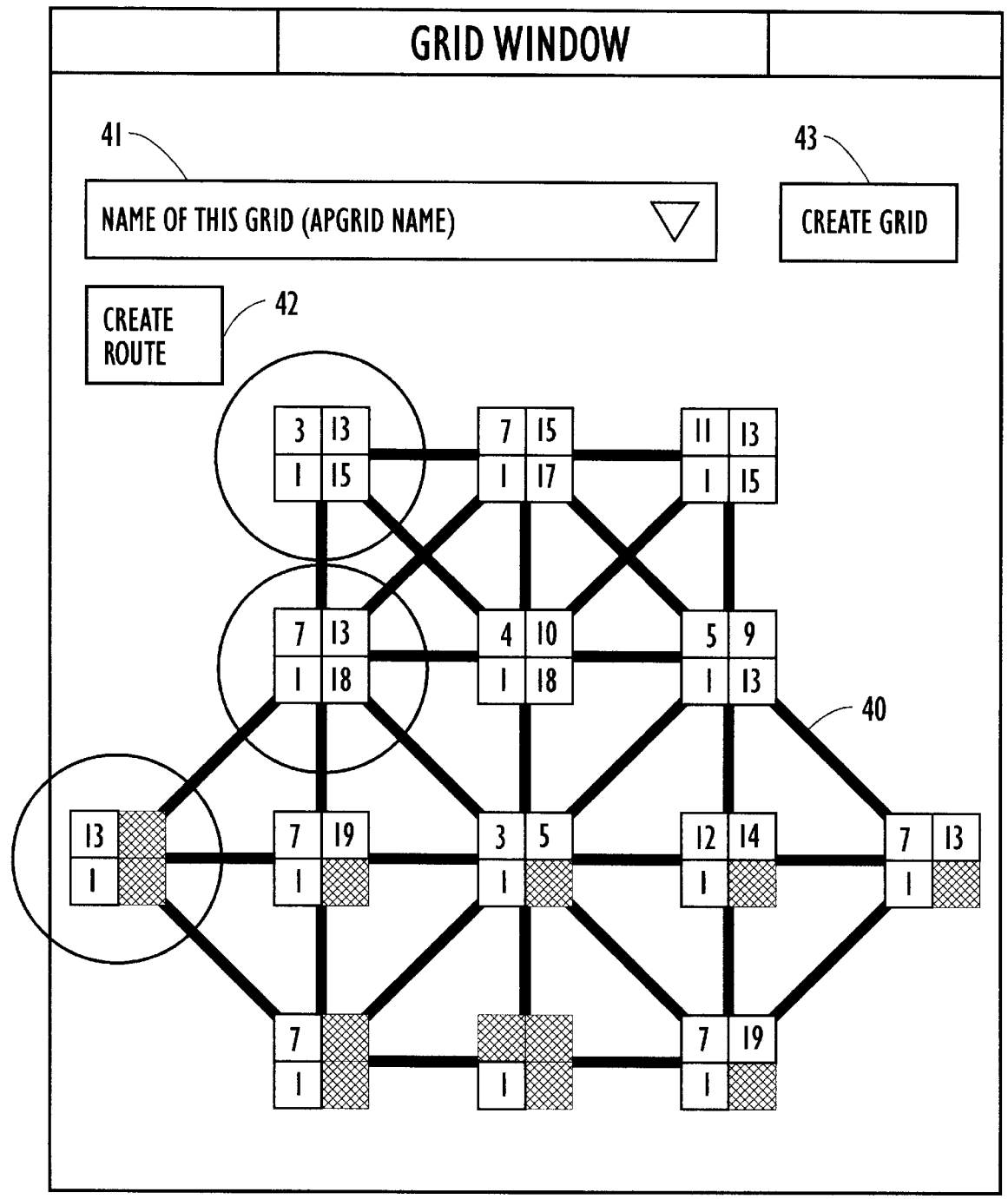
FIG. 7 shows a grid window with grid stations (circled at some nodes) representing active anchors in the numbered squares having the common reference or handle anchor hue (1) in lower left corner square.

In the grid window of FIG. 7, some of the stations (disposed at the nodes) are circled to indicate schematically that the Ostwald color wheel icon skeleton is actually being viewed such as in FIG. 4. The interconnecting lines 40 schematically indicate intermediate anchor patterns stored to effect color change sequences in transit between intermediate anchor patterns which are interspersed in the linkages 40 between the respective stations in the manner illustrated in FIG. 5. The common central anchors (hue 1) displayed for visual observation in each of the station squares are indicated. The legends 1–19 identify hues about the icon circle in step notation starting clockwise at six O'clock on the twenty four-step Ostwald type hue spectrum wheel. Some stations have less than four anchors. By this indicia the visual relationship of the anchor hue patterns at the various stations may be compared for expediting interactive choices of available automated coloring procedures.

In this grid window of FIG. 7, the chosen anchor pattern (AP) grid network is selected at interactivatable box 41. A route creation mode may be chosen interactively at box 42, or a grid creation mode at box 43. This abstract grid notation permits viewing in color of the various anchor patterns, and thus intuitively creates for the user a visual concept outlining the artistic effect of different color groups observable at the station nodes. The individual stations may be selected by clicking on the desired station to create a live colored snapshot if desired, for further interactive coloring. The grid pattern notation thus aids the creative artist to interactively substitute new colors into a live image being processed.

Further, the grid schematically presents the linkages, which are available for automating the creation of the intervening sequential route patterns represented along the linkage lines 40 in the creation of a new route or grid. The linkage line routes are addressed by indicating beginning and end stations. The size of the grid pattern is arbitrary and can hold a large number of stations in a desired collection or grouping of anchor patterns. The grid is primarily a visual working medium for organizing broad color changes, and a powerful tool for automating color processing such as by selection of automated coloring procedures or by adopting a color change linkage route between two snapshots.

Figure 8:
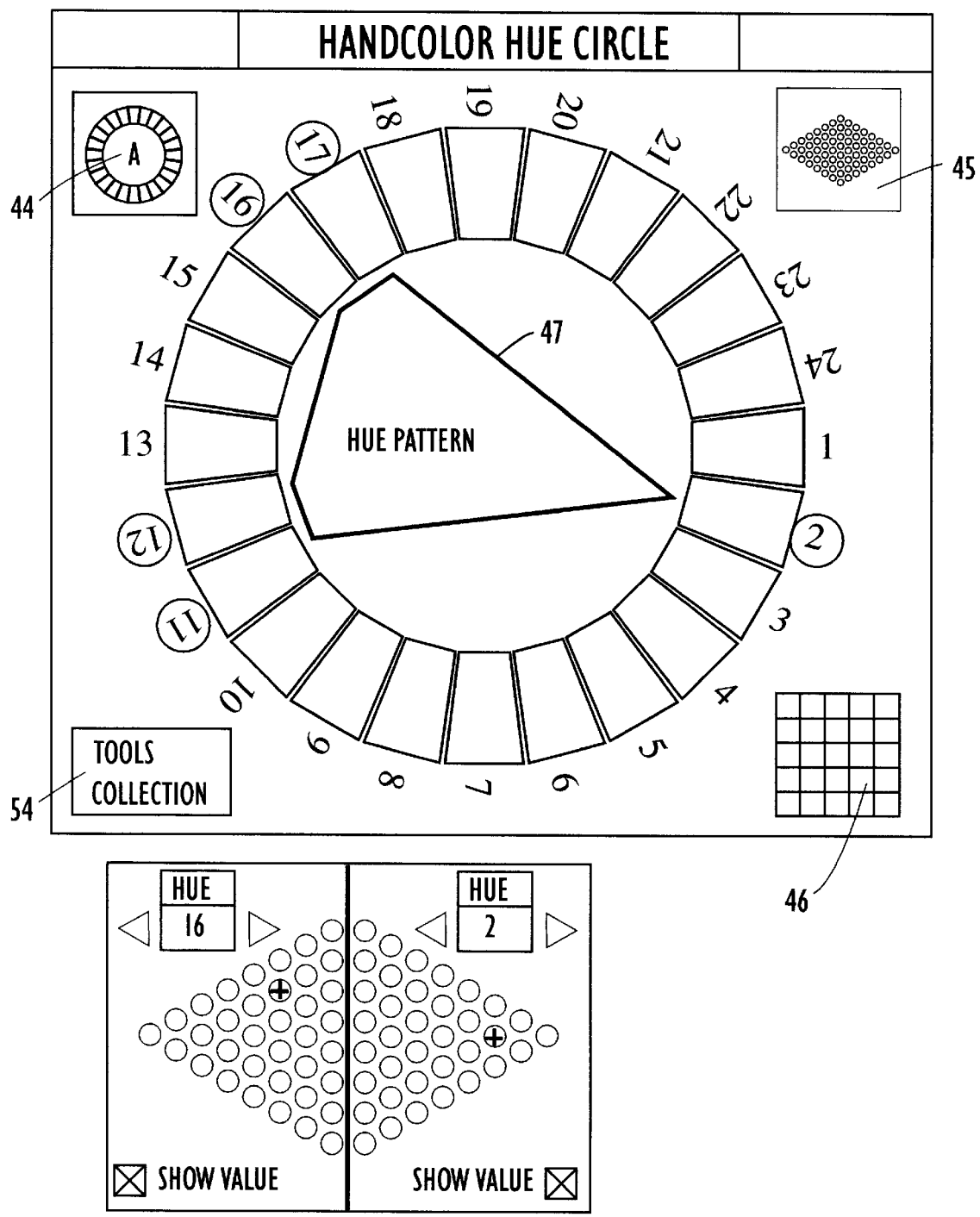
FIG. 8 shows a handcolor hue circle window with associated Ostwald hue circle and color diamond thus displaying twenty-four hues each subdivided into twenty-eight colors to present over six hundred visibly reproducible color sample selections.

The hand coloring interactive mode of operation window of FIG. 8 provides for Ostwald type coloring functions, such as found in U.S. Pat. No. 5,473,738. In this mode, the abstract anchor patterns and notations used for snapshots being processed in the automatic modes do not exist. Color groups however are processed in unison by the user simply by clicking and "dragging" on the geometrical hue pattern 47, or on selected hues, to rotate the initial group of hues en masse about the color wheel thereby to designate a new group of hues that can be adopted for changing colors in a live image being processed. Also selected colors in one or more hues can be treated as a group and moved as a group by "dragging" to new positions in their respective hues without any change of hue, thereby retaining a complex of color relationships despite recoloring. The results of hand coloring can be retained as snapshots, and these handcolor snapshots can also be transferred for processing into the autocolor modes by way of entry key 44 where an autocolor snapshot will be formed and relation-matrix automatically attached in a manner later described with reference to FIG. 28. The key 46 opens up a color palette chip for visual display of the colors. The colors in the Ostwald type hue steps 2, 16 or other selected hues are visually represented in the Ostwald color diamond format of twenty-eight colors and eight achromatic gray-scale colors for each hue of the nature shown in FIG. 2, incorporating white-black color content. The diamond button 45 will introduce a routine permitting selection of the hues to be shown in the active diamond image.

In this FIG. 8 embodiment, there is shown a live set of five Ostwald hues active as identified by the hue pattern polygon 47, namely hue steps 2, 11, 12, 16 and 17, which are circled outside the hue wheel. For the Ostwald diamond hues, value may be viewed rather than color by interactive user choice in accordance with the invention, at the corresponding "show value" buttons.

Figure 9:
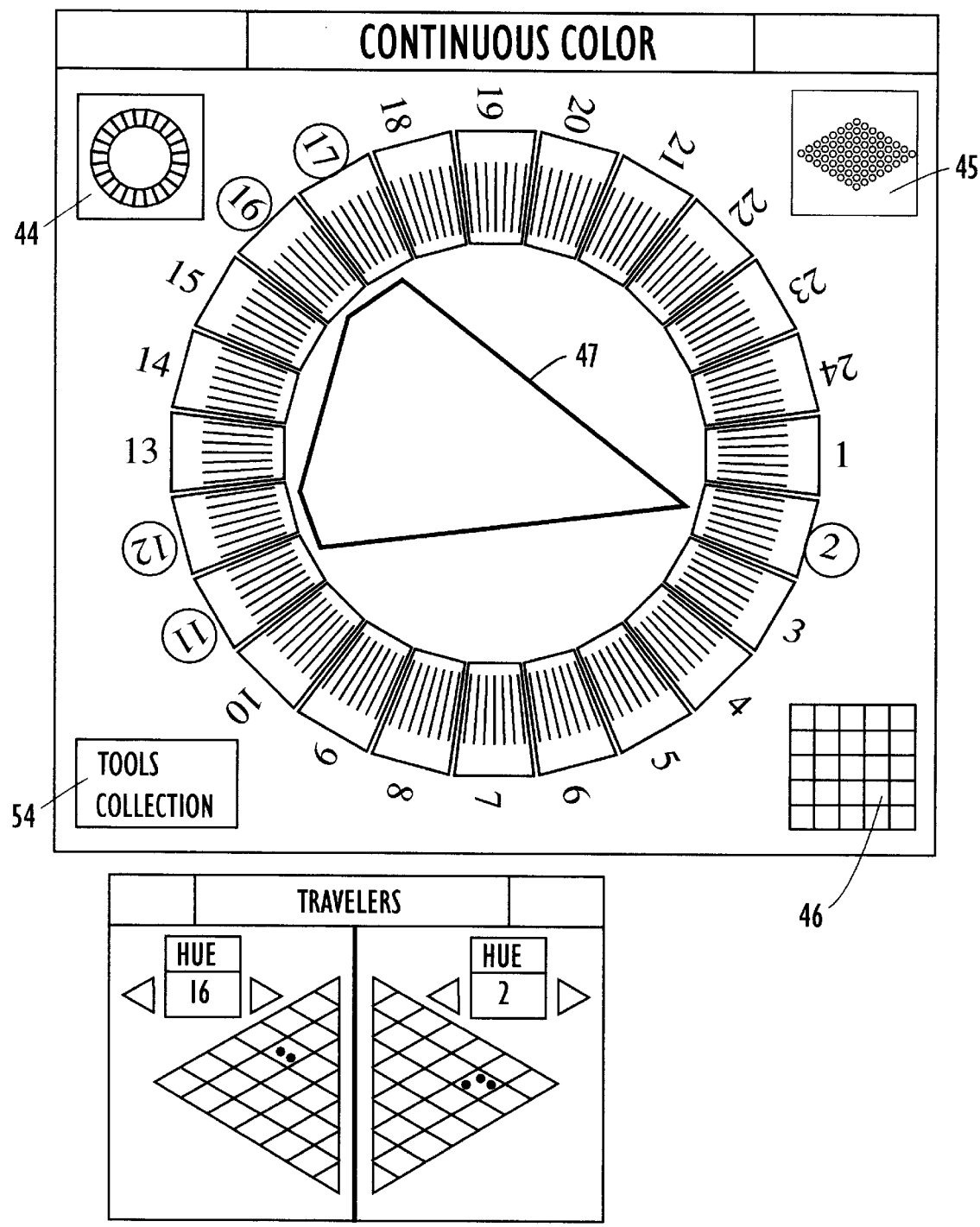
FIG. 9 shows a continuous color window where some Ostwald colors in the diamond window are used as "handles" for spatial "volumes" accommodating intermediate "traveler" colors shown by dot notation.

In the FIG. 9 embodiment, the continuous color mode window, the travelers diamond pattern illustrates the expansion of the step process by introduction of volumes, namely selected ones of the Ostwald color units or receptacles in the diamond pattern with internal dot notation. Thus, each color unit could constitute a volume having the capacity to contain a set of traveler colors. The active traveler colors are identified as dots located in corresponding volumes indicating the diamond active travelers for the respective two hues (2, 16). Thus, over six hundred Ostwald volumes as represented by the diamond displays of elementary color sample units, are by this invention expanded into travelers of finer color gradations. In this manner, it is feasible to make substantially a continuous color spectrum available for selection and processing of as many further individual sample colors as required. As shown in the travelers window, two hues (2, 16) are viewed on the Ostwald diamond notation with five individual travelers distributed therein as dots. These dots highlight the travelers in the live image pattern being processed. The anchor hues 2, 16 remain as "handles" for indexing and viewing those related displayed traveler patterns of the live image. Essentially the entire color space is thus divisible into incremental travelers contained within any one of the six hundred so volumes. The volumes (Ostwald color receptacle units) also serve as a handle for locating the travelers therein, and serve as notation indexing travelers in the relation-matrix of a snapshot. Each color sample unit can be viewed as a "handle" to a defined spatial volume of the color space, with each volume containing a defined range of continuous color. Any arbitrary color whose location in the color space is found inside such a volume is thereby associated to that volume and to its standard color "handle," and can be put into a relation of location to any other specified color (point) in the volume. Thus by division of the color space into such volumes, any number of arbitrary colors can each be associated to a standard color and handled by means of its volume. Accordingly the entire spectrum of arbitrary colors is essentially available for standardization of further color samples adapted for insertion between the proportionately arranged color sample steps available for processing the operations system of this invention, namely colors of selected standard color gamut collections.

In the auxiliary diamond color sample icons shown in FIGS. 8 and 9, colors containing two identified hues (2, 16) are viewed in respective triangular segments of twenty-eight color samples with the pure hues (2, 16) located at the outermost diamond apices. These two color sample triangles are arranged with a common vertical axis extending from black to white and diagonally arranged sample color units having specified black and white content. Thus by the hue handle, the standard colors and travelers in a live image may be indexed and visually called up in the diamond icon reference notation. As shown in FIG. 9 by notation some units encompass traveler color samples. Also the continuous circular hue spectrum shown in FIG. 9 is shown divided into twenty-four continuous ranges, with each of the standard Ostwald hues shown as a "step" surrounded by a range of this continuous hue spectrum, so that in effect therefore this system adapts to incorporate and define any color within any particular color gamut being processed, up to and including the full range of theoretically visible color.

Figure 10:
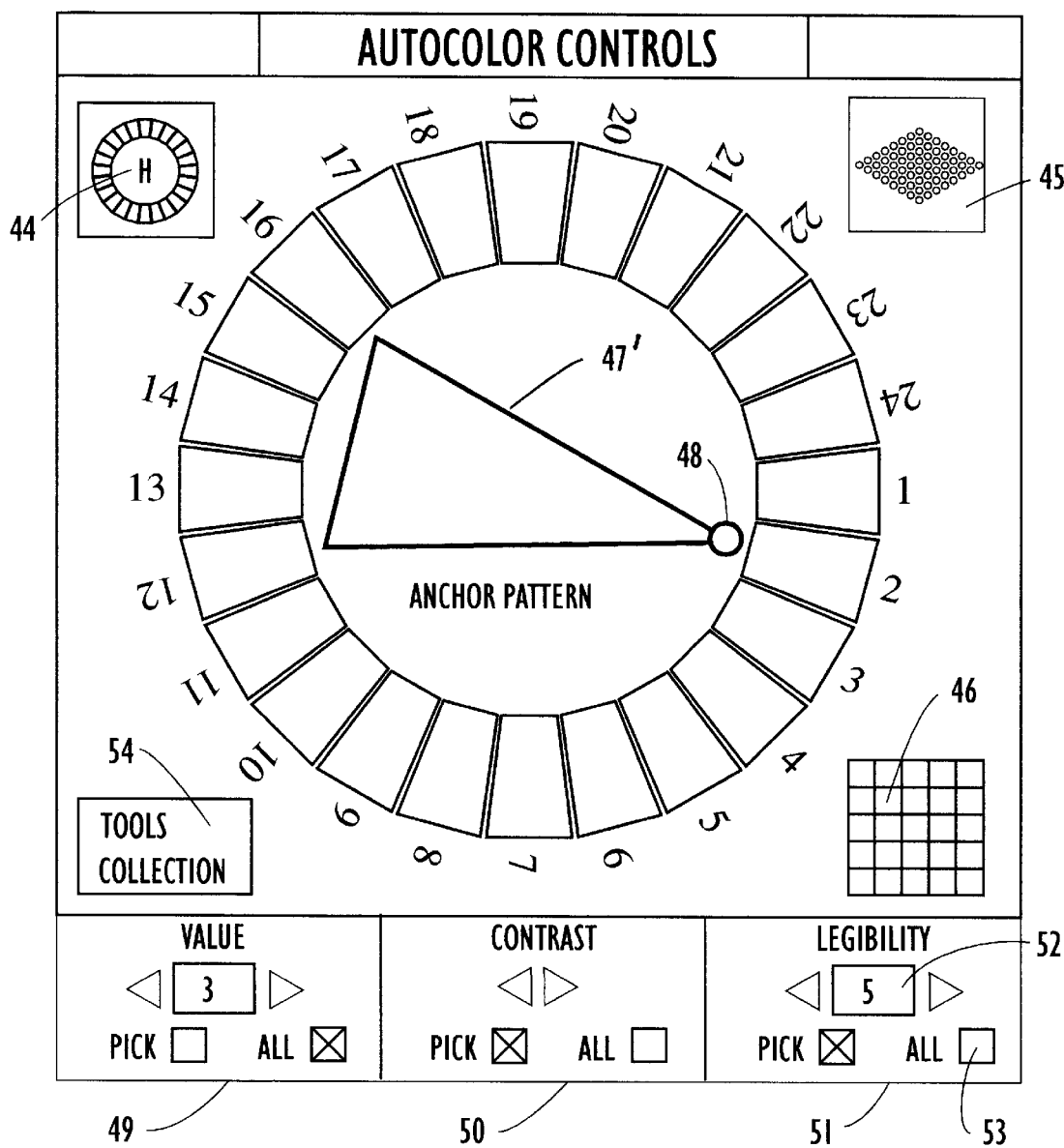
FIG. 10 shows an automatic color control window for selection of value, contrast and legibility levels.

In FIG. 10 the "autocolor controls" window, for color control interaction in the automatic coloring mode is displayed showing a triadic set of three anchor hues (47') representing the color groups of a live image. The central anchor hue 48 is highlighted. Any part of the anchor pattern 47' may be grabbed for rotation of the hues about the Ostwald color wheel, and the image is correspondingly recolored as arranged by associated software. The key 45 brings up the color diamond icon for selecting hues in response to interactive choices. The button 44 transfers to the handcolor mode for coloring the live images in process. A newly colored such image then can be saved or brought back into autocolor mode as a new snapshot after coloring adopted therefore acquires a relation matrix tag readying the image for automatic mode processing. The respective sliders 49, 50 and 51 permit interactive control of value, contrast and legibility color characteristics. Value and legibility sliders 49, 51 give a choice of five magnitude steps and indicates in boxes 52 the current active choice. The "all" boxes 53 indicate when these respective sliders are in use on the overall image, and the "pick" boxes 51 indicate that the sliders are in use only on live unfrozen interactively chosen objects of the image. The tools collection key 54 makes available for activation an assortment of tools for selecting image objects, manipulating color patterns, etc., of a nature later described.

Significantly, this invention provides the novel feature of automatically preventing substantial overall changes in image value or lettering legibility with changes of image coloring.

Figure 11:
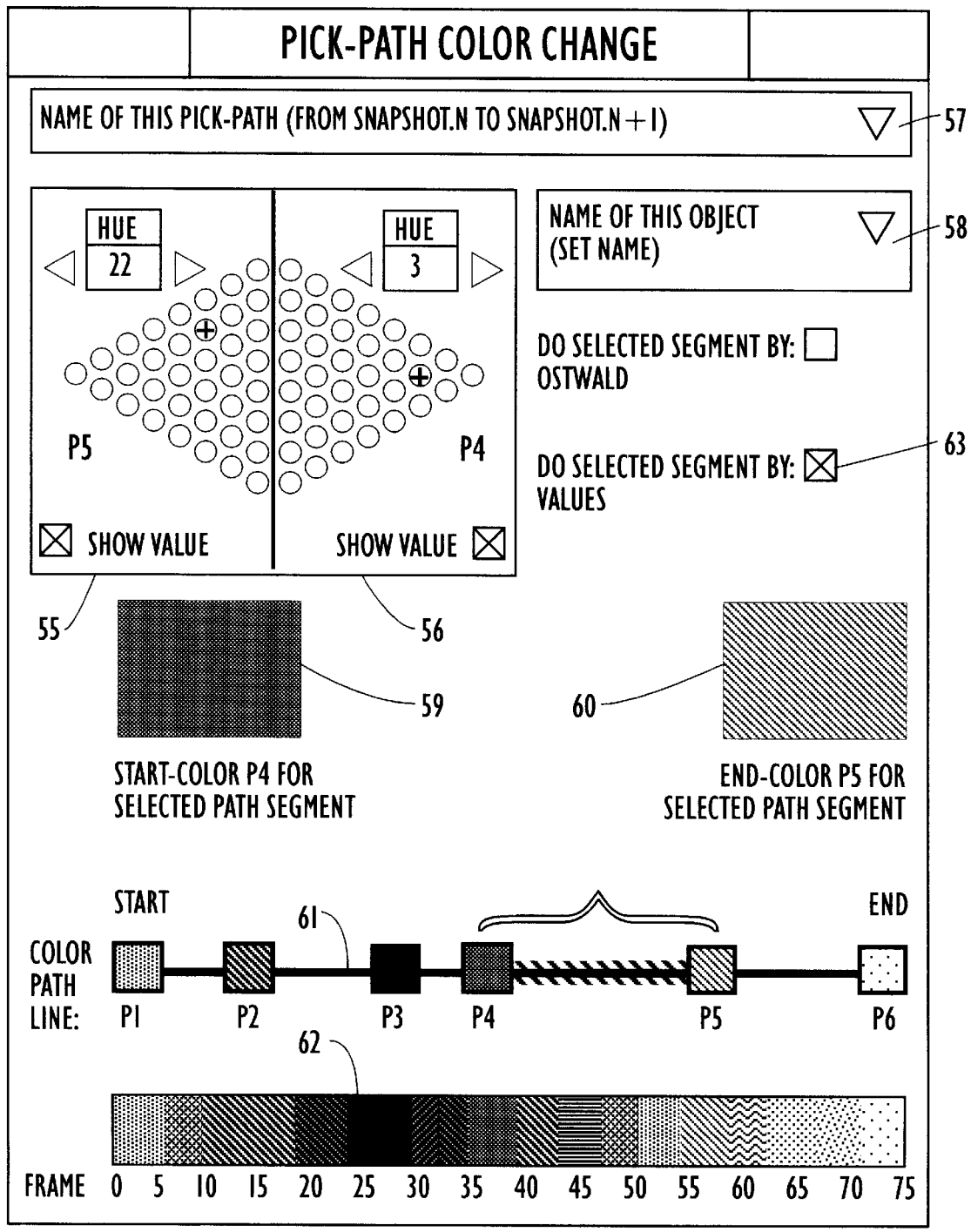
FIG. 11 shows a pick-path color change window with interactive controls for producing color transition paths and sequences of intermediate transition frames for individual objects between starting and ending snapshot colors.
Figure 19:
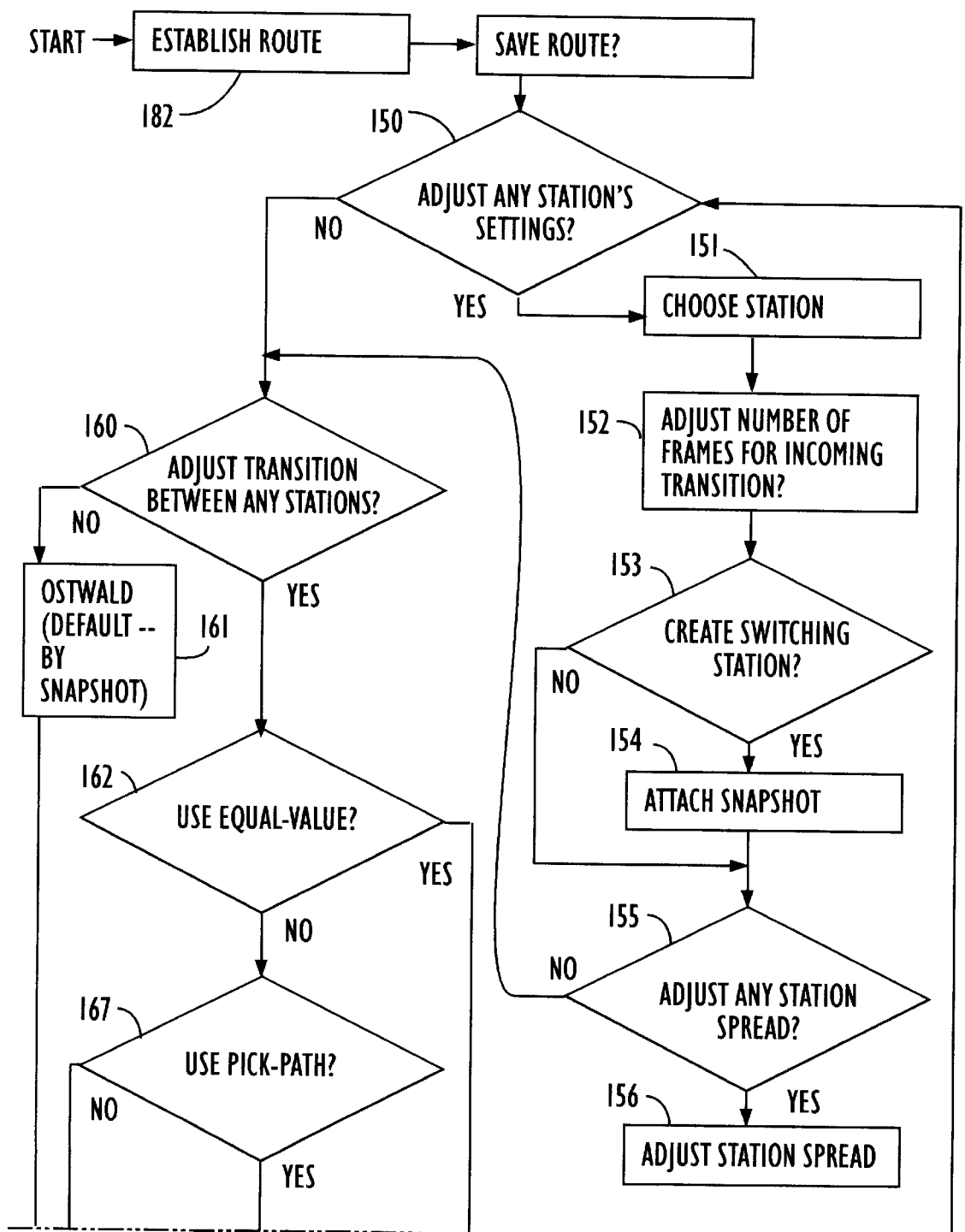
FIG. 19 is a functional block diagram showing processing steps for creating intermediate color change linkage sequences between two image colorings.
Figure 19:
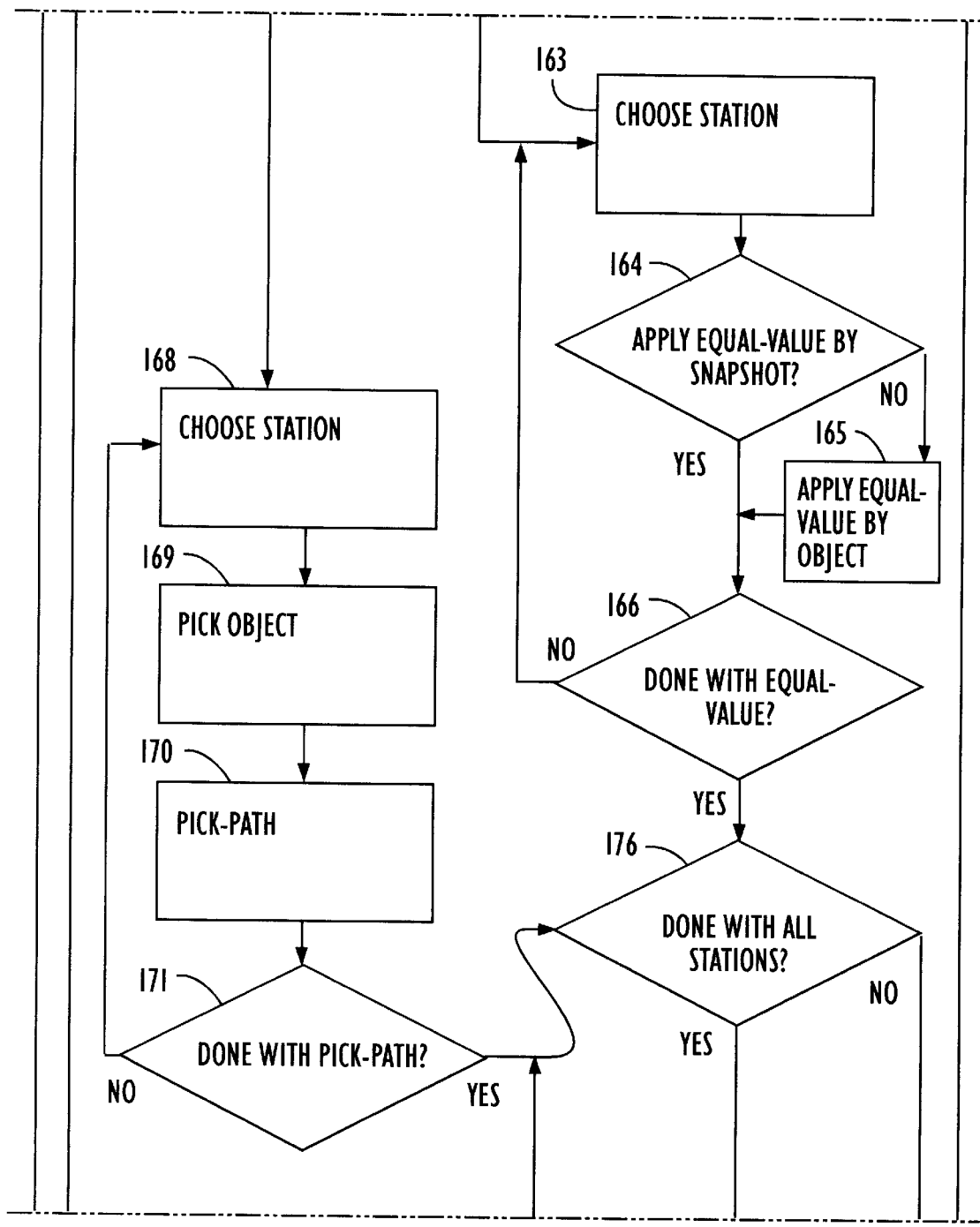
Figure 19:
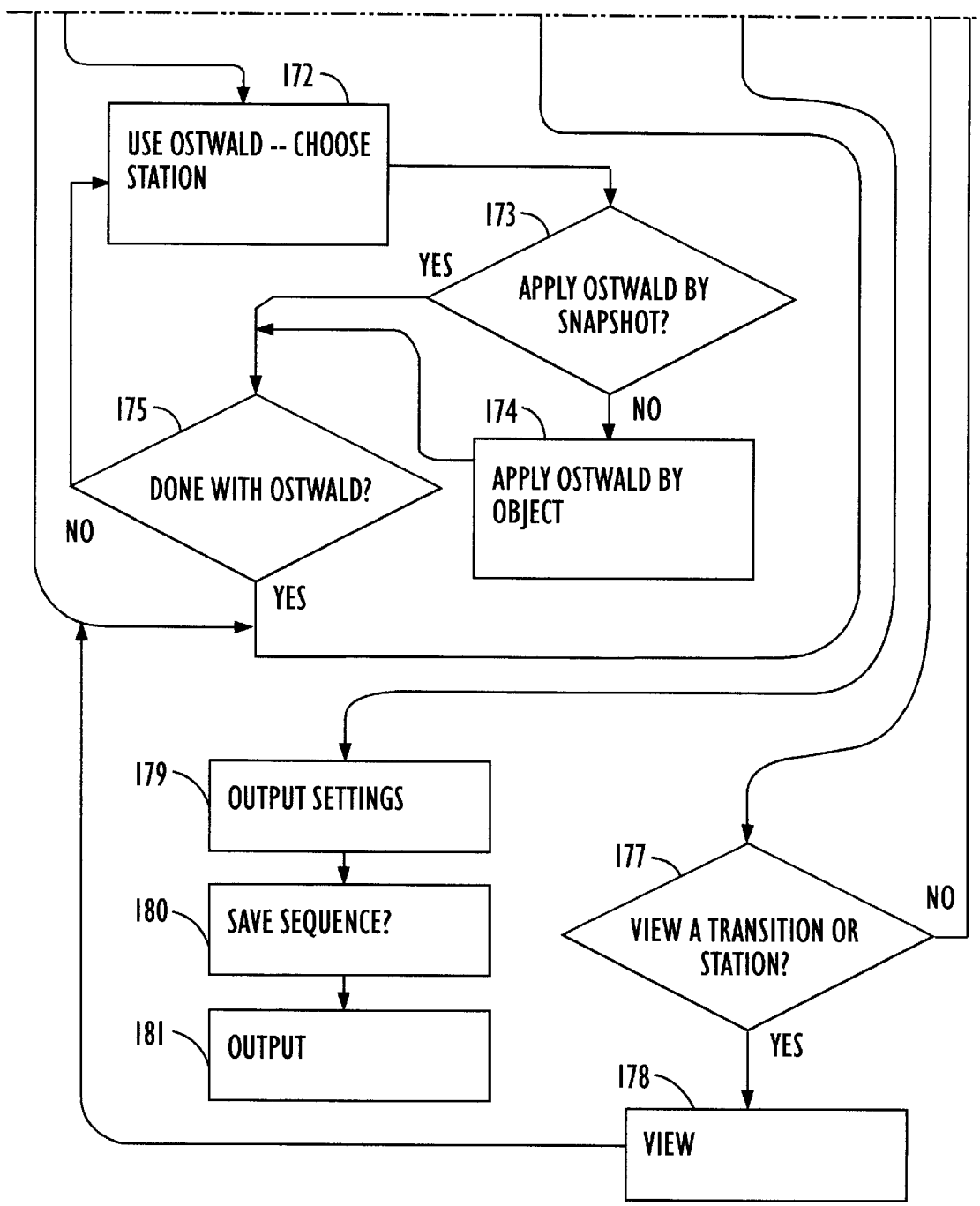
Figure 19A:
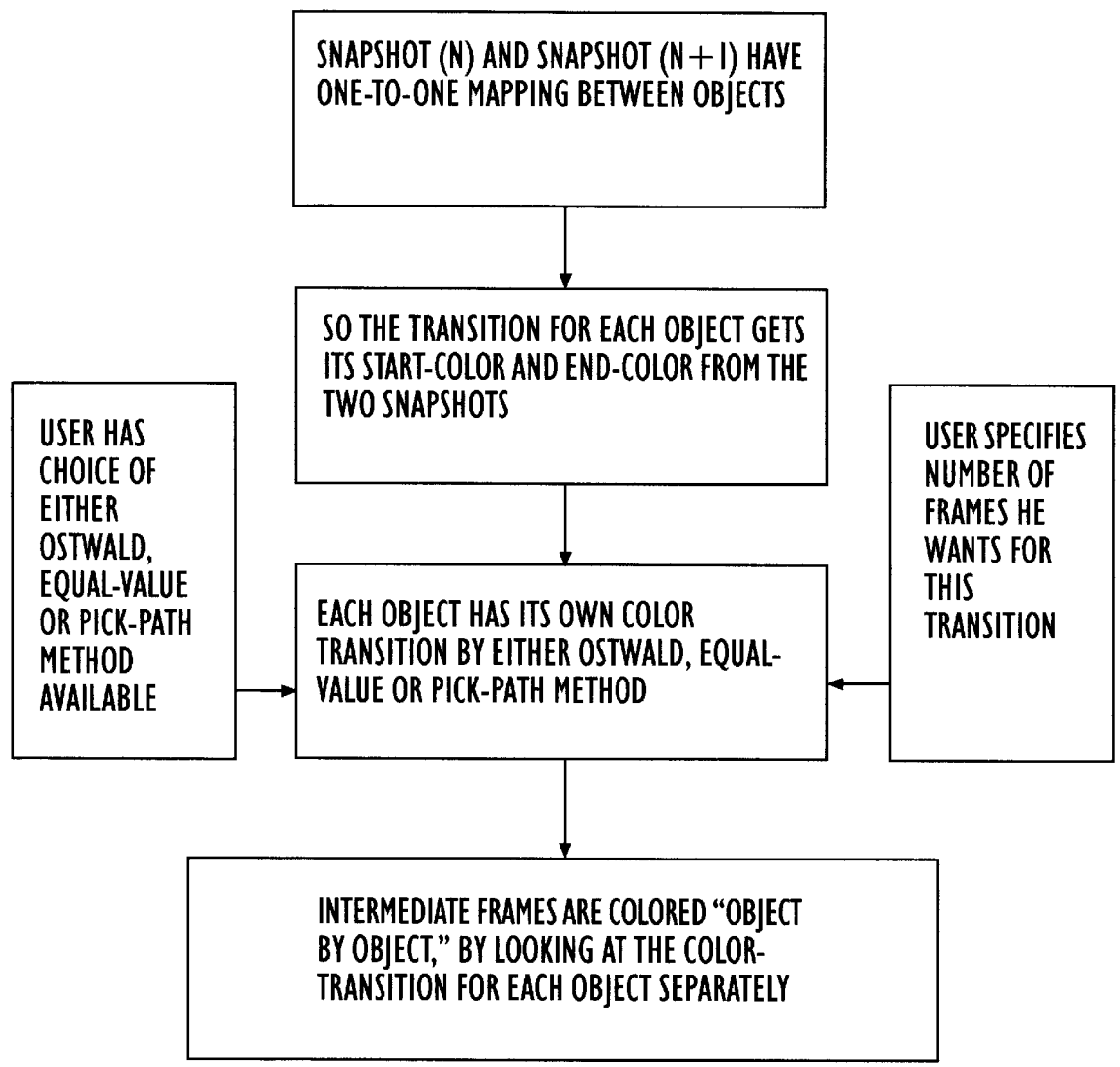
FIGS. 19A and 19B are respectively related diagrams showing the coloring of snapshot-level object transitions, and showing the distinction between station-level color transitions and snapshot-level color transitions.
Figure 29:
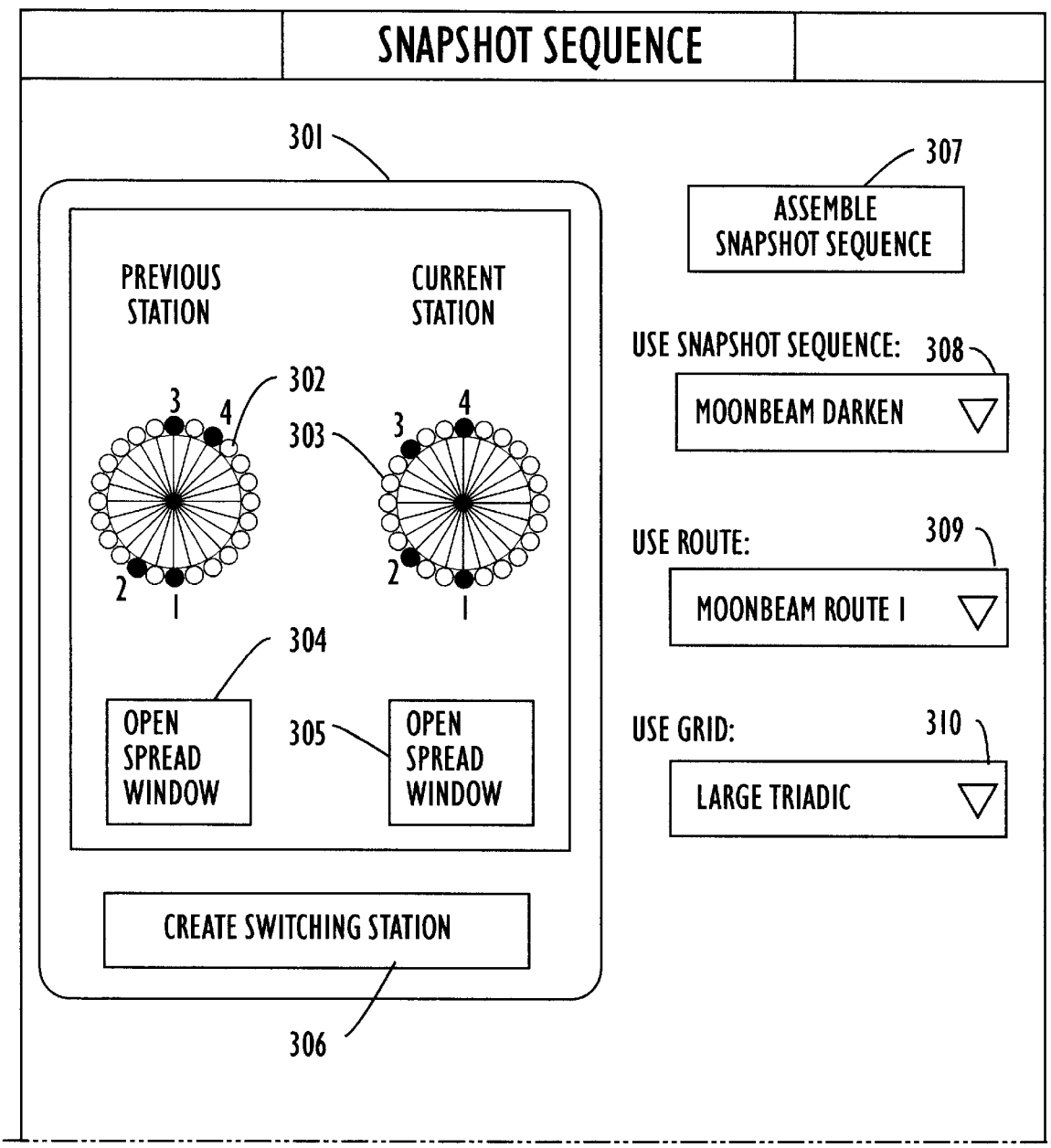
FIG. 29 shows a snapshot sequence interaction window.

The "pick-path" color change window is shown in FIG. 11 and is one of the options available for creating a color transition for an object. The other options, which are available for creating color transitions for individual objects or for entire snapshots, are shown in FIGS. 19, 19A and 29, and are explained later. The pick-path method is a method for more exact control over the color transition of an object and is shown in FIG. 11 as it would be used for one selected object, as part of the total color transition in going from the coloring of one snapshot containing this object to the coloring of another snapshot containing this object. Thus the selected object named at 58 has its start color and its end color for the complete color transition identified by P1 and P6 in the color path line 61, these being the colors the object has in the two snapshots. These two colors are given by the two snapshots identified at 57, and this complete color transition represented by the color path line 61 is divided into segments with each segment accomplishing the color transition to or from an additional picked color. There are no restrictions upon what colors these additional picked colors may be. Thus the bracketed segment of the color path line between the picked colors P4 and P5 is shown being worked upon, with a starting color 59 (P4) for the segment and a similarly identified ending color 60 (P5) for the segment, with identified hue and black-white content. These colors are displayed at the ends of the respective P4-P5 (bracketed) segment transition path into which a sequence of linkage frames is to be inserted for color transition. Also these end colors are displayed (in value if so chosen) in the diamond display 55, 56 and also on corresponding color chips 59, 60. The color transition sequence is shown by various segments along the color path line 61. The span of color frames is displayed approximately on the frame line color array 62 for the overall color change sequence in the entire path, which includes the bracketed path segment portion being created in this example. The bracketed path segments to be processed may be selected in variable lengths for encompassing a desired number of frames.

Thus the entire color transition from P1 to P6 on the color path line 61 is accomplished by the cumulative work of the segments of the color path line. In the example shown, there are a total of six colors along the color path line 61 because the user has picked four colors (P2, P3 P4 and P5) which the object will pass through in going from the start color P1 to the end color P6. The start color P1 and the end color P6 were not picked by the user but rather are given by the snapshots identified at 57. The collection of standard colors is presented to the user by means of the displays 55 and 56, whereby colors are picked to be placed on the color path line 61.

The value/Ostwald selection button 63 controls the manner in which the color transition for each segment is handled. In either case it creates a continuous color transition for the segment from its start color to its end color, which can be as finely incremental in change as the user desires, with this continuous color transition sampled according to the number of frames specified for the segment. When value is selected at 63 the transition path is guided by this dimension of the start color and end color, crossing the color space accordingly, and in particular making any changes of hue according to value. When Ostwald is selected at 63 the transition path is similarly created across the color space from the segment's start color to its end color, but with the color transition path created now according to the Ostwald dimensions of white content and black content, and in particular making any changes of hue according to Ostwald locations. It should be noted that this choice of method, using either value or Ostwald dimensions, is also presented to the user in other functions, as with regard to rotation and the use of the anchor pattern grid, and is generally available whenever a change of hue is made.

Figure 19B:
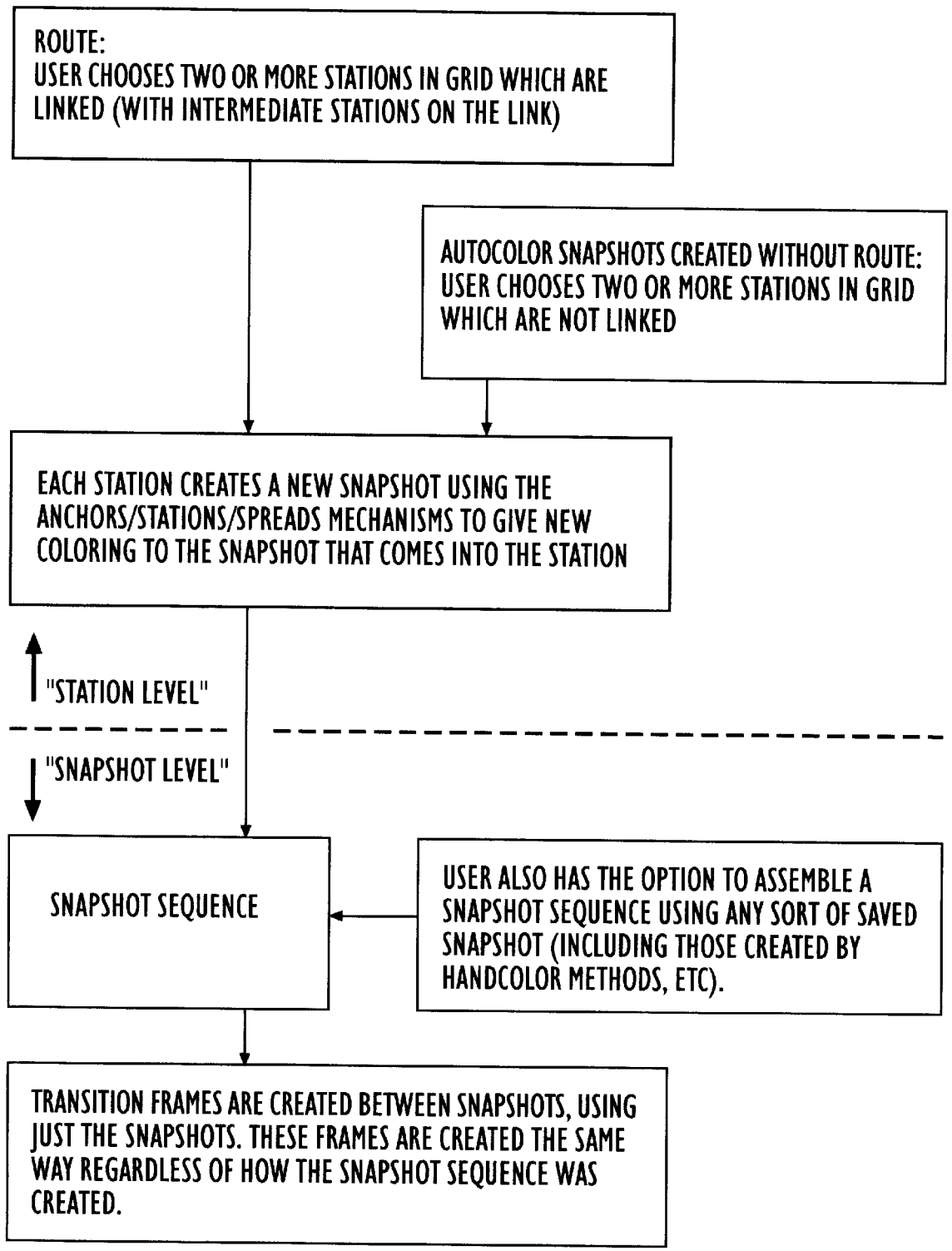

The image object being processed in the pick-path color change window of FIG. 11 will be colored through a set of intermediate coloring frames which are snapshots providing a smooth transition color between the beginning and ending snapshots. The color transition from P1 to P6, or any of its segments such as the example shown from P4 to P5, can also be saved apart from its current object for application of another object. These are color transitions of a single object of an image, as compared to transition color image sequences stored and associated with a particular anchor grid pattern (FIGS. 4 and 5) for possible later selection and use in automated development for linkage paths for changing coloring encompassed in several color groups simultaneously. These coloring procedures will later be described in more detail. In general the transition color image sequences stored and associated with a particular anchor grid pattern are created at a broader level than the continuous color-change transition between snapshots, as shown in FIGS. 19, 19A and 19B. The continuous color-change transition from one snapshot to another can be applied to the sequence of snapshots which results from the use of a particular anchor grid pattern, thus giving a smooth continuous color change between successive snapshots.

Figure 12:
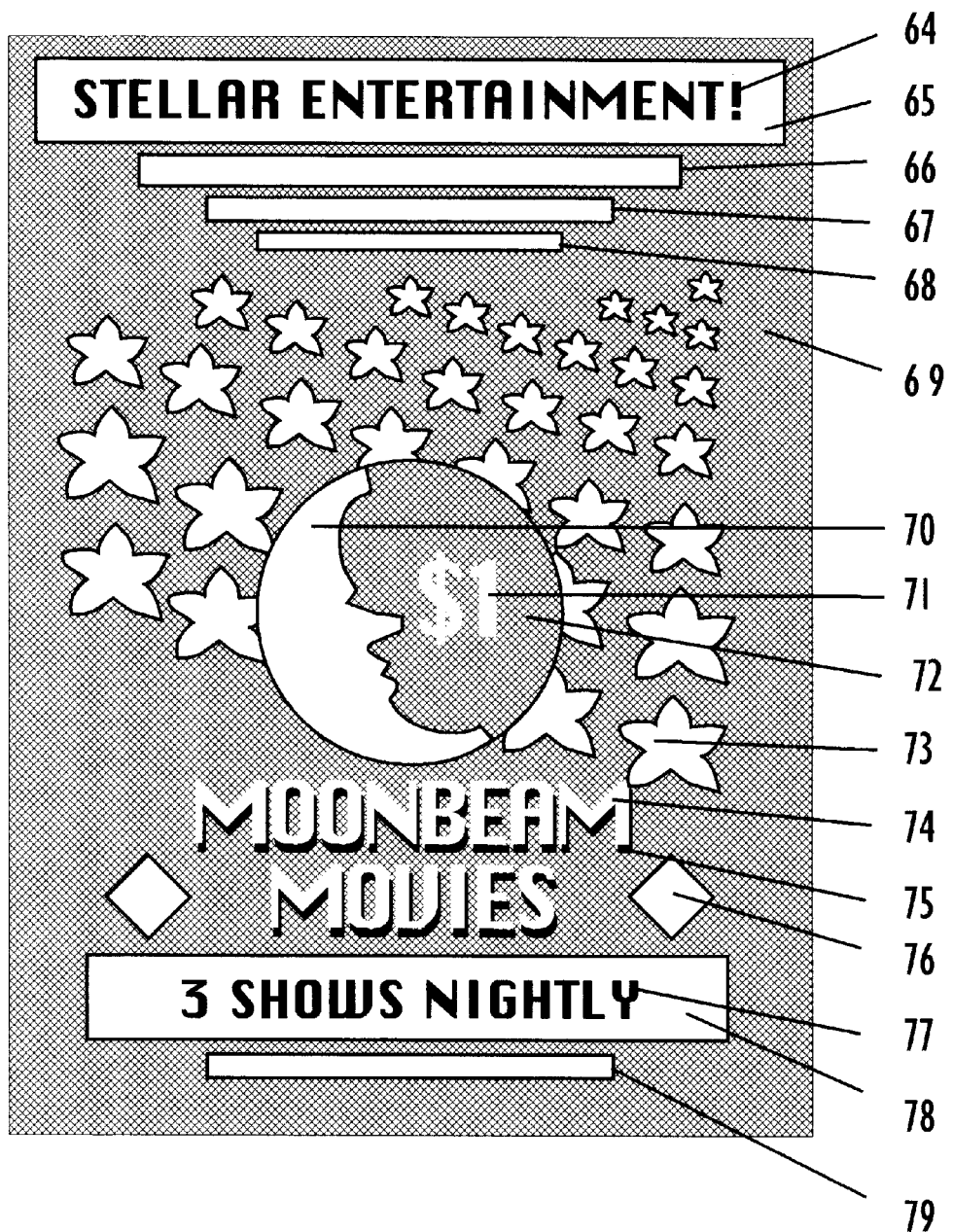
FIG. 12 shows a representative colorless template image pattern identifying a collection of isolatable objects.

The image embodiment of FIG. 12 illustrates how an image may be broken down into separate objects for separate live processing of colors and color changes. Thus each of the areas 64 to 79 are identified as image objects that may be isolated from the image for independent live color processing. The objects of a particular image are defined in the relation matrix when snapshots of objects are color processed and stored.

The following table typifies the individual objects presented by this image:

---

64-"STELLAR" lettering
65-top panel
66-bar #1
67-bar #2
68-bar #3
69-main back panel
70-moon face
71-"$1" lettering
72-dark side of moon
73-all the stars
74-"MOONBEAM MOVIES", lettering
75-"MOONBEAM MOVIES", shadowing
76-pair of diamonds
77-"3 SHOWS", lettering
78-bottom panel
79-bar #4

---

The coloring of objects in autocolor mode is stored as a snapshot which has an image template identified with its corresponding objects, and the color characteristics and processing criteria for automated processing of these.

Figure 13:
FIG. 13 illustrates a "vary 8" viewing window with a central active live colored image snapshot surrounded by eight snapshot color variations, for permitting the user to view other color patterns available for exchange with the active snapshot or for saving.

Snapshots are available as shown in FIG. 13 in a special display identified as "vary 8". Here, the central snapshot image is live and directly connected to associated "vary 8" color control software and other controls (shown in FIG. 10). All of the color changes interactively made upon the central snapshot will affect all eight variations. Then any one of the resulting variations can be saved and can be clicked on to replace the central live image. Thus, repeated changes may be made under visual control of the interactive operator until a desirable final coloring is achieved in the vary 8 mode of operation provided by this invention.

Figure 14:
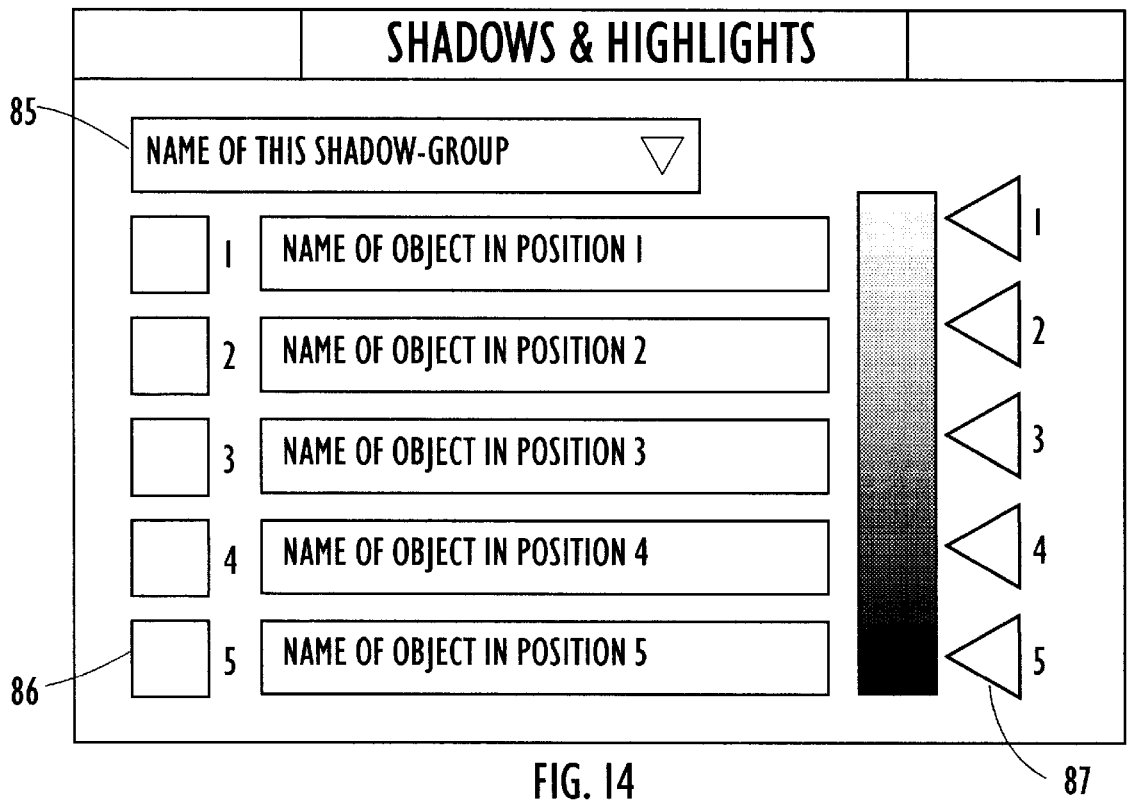
FIG. 14 shows a shadows and highlights window with ordered shadow group relationships between five selected objects that will remain frozen in the selected order throughout color changes automatically made in the automated color engine mode of operation provided by this invention.

In the shadows and highlights window of FIG. 14, a particular shadow group which the user wants to see from a list of named groups is ordered at interactive box 85 with successive names in the list being observed in sequences as represented by the down arrowhead. The objective is to put the objects in a live image into an ordered shadow group with a lightness-darkness ranking reflected in the relation matrix. Thus, the shadow group order remains while other changes are made to the coloring of the image in the automatic coloring mode. The boxes 86 show the current color of each of the objects in the shadow-group. The triangles 87 point to the current hues of each of the objects in the shadow group, which are displayed in a descending relationship of value. That is, the object in position 1 is lighter than the object in position 2, etc.

Figure 15:
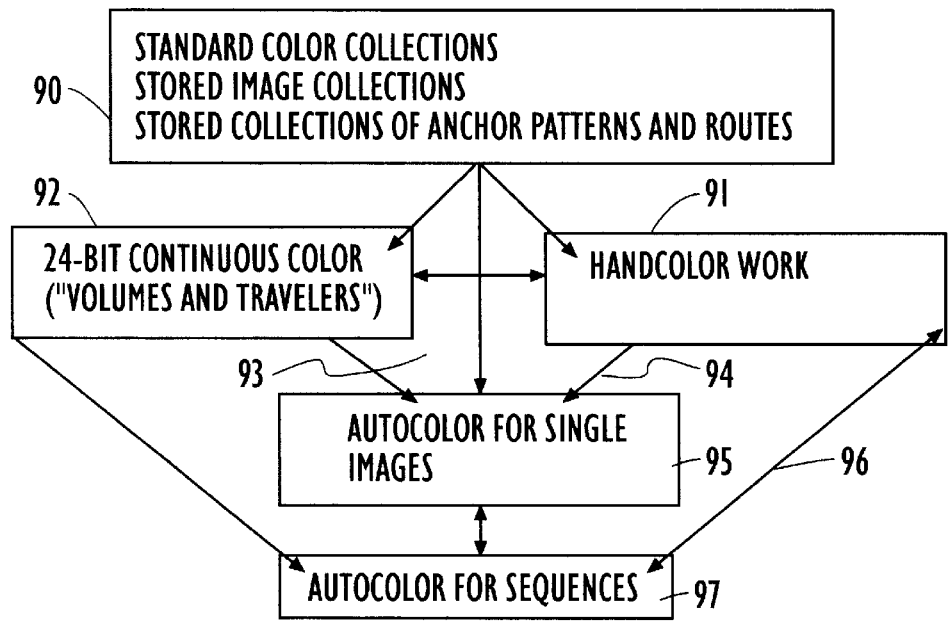
FIG. 15 is a general block diagram illustrating basic operating system features afforded by this invention.

The system block diagram of FIG. 15 illustrates the generalized system functional organization, which includes both "autocolor" and "handcolor" modes of operation. In this system a template, which is the image of one or more objects without coloring, can be viewed, colored and its coloring saved as a snapshot in either handcolor mode or autocolor mode. Snapshots can be saved in handcolor mode without having any associated relation matrix tag. In autocolor mode coloring can be saved as a snapshot for automatic processing as directed by its associated relation matrix tag. Thus in autocolor mode the snapshot identifies the template together with the coloring characteristics tied into the relation-matrix "intelligence" tag used in the automatic color processing. The appended relation-matrix is later described in more detail. In general it can be changed or updated either by the user or by automatic subroutines.

The sliders (FIG. 10) comprise color controls for interactively establishing color characteristics such as value and legibility for the entire image or parts of it. A single template can have different relation matrices for a series of saved snapshots. For example the FIG. 12 image represents a template with several objects each of which may have a different color.

One mechanism by which stored anchor patterns are interactively monitored and selected is the grid of stations (FIGS. 4, 7). This permits coloring patterns at any station to be selected for correspondingly coloring a live image being processed. In the automated adoption of coloring patterns the different stations are visually displayed in anchor pattern icon format (FIG. 3) for intuitive recognition of coloring. Thus a user may click upon a station in an anchor pattern grid network while processing a live snapshot and adopt the coloring of that selected station, thereby producing a new live color pattern, which can be stored as a further snapshot, if desired.

Color changes can be made in the autocolor mode employing the (Ostwald) hue wheels (FIGS. 9–10) for rotation of hue pattern sets. Corresponding color changes are automatically carried out, including updating of the identification tags of the relation matrix, for the live snapshot. When an anchor group has colors changed, that is different from rotation of the anchor group colors as a whole about the Ostwald hue wheel, since the central hue of the image stays unchanged and one or more satellite hues is changed. Thus, only some of the colors for the anchor group might be displaced by new hues. Furthermore, the spread dimension can cause the spacing between hues to be compressed or expanded.

Another automated function relating to the vary 8 window (FIG. 13) changes image colors in a manner affording intuitive and successive coloring approximations under control of the interactive operator by way of transferring different coloring patterns into a live snapshot.

Of particular interest are the continuous color-change methods shown in FIG. 29 identified at 314, of which the pick-path color change mode (FIG. 11) is one option. The essence of these methods, with regard to creating new intermediate snapshots, is that between two given snapshots a number of intermediate snapshots called frames can be introduced for incremental changes in coloring, and the entire resulting sequence of snapshots may be stored as a linkage sequence for further automated coloring changes. It is noteworthy that the linkage sequence does not need to be stored as a sequence of images but rather can be stored more economically as a set of instructions for applying color changes. This process may convert a "jumpy" color sequence of snapshots to a seamless color change sequence produced by added intermediate coloring frames to create smooth color changes. For automatically creating sequences of snapshots, stored routes consisting of linked anchor pattern stations may be selected and used. There need not necessarily be any intermediate stations between the linked stations. The resulting sequence of snapshots again has the advantage that it does not need to be stored as a sequence of images but rather can be stored more economically as a set of instructions for applying color changes which are done at the time they are required. The sequence of snapshots so generated can be used as the basis for generating automatically a continuous color change sequence with less activity by the user, by simply identifying a snapshot at the beginning of the route and the stored linkage to be adopted.

As shown in the general FIG. 15 system by block 90, a collection of image anchor patterns and routes, with associated standard color collections, and images (including relation matrices) are available from storage. Such data are made available for color processing of live images via either handcolor work 91 or autocolor 95, with continuous color processes 92 available for either mode and with sequences 97 as an additional automated method. Stored collections of anchor patterns and routes are used only in autocolor mode. The use of the volumes and travelers methods at block 92, together with either Ostwald handcolor methods at block 91 or automated methods at blocks 95 and 97 allows the incorporation of arbitrary colors and continuous color ranges into these methods. Creative choice of methods is enhanced by the ability of the user to rely upon either automated or hand methods as indicated by the paths 93. Also the transfer between handcolor work at 91 and autocolor (95, 97) is available at links 94 or 96 in either direction for both single snapshot images 95 and for automatic color sequences 97 of several snapshot images. During the automated procedures of "autocolor" the relation matrix is updated automatically when necessary in the process. There is no relation matrix involved in the handcoloring procedure at 91. Thus, an excerpted image may be withdrawn for editing, reproduction or recoloring without adopting automatic subroutines.

This computerized system simply processes, arranges and views colors in abstract notation and adapts for further automatic processing of image colors. The general purpose color change engine of this invention thus is useful for various applications ranging through the creative choice of color patterns, still picture coloring, and cartoon animation, with advantages over all traditional foregoing methods. The interactive operator remains visually conscious and in control but is spared the tedium of interactively entering the transferring details by adopting previously stored coloring patterns. Standardization attributed to the color collections for various color gamuts provides patterns of proportionately spaced color samples available for conversion into other gamuts with equivalent standardized proportionately spaced color samples.

Specific novel automation steps are important, such as the controlled processing of the values of each image object in a manner assuring that color changes do not cause corresponding changes in value. Also legibility of lettering is maintained automatically as coloring changes. There is considerable advantage in visual imaging of anchor pattern icons, etc. to facilitate the computer processing functions and maintain an environment in which the interactive user can intuitively visualize the colors, color changes and the coloring process steps.

The system diagram of FIG. 15, together with the following figures exhibiting in more detail the processing steps and accompanying computerized technological advances in the art, thus portray the comprehensive automated computer engine coloring system afforded by this invention. That system can be characterized as the implementation of an interactive color processing computer operating system that processes standardized color collections relating to different color gamuts through novel interactive and automated color processing indexed by an Ostwald type color step sampling system capable of producing a substantially infinite selection of color samples.

Representative novel system features include the abstract definition of the live snapshots in notational format for identifying color characteristics in separately processable form from the image template serving as processing protocol for automated interactive coloring procedures. Also the images being processed are visually reproduced in novel abstract icon notation format identifying colors, color groupings and color networks in interactive windows. Novel interactive computerized features include automated subroutines for sequencing linkage routes between two differently colored images, the selection and automated retention of image value levels as colors change, the isolation of individual objects in images for independent color changes with the freezing and unfreezing of individual objects for processing in a live snapshot image, and the automated chunk substitution of color changes en masse by reference to stored coloring patterns.

Before getting into the more comprehensive system details, consider coloring of objects displayed in the image of FIG. 12 for better comprehension of the mechanisms automated by this invention. Imagine that the "man in the moon" has a pale orange crescent silhouetted against a medium blue background circle. If the image should be a little darker, the orange may become a deep orange within a dark blue circle. Visual continuity is maintained while making such color changes.

To visualize the power of processing simultaneously combinations of several colors, the spacing of corresponding hues around the hue wheel circle provides visual reference. If desired, such spacings of selected colors may be maintained with visual continuity in the process of rotating selected groupings of hues in unison about the hue circle. Changes in coloring of a live image follow in response to selection of different hues. Individual manipulation of a single hue or sub-groups of excerpted hues from groups of hues, also becomes feasible. Thus, a new hue could be selected by replacing an orange hue with a yellow one, or by changing just the blue colors to purple, etc. in development of color pattern groups. The hues can be changed with other color characteristics of the image such as value or legibility frozen to remain the same. Such color changes are selectable interactively while providing visual color monitoring and significant parts of the color change process are achieved automatically. For dynamic color change sequences, the color transition in the image may be seamlessly controlled to avoid jumping around or introducing false colors or gray. Images are provided with a common reference "handle" such as an anchor hue for simplified indexing, viewing and controlling of groups of colors.

Now with this invention, if a designer wants to spread the group of colors and add hues to the original orange-blue coloring in some basic way, such as making some orange objects yellow and some of the blue objects purple and other ones of the blue objects to a different shade of blue, there is still continuity with the original coloring, even though individual colors of a color group may be modified. Color spreads operable on the objects of an anchor group can create satellite hues spread about an anchor hue which are controllable and automatically adjustable to receive substituted different color groups within defined spread characteristics. This contributes to control over continuity of color changes in a variety of situations, even when drastic changes are made.

Group continuity and automated control features operate with a basic internal dimensioning system, as reflected for example by related anchor groups anchored to a handle defined by a single central anchor hue reference. The satellite hues about the anchor hue can be expanded or compressed within the anchor group as specified by subsidiary spread dimensions. The anchor hue is a basic notation and implementation means that can introduce order into the handling of thousands of different hue combinations, and simplify the management of storage and need not even be an actual hue in the image. Color groupings can be visualized in icon format fashioned as a part of a hue spectrum wheel skeleton, and used for referencing and building a framework and complete notation of actual hue groups. Thus abstract shorthand notation and visible icons simplify computer processing relationships and provide intuitive visual color recognition to users.

In our moonbeam example, now assume that the orange and blue are complementary anchor hues of two anchor groups, and that the notation (0,12) identifies the anchor pattern dimension abstractly identifying the number of Ostwald steps about the color wheel. To more completely define the hue pattern, one of the hues is identified as the central anchor (1). That central anchor is notationally located in the visual hue pattern (FIG. 3) at the six O'clock position on the Ostwald color wheel skeleton icon.

Additional hues spread about an anchor hue are termed satellite hues, which are tethered to the anchor hue, and may be represented as an anchor group positioned within spread brackets (FIG. 6) defining a given span of the hue spectrum.

An anchor pattern level defines the number of anchors in any particular anchor pattern, which might typically have one, two, three or four anchors. For example an anchor pattern dimension with three anchor hues may have a pattern dimension (0, 8, 16), wherein each anchor pattern dimension will include its own spread dimension.

Such novel abstract notation with companion visual representation comprehensively defines a wide range of color combinations in a manner that is computer friendly and artist friendly, keeping the user visually and intuitively aware of the color schemes being processed. The notation constitutes indexing handle which permits any conceivable hue pattern to be located, systemized, efficiently stored, moved through the system and processed by automation subroutines. The corresponding anchor pattern grids and grid stations have been explained (FIG. 7). In all such processing the hue pattern is the primary dimension that is first recognized before any other evaluations, color decisions or dimensions are processed.

The anchor patterns and anchor grid networks are functionally the heart of complex color processing automation procedures provided by this invention, where combinations of colors may be replaced or inserted in chunks taken or derived from other stored images and anchor patterns for application to single or multiple identified objects in snapshots of a live image being processed. The anchor pattern also appears as an icon display for the user to visualize by hue combinations the effects of changing colors as the artist seeks to find creative coloring patterns. Icons also serve as a shorthand medium for directing the user to make changes in the image by automatic replacement of new color patterns into a live image, with the system automatically supplying default dimensions and most of the processing details. Also the grids constitute a library of anchor patterns which can be perused or drawn from to institute a color project, and provides an immediate clipping function for application to live images being colored.

Also unique is the anchor pattern grid's dynamic nature that permits and facilitates motion. With this feature, entire sequences of hue pattern changes become feasible substantially automatically. Thus in the grids, a sequence of coloring steps between nodal stations is defined as a linkage thus being capable of creating a sequence of snapshots that can be automatically recalled and used to produce a continuous transformation from one combination of colors to another. Linkages between stations which have no intermediate stations can also be created, allowing the user to also create routes which jump from one coloring to another. Thus the combination of route methods with continuous color transformation at the snapshot level permits the user to simply identify the route of anchor patterns and "automode" does the rest. Yet the user may creatively intervene, at a number of different levels if desired, to interactively define, create or refine color-change sequences. This is an idealistic method and system for establishing routes constituting seamless sequence changes for such dynamic image color changes such as the ripening of the cherries or the heating of a blacksmith's sword to white heat. The automated color change engine of this invention thus produces simplified abstract skeletons that can be hidden in small storage closets for use to construct color combinations as desired.

Figure 16:
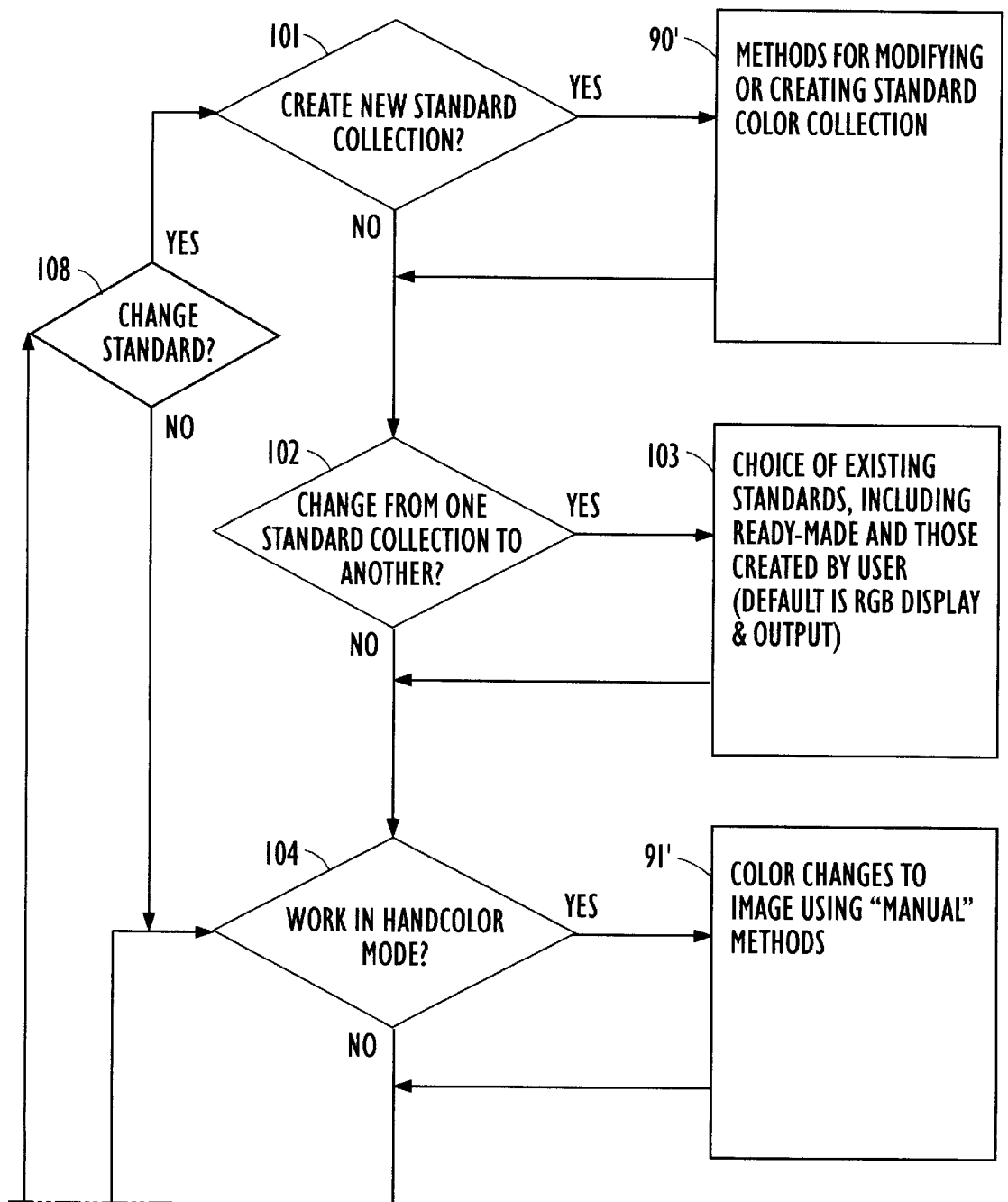
FIG. 16 is a general functional block diagram illustrating typical automated color processing features afforded by this invention.

Now the overall block diagram illustrative of the autocolor mode of operation set forth in FIGS. 15 and 16 demonstrates the functional and system interrelationships for implementing automation with the foregoing notational and functional advantages. The main parts of the general block diagram of FIG. 15 are the stored color image and anchor pattern collections and the standard color collections corresponding to different color gamuts in block 90, the continuous color spectrum process 92, the option to use either the handcolor mode 91 or the autocolor mode in which either single images 95 or sequences 97 are processed. Similar features are identified by primed reference characters in FIG. 16 for facilitating comparison in that more detailed function diagram.

The standard color collections of block 90 are tools used to process and display standardized color samples for different color gamuts arranged in the proportionately spaced color sample niches of Ostwald notation as provided by the invention. Thus, consider the Ostwald hue circle diagram of twenty four hues in FIG. 8, having the auxiliary Ostwald color diamond displaying two substantially complementary color triangles meeting at a vertical white to black shadow line. Each triangle provides twenty eight colors which are ordered to indicate black and white content of color samples incorporating the designated hue. Thus a total of 680 color standards is basically defined for which corresponding color samples may be produced visually. Each of the independent color niches is defined and stored in an associated standard color collection of recipes for different color gamuts, such as to reproduce images on either the RBG phosphor of the computer screen or on the CMYK ink printout of a color printer, for example.

Thus, a pure turquoise in the RGB recipe format would be R=0, B=100, G=100, and its value is about 0.70 with black being 0 and white 1. However in a corresponding standard color collection for a CMYK printer format, turquoise would be C=100, M=0, Y=0, K=0 with a value of about 0.55, etc. Note that the value is lower since, when printed with inks, turquoise appears darker than when viewed from phosphor transparency emissions. Thus, the standards (recipes) for a printer would be different than those for a computer screen and found in a separate collection. In this way each of the available color samples is reproducible as a standardized visible color proportionately spaced in the corresponding color gamuts and visually reproduced during computer processing in the Ostwald format. Note that each standard color collection for a particular color gamut includes a color value magnitude component for each color sample, thus providing the capability for automatic control of value as a novel feature of this invention.

In FIG. 15, input block 90 identifies the availability of the standard recipes and further sources of information such as stored image collections; anchor patterns and routes ready for processing in the automated color procedures offered by this invention. The stored image collections may comprise a collection of input image variations having different colorings, objects formed from templates, different templates, etc., all put into snapshot format with accompanying relation matrix (for autocolor work) and stored in a manner permitting selection and use of the individual snapshots for both hand processing and automated color change procedures. The stored collections of anchor patterns and routes are used in the color engine of this invention for instituting the automated procedures relating to the use and control of the features set forth in FIGS. 3 to 7, for example.

The two way communication lines 94, 96 indicate that the handwork coloring may be used on images interchangeably with automatic color processing subroutines afforded by this invention. Either single images or sequences of images for dynamic color changes may be produced and colored. The communication lines of complex 93 show various interchange paths between the blocks for instituting processing and coordinating functions.

With reference to FIG. 16, note that there are options for the continuous color change sequence following block 97' for choosing either the pick-path or the Ostwald or the equal-value color change options at block 100 for introducing continuous (seamless) color change. In this manner continuous animated color change from one snapshot to the next may be created or copied. Particularly with the provision of arbitrary traveler colors, and the ability to specify a desired number of transition frames in a linkage, discontinuous color jumps can be avoided as an image dynamically changes from one coloring to another. Jumps may be filled in if desired and a sequence of intermediate frames adopted as desired to achieve seamless dynamic sequencing automatically from stored linkage patterns. These comprehensive dynamic procedures permit both transition work on a single image object, or the processing of color change routes for entire image colorings which may involve several groups of colors.

For creating a new standard collection 101, the standards library (90') may be consulted and used either in the same form or for modification. The changing from one collection of standards to another, such as for printing out an image being viewed on a monitor screen, is achieved at 102, including the option of choosing existing standards at 103.

To avoid complicating the understanding of this invention, the obvious steps clearly within the present ordinary skill of this art are omitted, such as the entry into the automatic color mode or the selection of interactive routines from windows such as set forth in the drawings. In actuality the user could enter automode and start work at any one of the several stages 101, 104, 105, or 107 after opening an image for live processing. Thus, the unnecessary subroutines can be bypassed, such as by going directly into 107 with a desired snapshot, and thereafter exiting at 95' to return to the change'standard branch 108 for entering the handcolor loop through box 104 and further processing by entry into the autocolor mode at 105 where manual methods are also available at 91'.

Another basic loop for working on successive snapshots all using the same standard, may be entered at block 104 to proceed through blocks 105, 107, 95', 97', 100, and 108.

One typical loop enters at block 108, passing through block 101 and then sequencing through blocks 102, 103, 104, 105, 107. This could occur when the same image is kept with colors unchanged but the image is to be output to a different reproduction device. When this occurs, the same image is kept with colors unchanged, but the image is output to devices by reference to different standard color collection recipes. For example, consider that a promotional image is to be printed on napkins and a plastic cup printed with plastic ink and also is to be displayed upon an illuminated sign. Each medium may require a different standard color collection.

This FIG. 16 system and method thereby functions in a variety of modes. Thus, a new standard color collection may be created, or existing standard color collections may be modified, for example. The standard colors can be measured and reproduced by use of a spectrophotometer, or "recipes" may simply be created by visual observation on the monitor screen. For example, a sign painter may wish to match the standard as closely as possible with his sign paints, using his eye to derive the appropriate colors, and then he records the standard as a formula for his colors. The standard then could be used to correlate the sign with various other types of media using different recipes to match encountered dyes, hues and color coordinates.

Color editing or creation of a colored image by interactive artwork is achieved by creating or recalling a snapshot and importing it into the manual coloring mode 91' for visual observation and coloring.

Simplification of manual coloring may be achieved by taking advantage of automode color intelligence that is automatically carried with the colored image snapshot and its appended relation matrix. This may save a myriad of operator manipulation details, and retains standards isolating them from the subjective whims of operator adjustments, etc. Within the computer, color processing takes place abstractly based upon visual reference to the color combination icons which deal simply by shorthand with color combinations in a notation that can be related to color changes in live images being processed. Snapshots may be saved at any time, and stations in an anchor grid can be related to other stations by intermediate linkage steps. Color jumps may be made between related color groups by way of anchor grid patterns which provide a medium for automatically generating all the intermediate steps for a complex color change of various groups of colors. A selection of a simple or combined mode at 110 for autocolor permits the processing of a single coloring function at a time to creatively alter any part of the coloring. However, the combined mode takes advantage of complicated internal automatic processing mechanisms of the color engine, handling several color relations or dimensions simultaneously while following the protocol rules built into the loop software, and avoiding many problem situations. Automated alerts and suggested color changes may be incorporated to guide and/or train the user and to monitor coloring for defined protoccl conditions.

Figure 17:
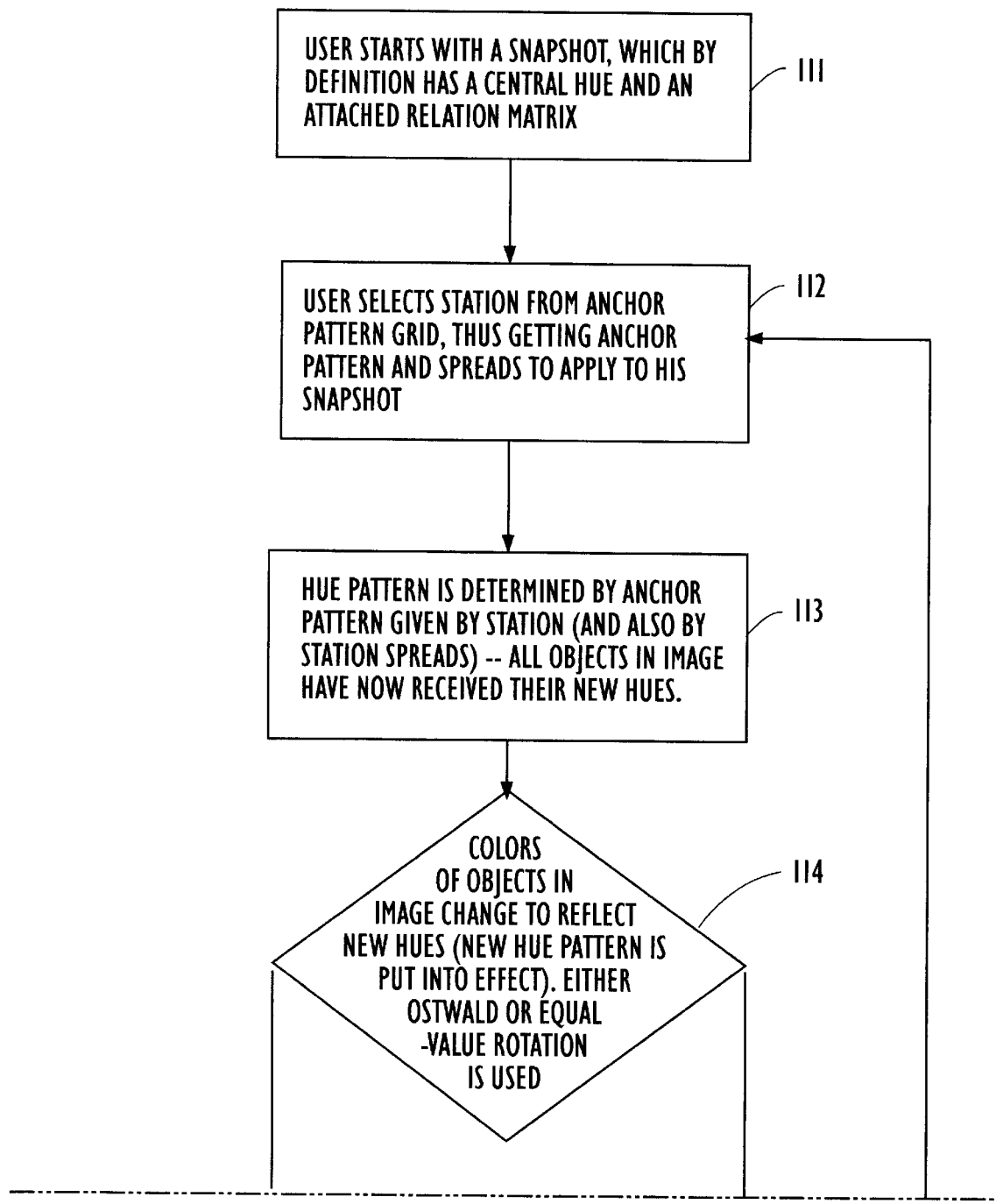
FIG. 17 is a functional block diagram of the autocolor block region of FIG. 16, showing automated operation steps in more detail.

The FIG. 17 block diagram generally relates to the autocolor mode of operation for coloring or recoloring images. The user can introduce one or more snapshots at block 111, either imported from stored snapshots or from other sources such as a color image reader or incoming floppy disc. A newly entered image may be initialized to attach the relation matrix intelligence, by manual or automated steps provided in the accompanying software. The intelligence is then retained as an inseparable part of a snapshot in autocolor for further automatic or semi-automatic color processing through the system, such as indicated by blocks 112, 113 and 114. The unfrozen live image objects are reworked, typically in chunks of one or more objects such as illustrated in the FIG. 12 image, as defined in the relation matrix. The live and frozen portions can be changed in progress by the color control procedure, either manually or automatically. Then the snapshot with a new relation matrix or dimensions updating the rework may be saved at block 115 if desired with its attached relation matrix either before or after coloring work at boxes 116, 117 and 118.

It thus is evident that the present automated color engine has the capacity and flexibility to accomplish the various functions of hue coordinate selection, color editing and artistic creation more expeditiously and uniformly. All snapshots may be displayed on various output reproduction, systems with simple coordinate conversion steps automated by corresponding computer software. The images are live, creative and enhance the intuitive skills of the user by visual monitoring and observation of the live snapshot images as they are being processed in actual color. Particularly novel is the automation for continuous color change techniques processing a substantially infinite range of colors and seamless sequences with very little operator intervention except to edit jumps and to create or select from stored linkage patterns the sequence of anchor patterns constituting linkage routes between significant anchor pattern modes. Significant advantage is attained by the novel notational processing methods where abstractly in minimum storage space all automated steps may be stored, located and adopted in the automation mode by simple software that controls the color processing independently from any particular image, and therefore permits colored images or sequences to be retained for later use.

Figure 18:
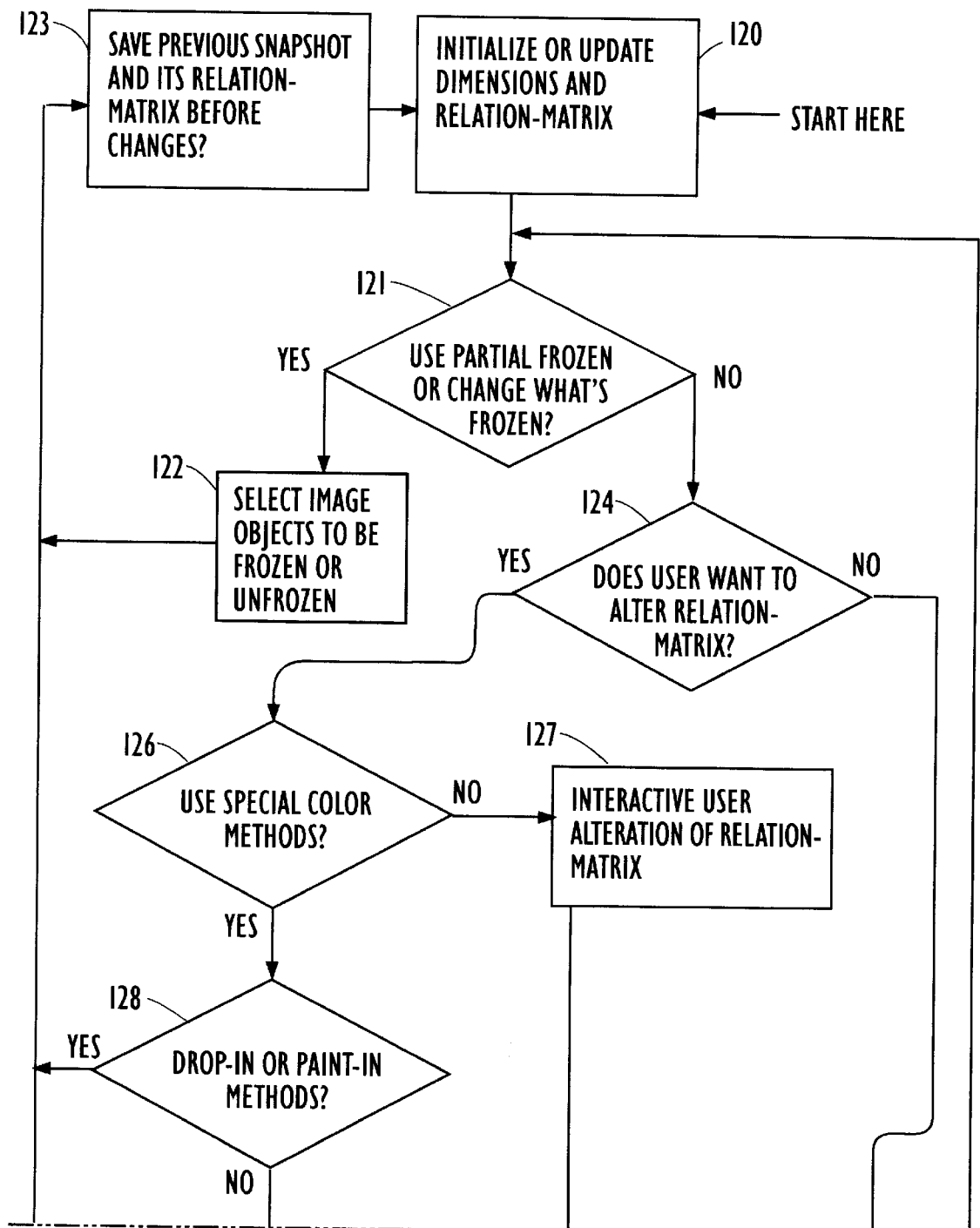
FIG. 18 is a functional block diagram showing the processing of image through typical automatic color processing steps provided by the invention.
Figure 18:
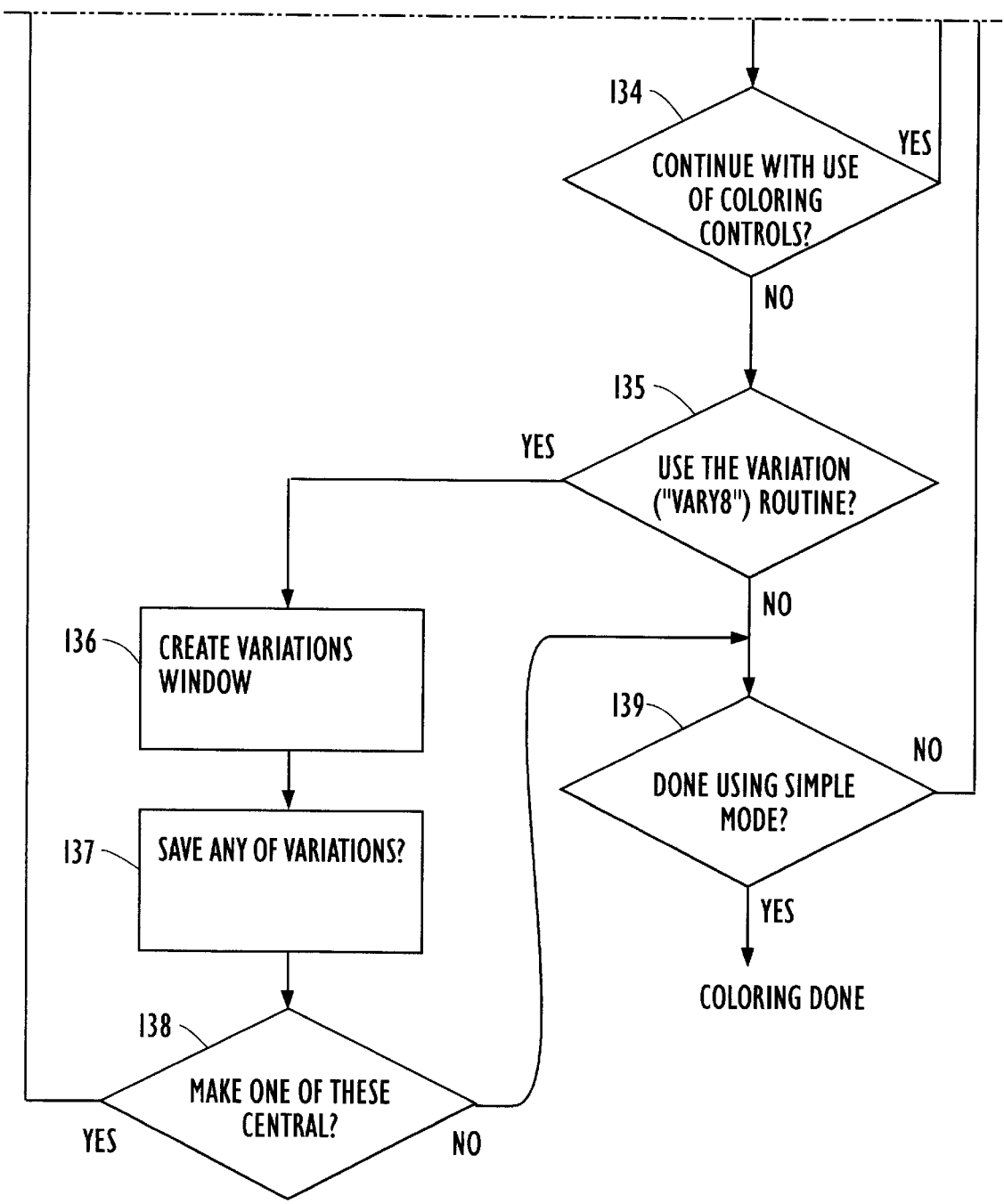

The FIG. 18 block diagram exemplifies various automated subroutine loops used in the image coloring process which is more generally shown in block 110 of FIG. 16. Thus, entry in block 120 starts the automated coloring process by providing the images being processed with original or updated relation matrices. Block 121 identifies the "live" part of the image by means of establishing the relation matrix objects which are frozen, unfrozen or updated in blocks 121 and 122, and saving the snapshot in that format by passage through block 123.

Some automated functions that have the side effect of changing the relation matrix are employed when branching into automatic coloring at block 124. If the user wishes rather to visually monitor and change selected relation matrix entries, then block 126 is first entered with the possibility of either direct manual alteration at block 127 or indirect semi-automatic alteration starting at blocks 128 and those following.

In the interactive processing, procedures available by the use of special color methods are provided in box 126, for example, a "make similar" software subroutine will match the image to another existing image and make the corresponding changes to the relation matrix. The drop-in routine of block 128 allows the user to take a chunk of coloring from another snapshot and simply insert it into the existing image along with the corresponding relation matrix data for the chunk. The paint-in method allows the user to "paint" colors into the image by hand, using an already existing autocolor snapshot as the "palette" for getting colors, and thereby also transferring any applicable color relations from the relation-matrix of the existing snapshot into the relation-matrix of the image being painted in. Thus in addition to transferring colors from an existing snapshot, the paint-in method allows the user to simultaneously transfer color "intelligence" without having to understand or analyze this intelligence, or even look at it. For example, if the user were to paint-in three colors from an existing autocolor snapshot that were in a shadow-group in the relation-matrix of the already existing snapshot, the objects of his new image which received these three colors would automatically be placed into a shadow-group in the relation-matrix of the new image which was being painted in. This "intelligence" would then be in place for further color changes to the new image. Thus the paint-in method allows color "intelligence" to be easily transferred from an existing autocolor snapshot to a new one.

Following this, the anchor groups are made available in block 129 for further processing. Anchor groups are available only in the autocolor mode to thereby afford considerable advantage in the automatic processing of the color changes and corresponding relation matrix intelligence. Here the user can scan selected anchor groups to adopt major image recoloring of objects in the image or the image in entirety. The "flip" routine 129 permits the anchor groups in anchor patterns having more than one anchor group to be rearranged for example by exchanging two of the anchor hues in an anchor pattern having three anchors, while leaving the third anchor at is original hue. Thus the hues of the anchor pattern stay the same, but the coloring of the image changes. By this method the "flip" routine makes it possible to do coloring changes which are related to an existing coloring but cannot be achieved by simple rotation.

The following invert or mirror routines are available in block 130. The invert function has several possibilities, utilizing the Ostwald positions of any hue's triangle half of the color diamond. One inversion changes the Ostwald black-white positions by 180 degrees for every shadow series, making black change to white, light gray change to dark gray, etc. Thus the axis of inversion is horizontal through the pure color apex of the hue triangle. Two similar sorts of inversions with different results can be accomplished by using inversion axes that bisect the white apex or the black apex. These inversions can be applied to only selected colors if desired, and the relation-matrix is modified to reflect any changes in color relations. The mirror function does a positional change of hue using the hue pattern of the image, using any selected hue in the hue circle to provide the mirroring axis for the hue pattern. The selected hue need not be one in the image, and by using its diameter in the hue circle to achieve symmetrically opposite hues, a new coloring can be created which cannot be achieved by simple rotation. Thus these functions easily make possible new colorings that are intelligently related to the previous colorings. The succeeding "flip anchor groups" block allows the user to alter the notation of the anchor groups, for example by designating a different anchor to be the central anchor. Thus a very comprehensive set of color manipulation tools is provided.

When the block 127 loop for user alteration to the relation matrix is adopted, then the user can open to review or alter various relationships such as adding or deleting, creating a shadow group, etc. Thus the user can alter the basis upon which color evaluations and color decisions are made in the automatic mode. If any changes are made to the image, the palette move routine of box 131 is used to assure that the current coloring continues to meet the conditions and dimensions specified. Corrective measures may be taken and verified in block 132 before saving the snapshot in block 133. Any continuing user interactivity is selected at box 134 by returning to the user interactive coloring loop following box 125.

Most of the user's work occurs in the user alteration box 125, where access is given to the hue wheels, the anchor pattern grids, the various sliders and the vary 8 window. These coloring changes modify the dimensions and conditions of the current image coloring, and are evaluated through the relation matrix in the palette move box 131. The palette move routine can even suggest alternatives when impossible conditions or dimensions have been specified.

In block 132, the snapshot is updated to new dimensions. In the simple mode as distinguished from the combined mode, it is not necessary to hold the other image dimensions constant. However, a change in legibility for example can cause a dimension change in value. These changes need to be measured in block 132 and updated in the snapshot format.

When the snapshot is saved at any time, as in block 133, it is attached to the relation matrix which existed at the time that coloring was created. So when the snapshots are recalled from storage the user is able to resume work, and autocolor resumes "thinking" at the same place as left off. The snapshot dimensions contain all the particular colors of the image with their dimensions of value, spread, anchor pattern, etc. Also there is a pointer to the anchor pattern grid and a station where the snapshot resides. Thus the snapshot holds all the facts, attributes and measurements of the current coloring in the relation matrix for this snapshot. This primarily used interactive loop returns from block 134 back to block 125.

Further subroutine loops include the vary 8 routine of block 135 and the variations process of blocks 136, 137, 138, where the variations window is created and variations are saved. In block 138, the saved variation may be;centrally located in the vary 8 window, to create a new generation of variations. In this loop the color control sliders, etc. are available for changing the coloring or relation matrix. When the coloring is done, the live image is saved at box 123 as a snapshot for future reference.

The sequential color change routine is addressed in FIG. 19. This routine is generally referenced in blocks 97' and 100 of the general block diagram of FIG. 16. The essence of this method is that a snapshot gets shuttled from one station to the next through a sequence of color variations as it goes. If at block 152 the number of intermediate frames is set to zero, this creates a simple sequence of discontinuous snapshot frames which may be the desired end result, or which may be used as the basis for further work.

If created using linkages of stations which contain a sufficient number of intermediate stations, this sequence may give an appearance of continuous color transition sufficient for the task at hand. In other cases the jumpiness produced by going directly between dissimilar anchor patterns may be the desired result. If the user desires a seamless color change sequence avoiding visual color jumps and intermediate grayish "fades"this is achieved with a series of intermediate transitional coloring frames created between the snapshots. It should be noted that once created, each of these frames is itself a snapshot. However one of the advantages of the present invention is that all these coloring changes can be economically stored as instructions for color change rather than as created images. In the case of coloring changes which cannot be conveniently created by the means already indicated, the use of switching stations at block 153 allows the user further means to easily control a sequence of color changes. Thus FIG. 19 show the use of, both station-level sequences of color change, and snapshot-level sequences of color change, as is more carefully delineated with reference to FIGS. 19A and 19B.

FIG. 19A is related to block 160 of FIG. 19, outlining the functional steps taken to create the intermediate snapshot frames between beginning and ending snapshots having different coloring. Thus it is related to the pick-path color change window of FIG. 11, shown in block 167 of FIG. 19, and also is related to the other two more automated methods of continuous transitional color change, namely the Ostwald and equal value methods shown in blocks 161 and 162 of FIG. 19 respectively. FIG. 19A applies to all three methods, or any combination of them. It is noted that an image may have several objects with different colors. Thus, each object identified separately with color changes for that object processed independently from other objects and their colors.

FIG. 19B however is related to the grid networks of FIGS. 4, 5, 6 and 7, in which routes between at least two stations are defined. At the station level, either the two snapshots of those stations are created or the entire linkage between the stations with the intermediate stations in the linkage. In addition, switching stations can be used in a route to introduce a new snapshot into the route or to perform alterations beyond the usual station functions on the internal anchor groups of an incoming snapshot when it enters the switching station. The use of a switching station thus modifies the snapshots produced by a route.

The snapshot level follows for creation of the snapshot sequence including transition frames between the snapshots. At this snapshot level, the user also has the option of assembling a sequence of available snapshots for the snapshot sequence, which may include also those from the grid network. The color transition frames are then created between the snapshots for the sequence between those snapshots.

Now with reference again to FIG. 19, the user starts a linkage or route either by creating a linkage or calling from storage a route, which comprises a segregatable portion of a collection of sequentially linked stations represented in an anchor pattern grid network. Stations may be deleted or generated and inserted in a stored route, and the links between the stations may be adopted, rearranged or newly created. A simple route is the link between two stations, and that route is simply designated by defining entry and exit stations.

The user can adjust the station settings for any station in the route. Each station has a setting for the number of frames in the incoming transition link from the previous station. The default number of frames is zero unless changed by the user. Also the station spread can be changed (155) for any station, as applied to the anchor groups of the incoming snapshot.

Any station may be made into a switching station, which has two types, namely one that introduces a new snapshot into the sequence to replace a previous snapshot or one which introduces changes in the order of the hues. Thus, for example, an object which was directly on one of the anchors may be moved off it to get another hue while still remaining in this anchor group, or an object may be changed from the clockwise side of the anchor to the counterclockwise side, or an object can be changed to another anchor group. All of these interactive steps are illustrated generally in the loop containing blocks 150 through 156.

In the further interactive loop of blocks 160 through 175, the user can adjust the transition between the stations in a number of ways. Accompanying each station after the first station chosen in a route is the defined incoming transition linkage between that station and the previous station. The default number of frames is zero. The transition can be left at the default setting of the Ostwald method applied to the entire snapshot. Furthermore, an equal value method can be used either for the entire snapshot or for individual objects in the snapshot in the loop starting at box 164. Either the Ostwald step (161) or equal value (162) or the pick-path routine (167) may be chosen for individual objects in the snapshot. The pick-path routine is limited to use only for individual objects in a snapshot. However, all the foregoing routines can treat each object in the image separately in the transition from one snapshot to the next, by identification of the object start and end colors, thus cumulatively addressing the image as a whole. In this respect the automatic mode moves in a continuous fashion. Each object then has its own continuous transition path from a start color to an end color.

At any time in the process the user has the option to view the effect of either the transition or the station settings at any station via the respective loop of blocks 177, 178, 176 and 179 to 181. When the user has arranged the route and all the stations to his satisfaction, the sequence can be sent to output block 181 and can be saved in-transit at block 180. A stored sequence can be used without any editing at all by simply dropping in a snapshot for processing into blocks 182, 161, and 176.

The procedure for creating and displaying a sequence of snapshots starts with an uncolored image template constituting a collection of objects, which has colors identified as the palette of the template. A snapshot then is each particular palette in a particular template, namely a particular coloring of each particular image object. Any number of palettes thus can be associated with a single template to form any number of colored images. These snapshots can be either autocolor snapshots or handcolor snapshots. The recall of any of these snapshots can be viewed and used to create a display sequence for dynamic changes in coloring of the image. The resulting sequences provide several kinds of results, such as processing different hues or values, or a template with an automated sequence of color changes attached. In a sequence, each frame defines a list of paired objects and colors fitting into a sequence of color changes. These sequential color change outputs are extendable to animation in the full sense of spacial motion of objects where location in the image can be changed. Thus, color change animation can be applied on top of object motion animation, even if created outside the autocolor method and imported.

For seamless smooth color changes, this invention makes feasible literally an almost infinite number of colors, so that the color changes are not jumpy and thus can go through as many interim frames as desired in the transition link between two snapshots. There is no theoretical limitation in the number of frames particularly since an unlimited set of travelers may be introduced for each of the 600 odd Ostwald color niches as suggested in FIG. 9. Therefore a true continuous display series of snapshots can be fashioned with whatever preciseness might be necessary, and the number of colors in a snapshot can be large, or conversely limited including the opportunity to confine color groups with spread dimensions. The continuous mode thus significantly enhances the process of sequencing snapshots to obtain smooth jumpless transition between snapshots otherwise presenting rather drastic color jumps or unnatural changes of coloring.

Consider two snapshots with the same template, the first in green colors and the second in magenta colors, as achieved by simple Ostwald rotation. A desired transition path from one to the other would go through green, greenish-yellow, yellow, yellow orange, orange, orange-red, red, red-magenta to magenta, or could have a transition path in the opposite direction about the color wheel through cyan. This is a true color change avoiding the conventional fading process where near complementary colors would fade through a visibly produced intermediate gray. The method of this invention thus goes through the sequence of hue changes without introducing unwanted grays. The desired image values may be retained as well, and thus pastel colors will go through pastel colors, etc.

Furthermore the sequencing is not always achieved by simple Ostwald rotation of the color wheel, since with multiple colors in a palette, some may rotate in unison in transition, some may stay the same, and several may rotate different amounts. And to complicate such color changes, some colors may go from shadow to brightness, whereas others may stay in shadow or brightness. The legibility of lettering also is a problem in the conventional fading procedures, and jumps in coloring could otherwise result with automatic substitutions of colors without creating smooth linkage paths from one snapshot to another. However, this method permits handling most of the required changes automatically to develop coordinated and seamless color transitions, even to the extent of including a constant legibility feature. See the exemplary sliders of FIG. 10 for example, where the associated variable magnitudes of value, contrast and legibility are available for automation in the present sequencing procedure.

In the sequencing procedure we can tell the color engine to create thirty frames between each of the snapshots (see FIG. 11). The pick-path procedure between two identified snapshots is achieved in the subroutine loop 167–171, where color transitions changes are available for objects, if desired, rather than the default procedure for the entire image. Then if the snapshots are displayed at thirty frames a second, a one second continuous transition may occur from one snapshot to the next. A transition between ten successive snapshots thus would occur in nine seconds, etc. If however, six intermediate frames are used, only one-fifth of a second is needed for each transition from one snapshot to the next.

The equal value subroutine loop 162–166 assures that the color transition is done according to the value dimensions of the start and end colors while changing the hues. Thus, two methods of transition are optional, the equal value procedure or the Ostwald hue change procedure shown in the subroutine loop 172–175.

There is also the option in the pick-path process where the user can manually pick a number of intervening colors for the object to pass through, not exceeding the number of frames which are being created in the transition between the snapshots. This method is specifically intended to reach colors not produced by the other methods. Thus, for example, consider a sequence where an object which is the pointed end of a hot iron sword is intensely heated very briefly. It might have a red start color and an orange end color, but could proceed through a bright yellow to a bright blue-white and back through yellow-white to orange in a brief pulse type transition spanning only a half second. Thus the pick-path process gives the user exact control over color transitions. In addition it can be used to generate continuously graduated blends through virtually any progression of colors while avoiding the grayish "fading" of previous art.

Figure 20:
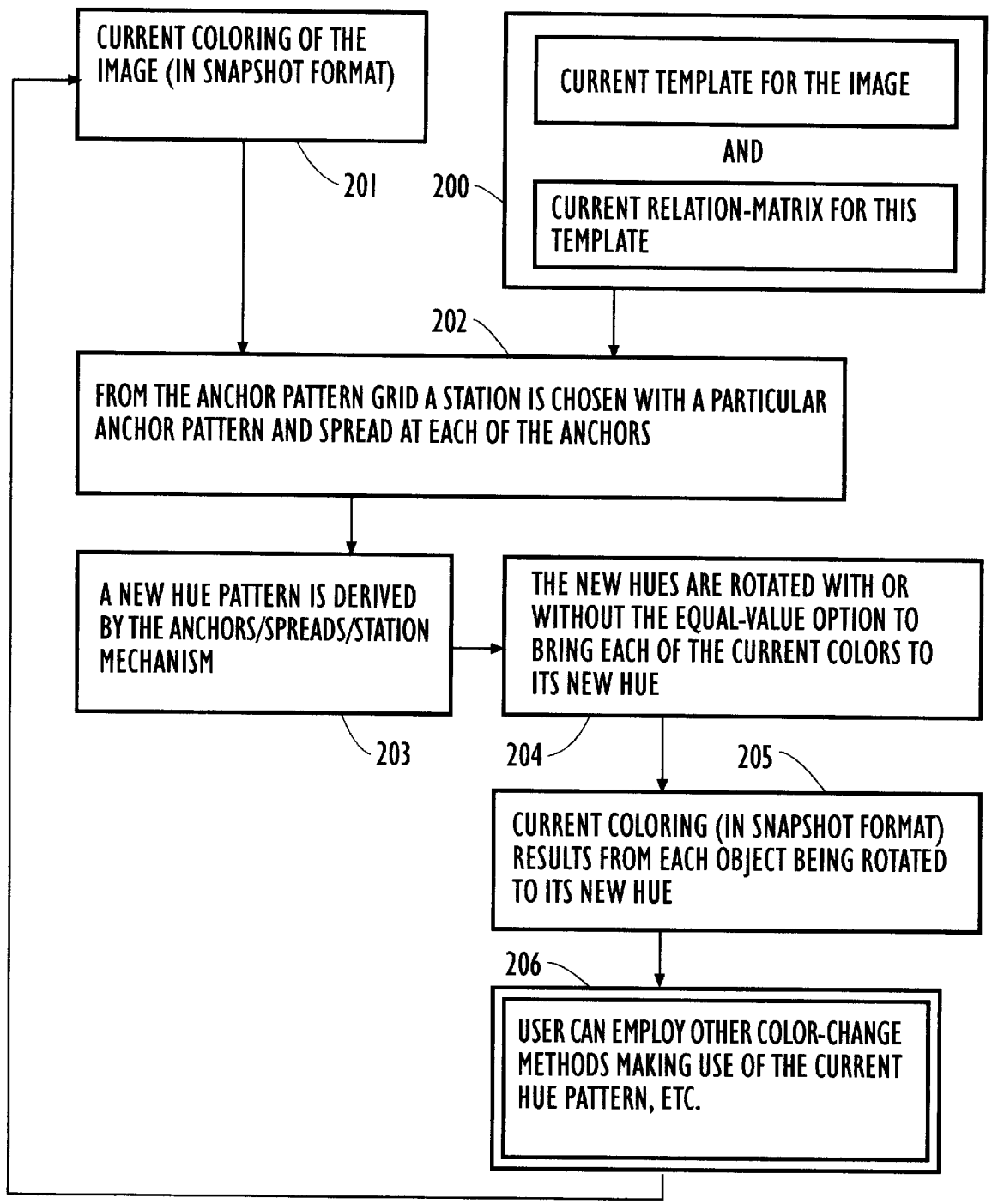
FIG. 20 is a functional block diagram illustrating automated processes for coloring images.

FIG. 20 exhibits the current coloring procedure with relationship to various of the automated color processing subroutines afforded by this invention. In general, the user may manually edit or create coloring of an image using the basic Ostwald color standards and the principle of rotation of color combinations to simultaneously change hues grouped in an image by the same number of Ostwald hue steps. However it is to be recognized that the automated features provided by use of the anchor notation with visible icons and processing techniques, such as spread, equal value, legibility control, and creation of transition sequences which may be implemented by interactive selection, are significant advances in the state of the art for simplifying user interaction.

Thus, to initiate current coloring of a live image, its framework, namely the template and current relation-matrix, is recalled as indicated at block 200. Every image in the automatic coloring procedure carries a particular template and that template has one relation-matrix or more-.; Only one template and a desired relation-matrix is live or current at any time and that is displayed as a snapshot image for current coloring or processing by the user. Thus, for the automated procedures illustrated here, the current template and its relation-matrix are connected to constitute live snapshot images. The processing color engine mechanism thus has access to the anchor group handles and other color and processing intelligence listed in the relation-matrix for undertaking corresponding automated subroutines.

The relation matrix has a different, separate listing for each of the anchor pattern levels, which in turn have different numbers of anchors. Thus among the different levels there is a different partitioning of the objects in the image into anchor groups and thus a different listing of what objects are in what anchor groups. For example, every object is in the same anchor group for anchor pattern level=1. If anchor pattern level=2 is identified then all objects are in either anchor group=1 or anchor group=2, and similarly up to four or more anchor pattern levels. Also the anchor pattern level may be left undefined, in which case the user cannot choose stations from an anchor pattern level grid. Every object in the template is termed a standard set and the template is made up of the standard sets. A standard set is simply a group of image elements which always get the same color.

The current coloring of block 201 confirms that the image for undergoing current processing is always in snapshot format. Such is a fundamental one of the color change mechanisms found in the complete color engine of this invention. The current coloring procedure provides visible hue pattern icons for observing a whole series of hue pattern changes that may be applied. Note that the anchor pattern grid shown in FIG. 4 can be modified to show the hue pattern which would result at every available station if the live image were moved to that station, and the anchor pattern grid shown in FIG. 7 can be modified to give a proportionate (area) display of the hue pattern which would result in the image at every available station if the live image were moved to that station, or can be modified to give a similar proportionate display of the actual colors which would result. Thus the user can see in advance what sort of coloring changes would result from entering any station or sequence of stations. The image itself maintains visual continuity as it changes from one coloring to another responding to the referenced changing of hues.

In block 202 the user chooses some station from some anchor pattern grid so that the settings of the chosen station are applied to the image by means of the anchors/spreads/station procedure encompassed in the comprehensive color change engine provided by this invention. This mechanism thus provides a new hue pattern for the image at block 203. The current hue of every object is thus known and identified—but the actual colors of the objects are not yet changed.

Accordingly the block 204 refers to the rotation by built in automation software to get the actual color for each object as a result of the current coloring changes adopted by the user. The rotation may be simply to change hues, but if the optional equal-value mode is selected, the rotation is accompanied by the value adjustments for retaining the specified value. Thus if the value of white is one, and the value of black is zero, then the value of any other color is the sum of the luminances of its RGB components, respectively multiplied by 0.30, 0.59 and 0.11, as factors representing the equal power luminance of the three phosphors in use. For other output mediums, various means can be used to find the value of each color, including the use of a spectrophotometer if necessary for any sort of output. Every standard color collection contains the values for every standard color so this data is always available.

Thus knowing the values of every color for every Ostwald location step, the basic point of equal value rotation is that instead of going to the Ostwald step location when a color is rotated to a new hue, it goes to a related color in which the value is the substantially same as the previous color, thereby resulting in equal value rotation. Thus, the new hue pattern of the image is put into effect in block 204, whether or not the optional equal value rotation feature is selected.

In block 205 the image now has a new current coloring in snapshot format. At block 206, the user can do a large variety of different things with this new current coloring. It can be saved, or another station from the anchor pattern grid may be selected for changing its hue pattern again. Also other color change methods can be used which can change the coloring of the image while making use of the objects' hues. The vary 8 technique may be employed for example at block 206.

Figure 21:
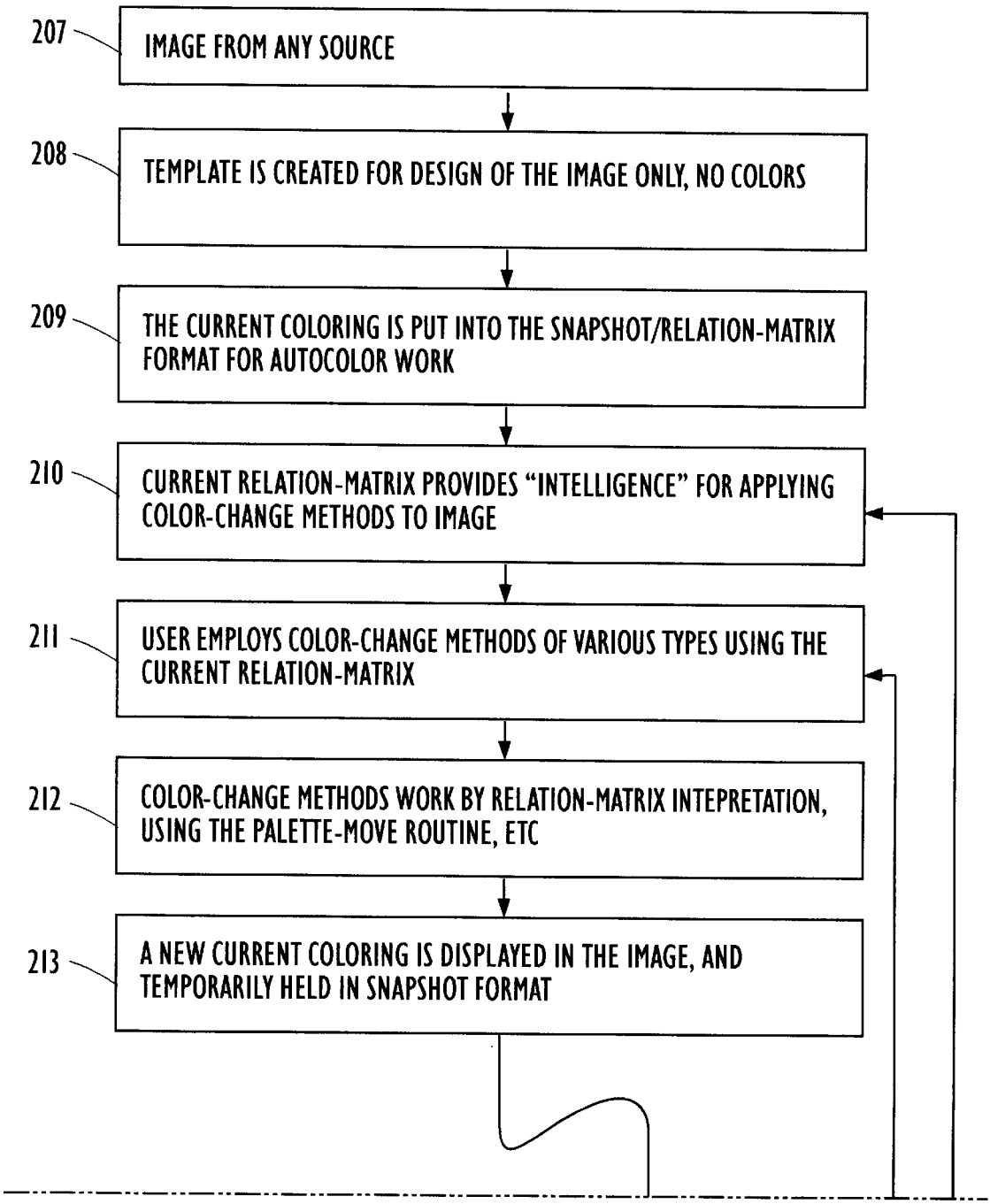
FIG. 21 is a functional block diagram outlining the functions and relationships of the template, snapshot and relation-matrix color notation employed by this invention.

In FIG. 21 the entry of an image for processing in the autocolor mode is outlined, showing the functional relationships of the template, snapshot and relation-matrix with the image and the automated color process of the coloring engine provided by this invention. Thus blocks 207–209 provide for putting a new image into the intelligence-providing format of the relation matrix in preparation for the image to undergo automated coloring subroutines of the nature set forth in blocks 211–220.

In the simplest case, the image at block 207 is a "vector" image made up of colored objects formed by bounded areas of color rather than being a "bitmapped" image of dot element coloring patterns, and the colors of the input image have been converted to the closest ones of the colors reproducible from the approximately six hundred Ostwald color samples. In cases where desired, by the adoption of travelers, any arbitrary colors and continuous bitmapped images can also be processed. Images usually are made up of several colored objects, some of which may be in different locations on the images and may have the same color or different colors. It may be assumed that the objects are on layers, which may have visibly overlapping objects, and that the layers are in front-to-back order with the lower layers usually not wholly visible. The size of the object is considered to be their visible area.

The objects in the incoming image are to be converted into standard sets, which are grouped collections of objects in their bounded areas and are identified in the relation-matrix for autocolor processing steps. The standard set is the smallest indivisible entity of the image. In the automated processes of this invention, the standard set consists of one object with one color, which object may be a single element or plural elements treated by the system as a single object. Thus the term object in this system is synonymous with a standard set.

At block 208 a template is created from the incoming image, which template comprises a colorless image of one or more objects. Thus the template is processed in a manner to retain the object intelligence in such a "colorless" format so that the coloring may be readily created or changed. The color intelligence is identified in the relation-matrix. The template then is used in the manner of a stencil with a set of holes for reproducing any desired color with a specified color of "paint". As illustrated in FIG. 12, the incoming image may be broken up into a number of different objects. However, for current live color processing in the automatic mode there is always at least one template displayed with its coloring and color relations defined in the relation-matrix intelligence.

The image as a whole may have defined several objects as different standard sets for different colors in the image. If the object is broken up into more than one color, then new standard sets are created for the additional or different colors and corresponding modified objects.

By internal naming convention, each of the standard sets is named. A change of name, which is a functional description, will identify a different template, which may identify a different foreground version of a formerly background object, for example.

In block 208 therefore the design is made up into standard sets, each of which has a unique name inside the particular template. However the name may be a standardized version in the general naming convention format used as applied internally to different templates. The name of each standard set gives functional information about each object in the design of the template. A default procedure is provided which creates standard sets automatically when a user brings a new image into the autocolor system, but the user may intervene if desired. In this respect a foreground/midground/background protocol is set up to provide the minimal basic intelligence information to process templates in the autocolor mode.

The information in the template as it leaves block 208 is typically: (a) membership in only one standard set for every element of the image, (b) a single current color for every standard set, (c) a name, and (d) the physical dimensions for each standard set and the percentage of the image area it visibly occupies-with provisions for overlapping objects. This is automatically measured in block 208 by built in autocolor subroutine programs.

Relations between standard sets may be created or destroyed in the color automation process, but the standard sets of the template do not change themselves in any way except in the color specified, which is achieved in block 209. For the automated procedure to identify the color an internal format for organizing the automatic color processing is required, which consists of three related items, namely: the palette the snapshot and the relation-matrix.

The relation matrix is the notational abstract format for holding all the relations in the image such as the color relations between standard sets. Thus either the user specifies or the automatic system makes its best guess what the anchors of the coloring are. One designated anchor is the central anchor (anchor1). The anchor groups in the anchor pattern then can be automatically established by the color engine. This puts each standard set into one of the anchor groups so that the entire template is divided up completely into anchor groups, which provides the basic information for automatic processing steps.

The snapshot contains more incidental facts. Thus, based upon the anchor groups established, the spreads for the anchor groups have to be defined either by the user or by default automated subroutines. Then a station in which an anchor pattern resides in an anchor pattern grid is selected as a current residence of the coloring, either by the user or a default automated subroutine. The anchor icon notation of FIGS. 3 to 6, thus provides a visual notation or format that permits the user to simply work within the anchor/anchor group/spread concept of processing colors. The user can alter the current residence by creating a different relation-matrix when desired. At this point, all the current hues of the image are concretely known and located in a notation and format that is simply automated for color processing in the system.

Other coloring characteristic notation is provided to show the value, the legibility (measured between the colors in two identified standard sets), focus conditions, contrast conditions, shadow group conditions and clusters, any of which may be optionally added to the bare basic relation-matrix essentials.

The actual colors are specified in a palette format, as part of the snapshot format, which contains the following information: (a) the central (anchor) hue, (b) the resident station and its anchor pattern grid, and (c) the spreads of the anchor groups.

Thus, the information that is necessary to work on current coloring of the image is provided by: (a) the template consisting of standard sets, (b) a relation-matrix created for holding the relations between the standard sets of this template, (c) a snapshot format holding all the rest of the information about the current coloring of the image including the palette information identifying the actual colors. Thus at block 210 the current image is fully integrated for use in the various automatic color processing steps provided in the system.

The original image is first organized into sets, the basic building blocks for the color engine, which sets form a template with a limited amount of image intelligence. Next the relation-matrix is created with enough information to tell the color engine how to handle the coloring of the template. This permits the use of automated subroutines for jumping around the anchor pattern grid, or manually using the legibility or contrast sliders, and provides a platform upon which to enter the current dimensions of the image including the current anchor pattern and legibility, either as specified by the user or as automatically provided by the color engine. The relations between the various coloring mechanisms is set forth in the relation-matrix rather than the particulars of the current coloring, which are found in the snapshot format.

The snapshot, a saved coloring of some template, holds the "shorthand" information necessary to recreate the coloring features that existed when this snapshot was created. It thus identifies the template with a pointer, as also the relation-matrix at the time the snapshot was saved, and holds particulars of the actual colors, namely: the palette, the residence station, the anchor pattern and spreads and spacers and the hue of the central anchor. These are changeable particulars directing how the specified features of the template and relation-matrix are to be fulfilled in the coloring process mutually performed by the user and the automated coloring system helpmate.

The snapshot therefore could be considered a photograph of both the actual coloring of the image at the moment together with a photograph of the processes for creation of this coloring. The snapshot itself is a saved coloring as distinguished from the snapshot format contained therein which is separable for functional interim use in the current coloring process steps desired, and may not necessarily be saved, but is rather temporarily stored for use during the current coloring procedure.

Thus block 210 represents the processing of the relation matrix data. At this block any current coloring of the template is identified together with the attendant relation matrix data for the newly created template image.

Figure 22:
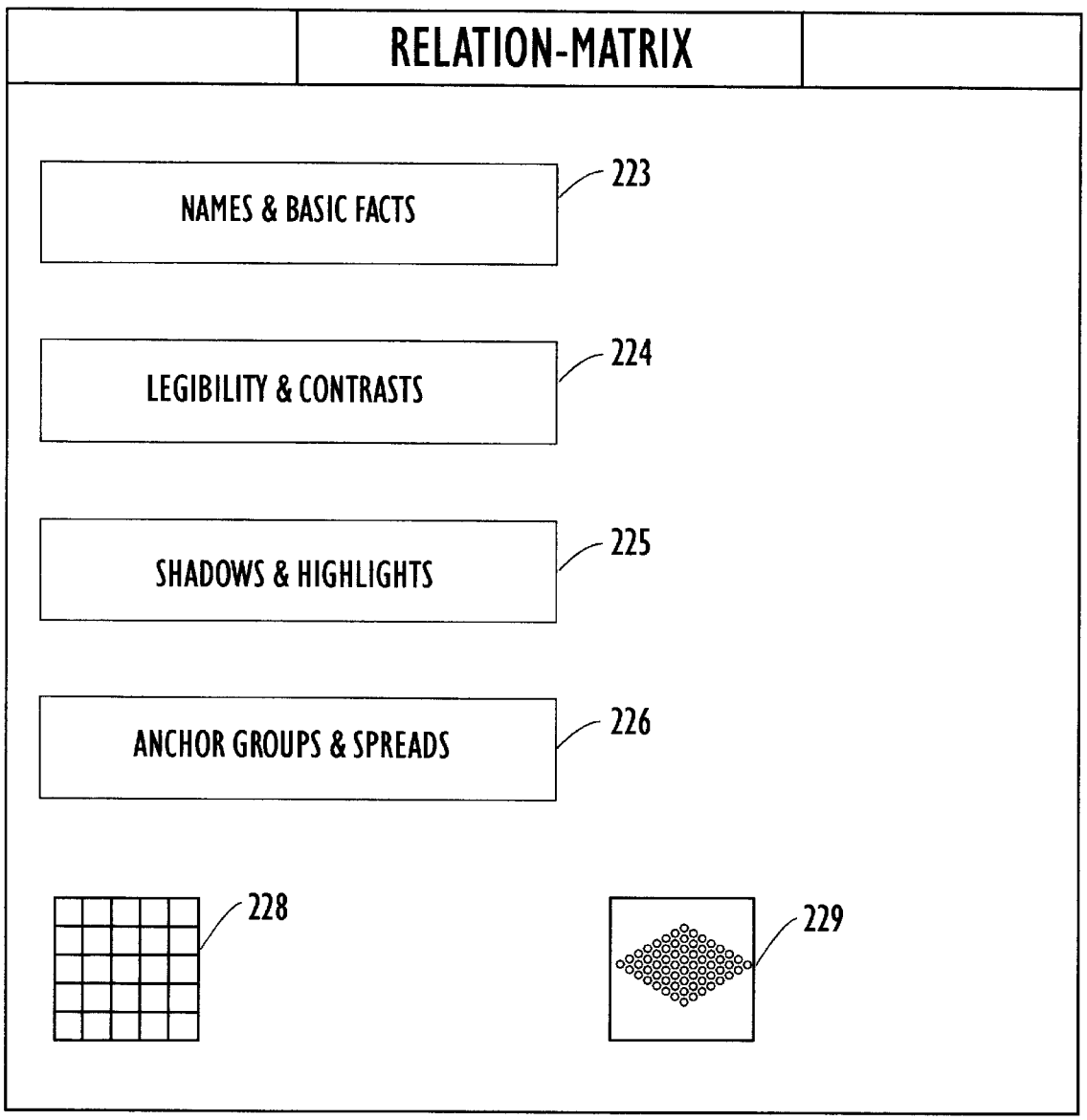
FIG. 22 shows a general relation matrix interaction window.
Figure 25:
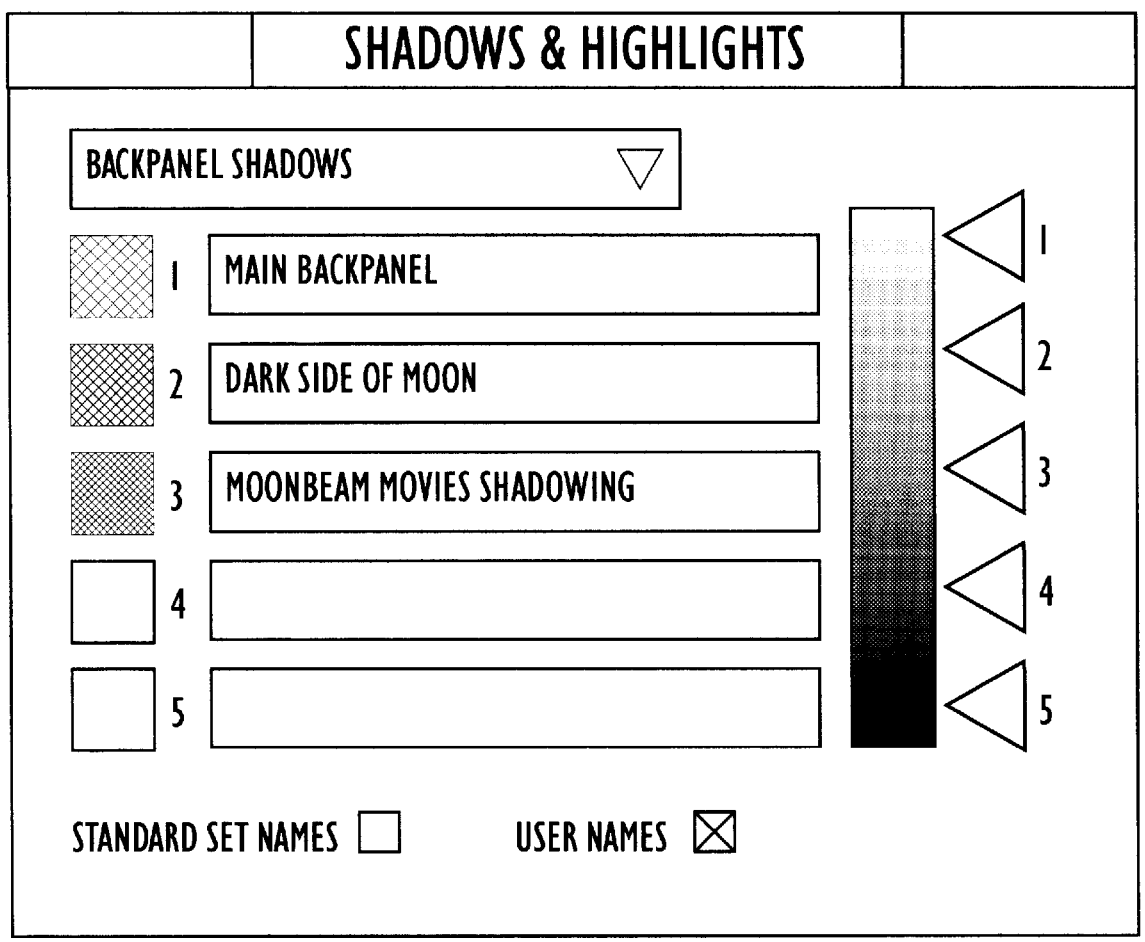
FIG. 25 shows a shadows and highlights interaction window.

FIGS. 22 to 27 present a series of typical relation matrix related computer windows for interfacing an operator with the novel automated coloring features provided by this invention and for further showing color processing system operation features and advantages of this invention in more detail. These representative windows implement the various operator choices and inputs surrounding the relation matrix intelligence and color change methods of block 210 and those following in FIG. 21. The primary window of FIG. 22 provides buttons for entry into different relation matrix features, for either viewing or rearrangement of color relationships.

Buttons 223, 224, 225, and 226 relate to and call up the corresponding windows of FIGS. 23–26 respectively, for instituting processing features discussed in connection with those respective figures. Button 228 calls up a color chips window for viewing the actual colors of all objects in the current image being processed. Button 229 calls up the color diamond window for relating and comparing the relationship of the image colors as seen in the color relations represented in the Ostwald notation standard. This is information exterior to the relation matrix itself, which is an expression identifying key properties of an image and corresponding storage locations, for purposes of initiating various automated program subroutines, and permitting the user to consider the coloring visually and to contemplate any coloring changes that might be desirable.

A typical relation matrix possible for a given template can contain optionally image intelligence of various sorts such as now briefly defined and illustrated by reference to FIG. 12 which identifies sixteen objects 64–79 in the representative image.

The naming convention for standard sets will include a number of slots in the name, most of which can be left unfilled, thus permitting the name to contain more or less information about the object. As a minimum the object's standard set name contains only two pieces of information, namely whether the object is in the fore mid, back or phantom position in the image (a), and its rank number for this position related to other objects in the same position (b). Optional slot choices available then giving further information are typically (c) through (f), as follows:

(c) lettering; data; accent; pattern; body; panel; edge; partial
(d) lettering head; lettering subhead; lettering text; lettering display; data bar; data pie; data line
(e) shadow; highlight;
(f) frozen A further piece of intelligence comprises an image category, which designates the functional sort of image being worked upon. Typical functional categories could be news, chart, artwork, illustration, etc. The FIG. 12 image could be categorized as an illustration.

The anchor groups are simply lists of related objects which permit objects of a template to be:.separately processed in various anchor pattern levels. In every relation matrix there is one anchor pattern level (AP level=1) which is that anchor group (AG=1) containing all the objects in the image (objects 64–79 in FIG. 12, for example). If no anchor pattern level is defined, there can be no jump to a station, which requires an anchor pattern level to be defined. Examples of four anchor pattern levels directed to the FIG. 12 image are as follows:

(1) APlevel=1 with only AG1 made up of all the objects 64–79;
(2) APlevel=2 has AG1 and AG2, where AG1 is made up of objects 70, 71, 73, 74 and AG2 is made up of objects 64–69, 72, and 75–79;
(3) APlevel=3 has AG1, AG2 and AG3 where AG1 is made up of objects 70, 71, 73, 74, AG2 is made up of objects 64, 69, 72, 75, 77, and AG3 is made up of objects 65–68, 76, 78, 79; and
(4) APlevel =4 has AG1–AG4 with AG1 made up of objects 60, 71, 73, 74; AG2 of 64, 49, 72, 75, 77; AG3 of 65–68 and 76; and AG4 of 78, 79.

The focal pair is a pair of objects designated to be the focus of the design, optional in a relation matrix. This and following relations apply to all APlevels, but the AGs are handled separately at the different APlevels. The focal pair is made up of objects 70, 71.

The legibility pair is a pair of objects whose relation is to be designated for legibility control. Thus four legibility pairs in the image may respectively be made up of objects 70, 71; 73, 69; 64, 65; and 78, 79.

A shadow group is an optional group of two or more objects in light-to-dark sequence which is designated for an ordered value relation at all APlevels. Two shadow groups may be made up respectively of objects 66, 67, 68 and 69, 72, 75.

A distinct contrast pair can be optionally designated, effective for all APlevels, for two objects that become more distinct as the contrast level is raised. Two such pairs may be made up of objects 76, 69 and 65, 69.

A fused contrast pair can be optionally designated, effective for all APlevels, for blending together with less distinctiveness as the contrast level is raised. Such a pair is made up of objects 73 and 69.

An image chunk is a portion of the image which is designated for processing as a group at all APlevels either separately or combined to make new images. Typical image chunks are made up of objects 64–68, 70–73, and 74–79.

Button 223 calls up the FIG. 23 names and basic facts window, which displays the basic facts relating to the current image and makes available both the visual anchor hues and the ability to see the actual colors of any objects with button 228, the relationship to the other colors in the color diamond with button 229 and other information such as the category and standard set names.

Button 224 of the relation matrix window in FIG. 22 calls up the legibility and contrasts window shown in FIG. 24. Button 225 similarly calls up the shadows and highlights window of FIG. 25, which visually displays hues, values and value rankings of the ranked objects. There can be more than one shadow group in the relation matrix. The backpanel shadows scanning button is used to call up a particular shadow group which the user wants to see, which could constitute a several page list accessible by the downwardly pointing arrow when desired.

The number of objects in any shadow group may vary, typically between two to five. The left hand boxes show the current color of each of the objects in the shadow group. The right hand triangles show the current hue of each of the objects in the shadow group, positioned along the gray scale showing relative values, with the object in position one being lighter than that in position two, etc. Other displays can show the arrangements in values or legibility, etc. The values of objects one to five are ordered and will retain this order when changes of color are made in the automatic color processing of this invention.

Figure 26:
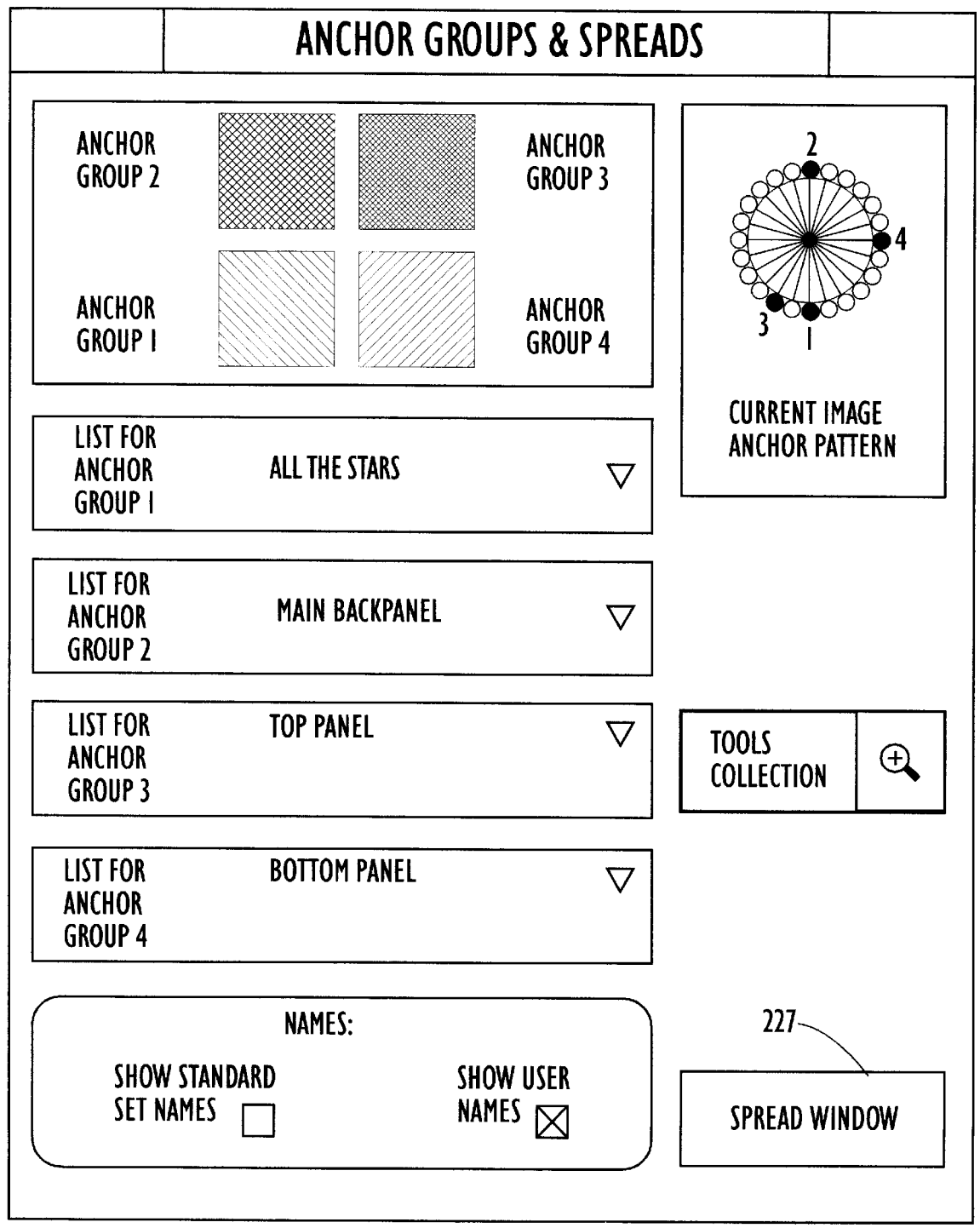
FIG. 26 shows an anchor groups and spreads interaction window.
Figure 27:
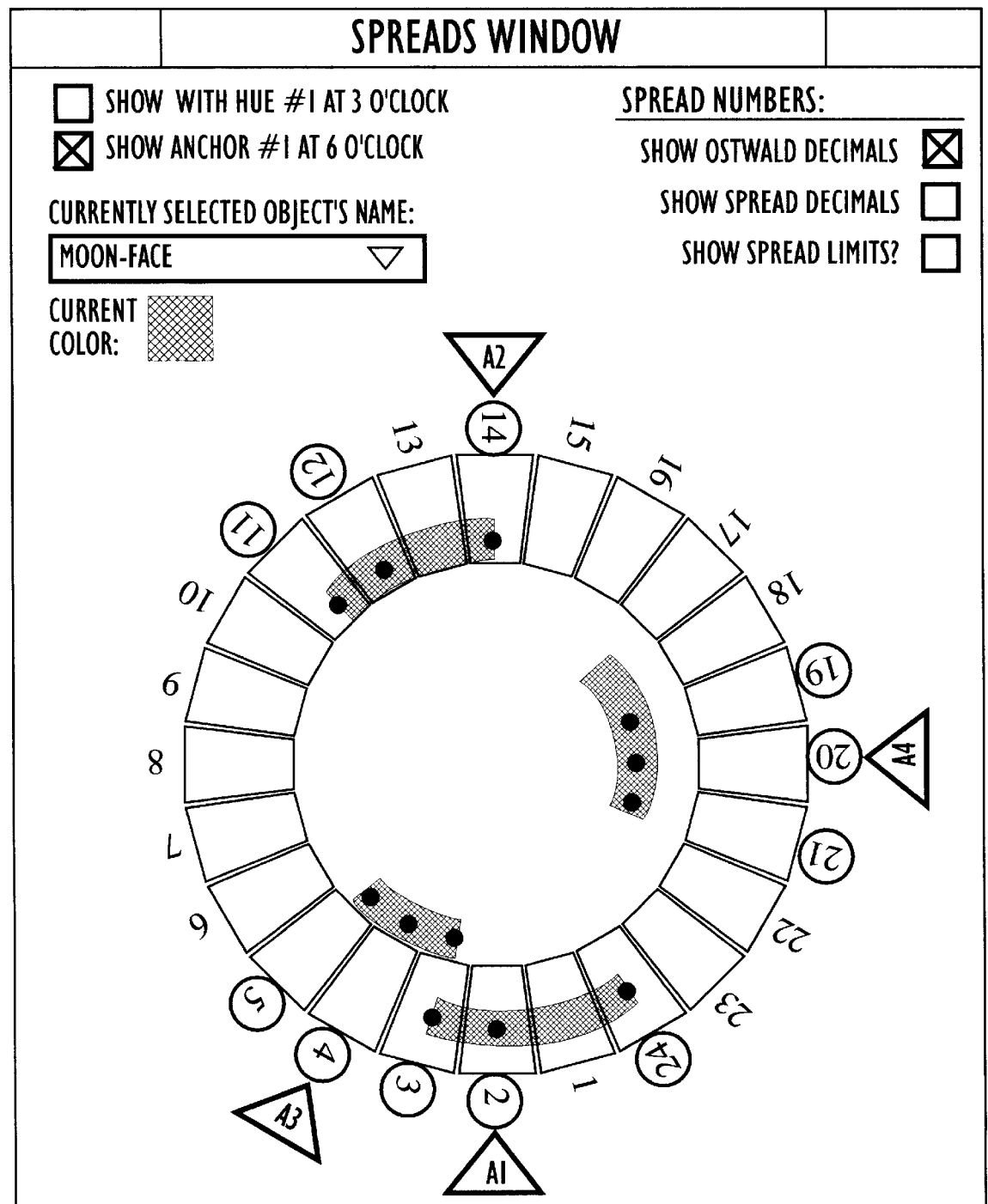
FIG. 27 shows a spreads interaction window.

The anchor groups and spreads button 226 of FIG. 22 calls up the window of FIG. 26 and button 227 thereon in turn calls up FIG. 27. In essence the system has to be concerned with four things when a snapshot gets moved to a new station, as follows: (1) Are there anchor groups defined for the anchor pattern level of the new station? (2) Assuming that the anchor groups are defined for this anchor pattern level, what is the effect of the station spread on the anchor groups, i.e., how do the objects of the image get spaced around their respective anchors? (3) How does the hue pattern get derived or finalized from this intermediary, internal spacing? (4) Does the user want to alter or see the internal mechanism used for this intermediary spacing?

Items (1) to (3) are performed by the internal processes providing results for the user to use. However, item (4) is the user interface region used for the user to see what is being processed. Thus, the anchor groups and spreads windows of FIGS. 26 and 27 provide the information that the user desires to view and alter. The interaction between anchor groups and station spreads is thus related to indicate spacers either constant or elastic may be employed in the automation process.

The anchor group has an anchor with its satellite hues, which are put in place by a subroutine which yields the hues. Thus the anchors of the image may index to new positions by rotating or shifting to the anchor spacing on the hue circle given by the anchor pattern of the station, as explained in connection with FIGS. 3–7. In this process each of the anchor groups in the image follows its anchor. An anchor group is made up of a collection of objects in the image which may be assigned different hues.

The station spread when incorporated at any anchor in the station's anchor pattern affects the spread of each anchor group's hues in the image around its anchor. Thus the hues in the image and the hue pattern are derived as a result of the anchor pattern of the station, the anchor groups of the incoming image and the station spread designated for each of its anchor groups. The mechanism yields new satellite hues as its last step, using other pieces in the process.

Before being moved to a new station every snapshot starts with some current coloring, and has a relation matrix in effect which lists its anchor groups for different anchor pattern levels, and the central anchor is the anchor for anchor group-1.

Not all anchor pattern levels are necessarily defined. Thus anchor pattern level 4 may be defined without levels 2 and 3, thus telling the machine how to react in level 4. Thus if a user only wants to work at one anchor pattern level this is possible, without requiring the image to be defined at all levels.

The user picks a new station by clicking on another station in the anchor pattern grid (FIG. 7). If the image is going to some anchor pattern with a different anchor pattern level, the relation matrix is addressed to see if anchor groups are defined for this level. If not then the user can work at the current anchor pattern level or objects can be selected for creating new listings for changing the anchor groups to the new anchor pattern level.

The index anchor-1 remains in its current location in the hue circle when the other anchors move to new locations with a change in the anchor pattern. The anchor pattern is derived by the spacing of the anchor groups around this index anchor-1.

As seen in the anchor groups-and spreads window of FIG. 26, the four representative anchor hues for the four anchor groups are displayed and the listing of objects for the four groups can be scanned and viewed. Also the anchor pattern image is shown, without the spreads and this also shows the hue pattern. The spreads can be investigated by button 227, as referenced in the spreads window of FIG. 27.

In this comprehensive hue wheel notation, the anchors A1 to A4 are shown by triangles. The active satellite hues are shown by circled hue step numbers, which as a whole constitutes the "hue pattern". Now let every hue be further defined by a hue step plus decimal digits. Thus, hue 11 could be designated 11.5, hue 4 as 4.5, etc. This gives a continuum of hues within the Ostwald steps both for spacers and anchors. This hue step is rounded down to the basic hue step as indicated at the hue wheel icon level.

Now there are spacers, both constant and elastic, as shown on the expanded hue steps linearly shown for the anchor groups A1 to A4. These spaces are shown with their decimal suffix, where each Ostwald step thus accommodates a continuous range of hues with corresponding locations along the steps, thus encompassing a substantially continuous hue spectrum in the Ostwald 24-step circle.

Spacers connect objects to hues. Every object in the image is attached to only one spacer but the spacer can have any number of objects attached to it. Thus spacers comprise an intermediate link between the objects and the hues.

The hue that the object gets depends upon the location of the spacer for that object—namely where that spacer winds up on the hue circle either clockwise or counterclockwise of the anchor. Thus, the spacers are an internal mechanism that control the satellite hues in each of the anchor groups. There are two types of spacers, each of which serves to relate each of the objects in an image to its anchor group. Constant spacers signify a constant distance away from an anchor, either CW or CCW, while elastic spacers signify proportionate spread distances. Thus constant spacers are immune to the effects of station spread, ignoring such spreads.

The proportionate distance of an elastic spacer is derived as a decimal value falling between zero and one. Thus, "one" unit is the spread distance allotted by the station on either side (clockwise or counterclockwise) of the anchor's spread. Thus if an anchor (A) had an anchor group consisting of two objects whose satellite hues were to be spaced symmetrically on the clockwise and counterclockwise sides of the anchor hue, and with each satellite hue intended to be at the proportionate midway point relative to the limit of the clockwise and counterclockwise spread, then we could symbolize this anchor group's spacing as (−1, −0.5, A, 0.5, 1). With such decimal notation a pure proportionate notation for distances on either side of the anchor in a spread is provided. With this concept and notation therefore, a single abstract spread notation is provided which can be expanded or contracted in terms of actual hues. Thus when Ostwald hues are rounded down, two satellite hues may get squeezed into the same single Ostwald step, or stretched out across four steps instead of one, etc. It is this proportionate spacing that is the main mechanism that lets the user jump from station to station without problems. The constant spacers, however, are not affected by the spreads of the station and thereby let an object's satellite hue stay a fixed distance away from its anchor. Thus the relative location of a constant spacer is given in fixed Ostwald step decimals (clockwise or counterclockwise) rather than purely proportionate spread decimals.

Now with specific reference to the spreads window of FIG. 27, the terminology for constant, elastic, and decimals is understood. From before we have learned that the anchor A1 (index hue) is traditionally in the six-O'clock position, as is shown on the color wheel displayed in the window. All the anchors are shown by the triangle convention, and the spreads and hues for each anchor group are spanned over the shown arcs, with the hues represented as dots and the arc span as halftone dotting. For example the anchor A4 has a spread from Ostwald step 18 through 19, 20 and 21, which has three hues located respectively at steps 19, 20 and 21, etc. These are shown at the bottom of the figure for anchor group A4 visually in color with the decimal remainders showing the positions in the Ostwald steps as requisitioned at the upper right cornerblock entitled "show Ostwald decimals". The elastic spacers are shown as triangles under the hue lines, and constant spacers are shown as circles above the hue lines as in the case of A1, where constant spacers are located on both sides of the anchor A1, etc.

If "elastic" is turned off then every spacer behaves like a constant spacer and station spreads will have no effect on any spacer when "elastic" is off. Thus all anchors go to the new station with no change in distance of satellite hues from the anchor. If elastic is turned on, then the constant spacers behave the same way but the elastic spacers will maintain the proportionate spacing for the resulting hues in the image as defined by the station spreads. There need not be an elastic spacer at the limits of the spread, which is given by the station. In any event, the elastic spacers get compressed or expanded within the spread limits.

The current coloring and saved snapshots use both the proportionate spread decimals and the Ostwald step decimals so that the actual exact hue locations of the anchors and spacers and limits of the spreads are known, but any snapshot or current coloring can also be manipulated as an abstract anchor pattern, which can jump from station to station. At any station the hue pattern is changed while in residence at that station by receiving the anchor pattern and spreads of that station to view or adopt, but the proportionate spread decimals remain the same unless altered by the user directly moving a spacer or by the action of a switching station.

Each of the anchor groups A1 to A4 is related to the corresponding objects in the template by the spacers of the anchor group, spaced from the anchor to define a spread pattern for the satellite hues distributed about the anchor hue. These spacers serve as a computer mechanism for controlling the spreads of the satellite hues in the respective color groups. Both constant and elastic spacers are identified. Accordingly, arbitrary combinations of satellite hues may be arranged proportionately within a group spread pattern defined by the spacers on respective sides of the anchor, which is retained as a matter of indexing and identification of the anchor group pattern in accordance with the autocolor processing procedures of the color engine. As seen by the decimal point notation and positioning of the respective hues within the Ostwald steps, the respective hues are notationally identified in the relation matrix identification tag for each of the hues displayed about the hue wheel by the Ostwald hue step integer plus a decimal increment of the hue position within that step. The combined mechanism of anchor groups, spacers, station anchor pattern and station spreads all contribute to the position where each spacer is finally located, and defined by shorthand in Ostwald hue notation.

The user through this spreads window of FIG. 27 may change or create colors at any station or can create a new station, which most probably will change hues and current coloring, and will create changes in the relation matrix. This gets us to blocks 211 and 212 of FIG. 21 where the relation matrix procedure may be employed to make various kinds of color changes before deciding on the current coloring to hold in snapshot format (block 214). This snapshot may be saved at block 215 directly through block 215 or with alterations at block 216 through any of the methods of blocks 217 using vary 8, special methods (block 218) user directed methods such as exhibited by jumping to different stations at block 221 and checking for errors at block 220. Or alternatively the current coloring can be recycled through the loop by returning from block 216 to block 211. If the coloring is altered by the vary 8 routine in block 217 or by the special methods in block 218, then a current relation matrix is created again at block 210.

Figure 28:
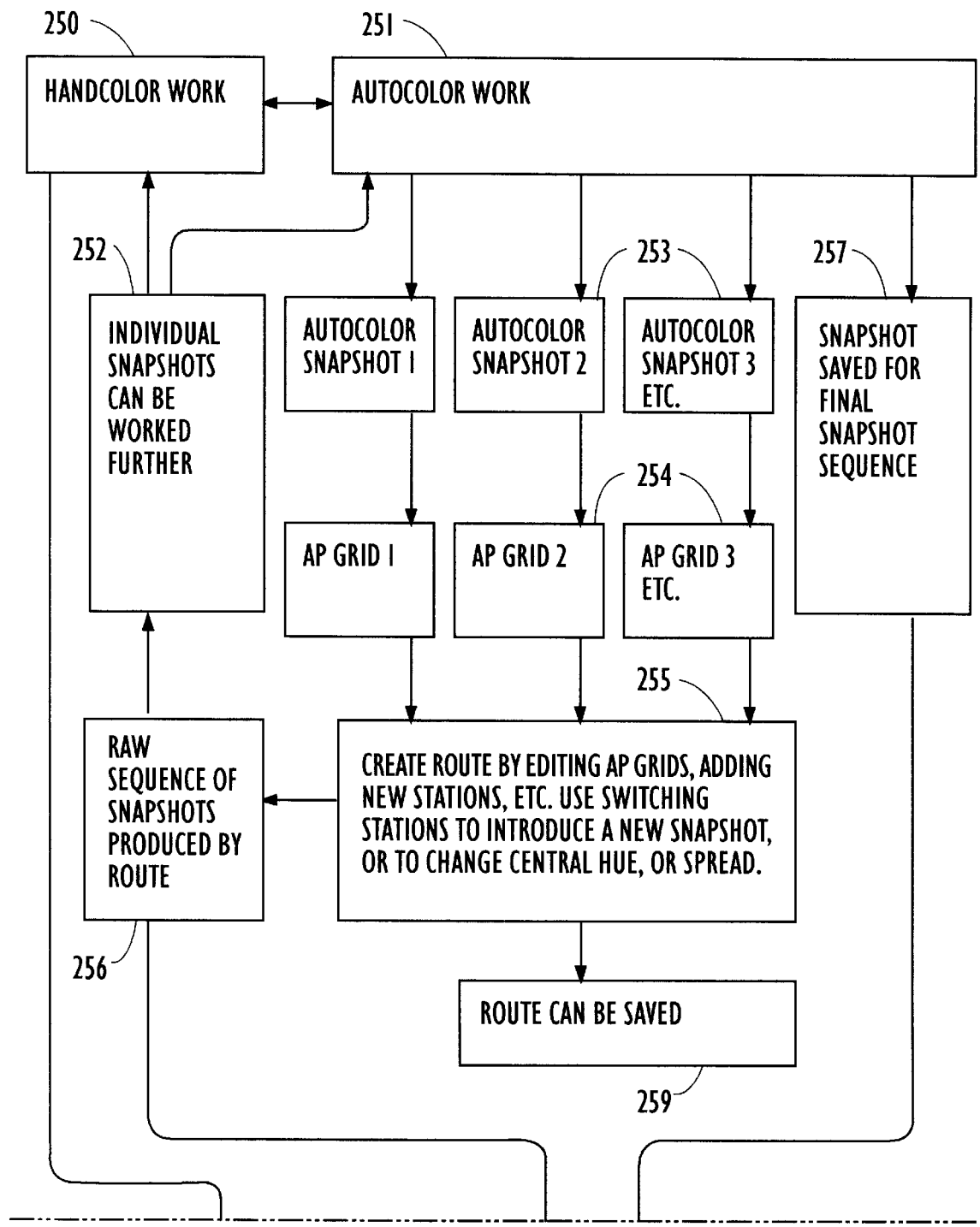
FIG. 28 is a block diagram showing various ways of putting together snapshot sequences.

As may be seen from the block diagram in FIG. 28, which details the operation of block 97' of FIG. 15, there are various ways in which snapshots may be created, both by handcolor work 250 and autocolor work 251. The user can put together a sequence of snapshots from autocolor work provided the snapshots in the sequence each have the same objects. Individual snapshots are recycled back to either autocolor 251 or handcolor 250 for further work as indicated by box 252.

Snapshots 1, 2, 3, etc. at 253 may be taken from different anchor pattern grids 254 and then combined and assembled at 255, saving the route at 259, which refers to new stations where necessary. Then a sequence of raw snapshots 256 is rerouted via block 252 for further processing and saving at 257 for assembling a final sequence at 258. The final sequence, saved at 261, may be assembled from handwork colored snapshots from block 260, or from the raw sequence of snapshots from block 256 or those saved from autocolor via block 257.

Transitions (40, FIGS. 4, 5, 7) between snapshots are created, if desired, at block 262 and saved at block 263 to produce the continuous color change sequence at block 264. The continuous change is done strictly by going from object to object from a start color to an ending color without reference to the relation matrix. Thus the continuous color change works with any sort of snapshots, in any order, so long as these snapshots have the same objects, even if derived from mixed parentage in different anchor pattern grids, and even if some snapshots are autocolor snapshots while others are handcolor snapshots. The sequences can be saved at 261 directly.

All the transition storage paths can be stored at 263 as separate entities. For example, the stored hot poker color change impulse series of coloring functions could be used in a different image for a color transition, such as when a space ship is hit with a radiation shot in a computer game. It is significant that the color changes are implemented abstractly with reference to a selected image and its subdivided objects, thereby to very simply computerize the entire coloring process of this invention. In this respect the stored color changes from past procedures can become universal tools for any image or object.

The snapshot sequence window of FIG. 29 relates to features described in the pick-path color change of FIG. 11 and the functional block diagrams of FIGS. 19 and 28, now set forth more explicitly. The window of FIG. 29 permits the creation of continuous color sequences either by a route or grid or by a snapshot sequence assembled from single snapshots. In the route or grid sequencing, the color engine automatically creates the sequence from snapshot to snapshot now to be set forth in generally the same manner that snapshots for the sequence are created or selected individually and assembled.

Thus by way of items 307–310 the user has a choice to assemble a snapshot sequence, route or grid. If a route is chosen at 309, then the work center 301 is activated for the current route segment between two stations displayed at 302, 303, and the respective spread windows (FIG. 27) are opened for the respective stations by button 304 or/and 305, as desired. Box 311 shows the current transition being worked on (number 28) in the sequence and permits active selection of any transition snapshot in the sequence. Button 322 can be used to process the entire route automatically, without user transition decisions.

Items 302, 303 are reference anchor patterns for the current stations in the route, permitting the user to evaluate changes between the anchor patterns. Buttons 304 and 305 permit the user to rearrange the spacers. The hues in the anchor groups may be edited by employing the rotation feature by grabbing the central anchor (1). The button for the creation of a switching station at 306 enables the user to incorporate various kinds of alterations in a sequential linkage, including introduction of stored snapshots, changing the placement of spacers, automatic rotation of the central anchor, changes in membership of anchor groups, etc.

Items 312–315 permit the user to interactively control the transition. Thus, item 312 controls the number of frames (15) for the current transition. Item 313 will permit the transition to apply to either the entire snapshot or a single object, such as in a sequence for ripening cherries or heating a poker to white heat. However, for every transition from one snapshot to another, every object in the image will require its method of color change to be specified, but of course some objects can be left frozen so that only part of the image changes color.

Item 314 permits choice of equal value to be applied to the entire snapshot or to every transition in the entire continuous color sequence provided button 322 is activated. Item 313 will permit a single object to be processed for equal value in current transitions.

Button 315 opens the pick-path window (FIG. 11) so that the pick-path procedure is chosen for inserting a single transition into a single object between two consecutive snapshots. The single object is chosen by way of items 316, 317 and 318 from stored data. Similarly the object can be chosen by directly picking the object from a snapshot 319 or 320. The transition may be viewed by actuating button 321.

Figure 30:
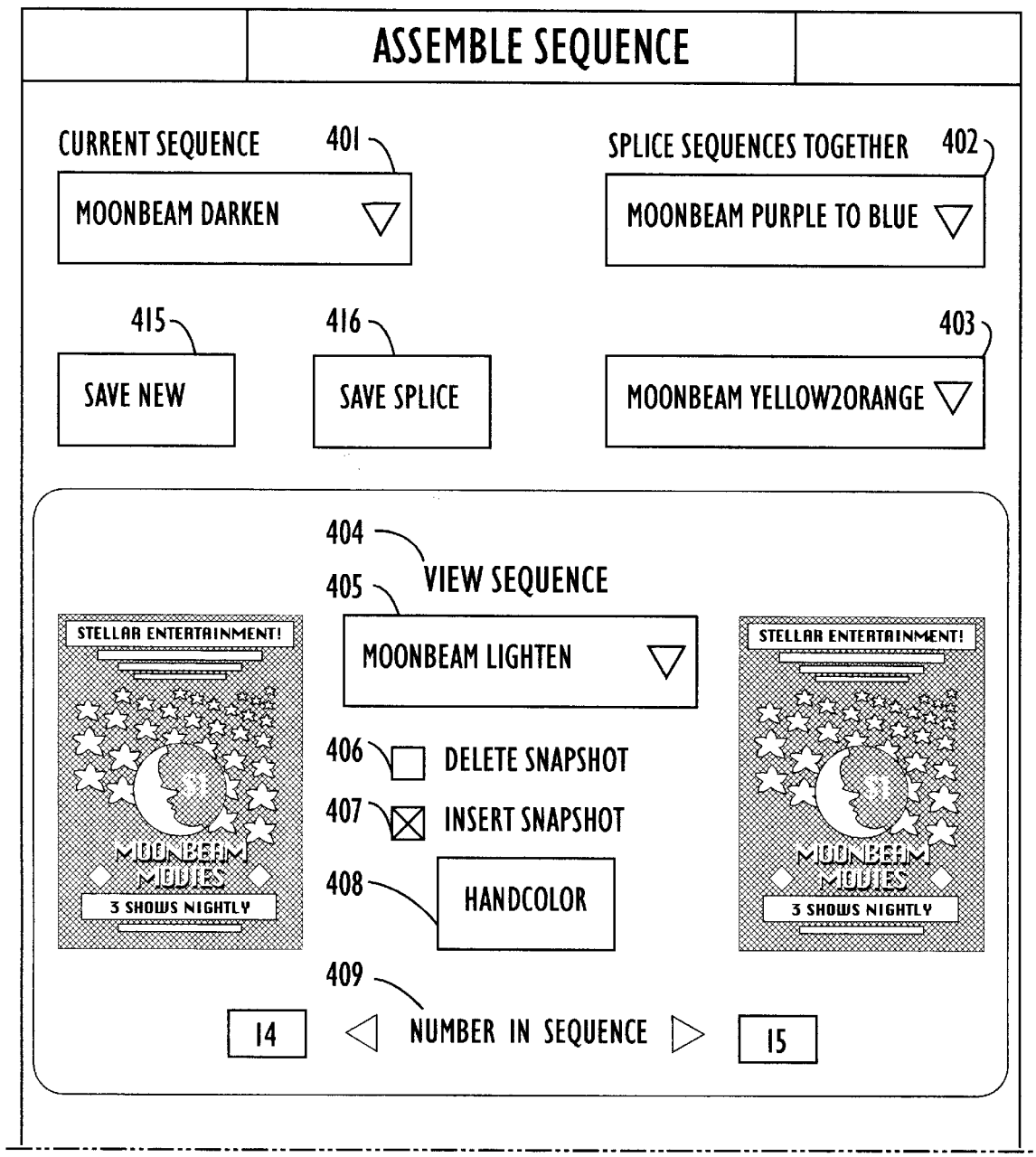
FIG. 30 shows an assemble sequence interaction window.

Now by actuating button 307, the assemble sequence window of FIG. 30 is presented. Any sequences assembled in the FIG. 30 window are stored for processing at the snapshot sequence window 308 of FIG. 29, such as for creating a continuous color change. Starting with any saved snapshot at item 401, a new sequence may be started for saving at button 415 with a new name written in item 401.

Two saved sequences can be recalled at boxes 402 and 403 for splicing and saving at button 416. The view sequence item 404 is a collection of features 405–409 used to view and alter existing sequences selected at button 405. The handcolor button 408 accesses the coloring method of FIG. 8 in an auxiliary window. Item 409 permits the user to see any consecutive snapshots of the current live sequence. Any saved snapshot whether handcolor or autocolor can be found and saved by way of items 410–413. Button 414 creates a one-to-one linkage for the colored transition by establishing two paired objects into two consecutive snapshots.

In FIG. 31 the color computer 500 with accompanying software 501 processes color interactively by way of keyboard/mouse 502 and reproduces colors and color images on the color monitor screen 503 or the color printer 504. Color standardization is achieved in accordance with this invention by storage in memory 505 of several standard collections of color samples 506 including the standard collections 507, 508 for the respective color gamuts of the color monitor 503 and printer 504. Other color collections can provide recipes relating to other color reproducing devices, systems, media or pigments, for example As before explained, the operating system accordingly processes standardized colors and color images with the foregoing Ostwald type color niches which define proportionately spaced color sample units relating to the various color gamut recipes. Thus, color distortions are eliminated by establishing proportionate spacing of colors in color standard collections being processed. Otherwise color distortions are produced because different color gamuts would tend to disproportionately space some of the colors being processed and identified in the computer system. In operation for purposes of coloring images, processing colors, and storing colors therefore the color sample collections provide proportionately spaced colors referenced for processing by reference to Ostwald type color samples providing color divisions such as: Ostwald hues (1–24), Ostwald colors for each hue (1–28), Travelers for each color (1–n). This permits reproduction of a comprehensive range of colors over a substantially continuous spectrum. For reproduction of a color or colored image by the monitor or printer, the color notation would be the corresponding recipe of .XXG, .YYR, .ZZG for example for display on the color monitor 503 and .aaC, .bbM, .ccY, .ddK for printout on the printer 504.

Thus the present invention encompasses a basic color operating system and accompanying processing techniques in which color changes may be interactively viewed, created and selectively automated from stored routines over the entire continuous color gamut where colors include brightness values as well as hues. The user can effectively and efficiently process automatic color changes without the likelihood of operator induced judgments and errors by concentration upon the creativity and evaluation of viewed color snapshots rather than upon the details of going through tedious color change routines.

Those novel features of the invention which are indicative of its spirit and nature are therefore set forth with particularity in the following claims.

I claim:

1. The method of processing the colors of color images in a computer system, comprising the steps of:

compiling and storing a first color collection having designated colors systematically arranged by a spaced set of hue pattern within a first color gamut having individual colors defined by hue and black-white content, said collection being capable of establishing recipes for creating a set of spaced colors within said first color gamut, reproducing and displaying said set of spaced colors within said particular color gamut upon a color image producing monitor of the computer system for viewing and processing color images, processing and storing colored images in the computer system by reference to a set of spaced color samples within said first color gamut, and reproducing colored images formed of a set of related spaced color samples processed in the computer system for a designated image reproduction system operable within a different color gamut with a second related spaced set of hue pattern corresponding to the set of color samples reproducible within the different color gamut.

2. The method of claim 1 further comprising the step of: defining and processing a combination of color samples in said sets by changing hue, black-white content and value constituents of both individual color samples and sets of samples as a whole.

3. The method of claim 2 wherein the processing and storing step further comprises the value control step of: changing at least one color of said set of color samples in said color image to another color while retaining the overall image value substantially constant.

4. The method of claim 1 further comprising the steps of:
formulating a colored image with lettering displayed legibly by two different colors, changing at least one of said two different colors of the image, and maintaining the lettering legibility substantially constant in the colors changed.

5. The method of claim 1 further comprising the steps of: formulating icon representations of selected said color images being processed in said computer system, and dispaying different multi-color image patterns in an anchor icon pattern referenced visibly and indexed for selection and processing in the computer by a single designated anchor hue handle identified in said anchor icon pattern.

6. The method of claim 1 wherein the step of processing and storing colored images further comprises the steps of: displaying color controls in abstract anchor patterns in icon format for selected images, and changing the colors of a selected image being processed in icon format by en masse substitution of a different coloring pattern displayed in icon format.

7. The method of claim 6 wherein the step of changing the colors further comprises:
substituting the colors of the image being processed automatically by designating a selected icon identifying colors to be replaced in the image via an automated subroutine.

8. The method of claim 1 wherein the step of processing color images further comprises the steps of:
creating at least one grouping of a combination of image colors by visual reference to corresponding hues located in a hue group with satellite hues spaced about a designated control hue in the group,
designating a spread dimension for proportionately spacing at least a selected part of the satellite hues within a limited span of a hue spectrum,
substituting corresponding groups of satellite hues relating to different image colors for said hue group, and
processing the substituted hue groups with the selected satellite hues residing within said spread dimension.

9. The method of claim 8 further comprising the steps of: visually displaying a said hue group on an anchor pattern icon relative to a hue spectrum and identifying for the displayed hue group a spread indicia dimension referenced to a limited span range of the hue spectrum.

10. The method of claim 1 wherein the step of processing color images further comprises the steps of:
processing a sequence of colored images for portraying dynamic color changes,
designating two differently colored images in said sequence, and
creating a linkage between the designated two images comprising a plurality of linkage frames for incrementally changing image coloring.

11. The method of claim 10 further comprising the steps of storing the plurality of linkage frames, and implementing an automatic computer subroutine for producing the linkage frames for changing colors between other sets of differently colored images.

12. The method of claim 1 further comprising the steps of: defining snapshot images for color processing in said computer system with two separate computer processable identification formats respectively comprising an object identification template, and a color processing intelligence template indexed by a designated hue for setting forth color characteristics of a particular coloring of a defined snapshot image.

13. The method of claim 12 further comprising the steps of:
formulating a plurality of colored images from the same object identification template, each of the images being referenced to a separate color processing intelligence template, thereby defining a set of different respective colored images.

14. The method of claim 12 further comprising the steps of:
separating the image defined object-identification template into separate separately processible, portions and producing separate intelligence related to the separate portions for defining colored images of selected colors for selected ones of the separate portions.

15. The method of claim 14 further comprising the step of:
identifying a colored image having more than one color with the object-identification and color templates by combining intelligence for separate portions into a multiple colored single image.

16. The method of claim 12 further comprising the steps of:
visually displaying for comparison at least two colored images formulated from a common object-identification template with different colorings identified by different intelligence formats, on corresponding color templates, selecting one of the colored images as a current live image for processing in the computer system, and implementing an automatic computer subroutine for substituting the coloring of a selected one of the color templates different colorings for the coloring of the live image.

17. The method of claim 12 further comprising the steps of changing color patterns of the images en masse by reference to stored snapshot images.

18. The method of claim 12 further comprising the step of controlling color by varying in the snapshot images, at least a portion of a set of related hues to change the visible contrast between selected image colors identified by the set of related hues.

19. The method of claim 1 further comprising the steps of arranging said one set of spaced color samples for selected ones of the processed color images by displaying corresponding hues in a hue spectrum simulation comprising a wheel icon format, visually displaying within the wheel the set of colors from the selected color images being processed by a geometric pattern designating the referenced hues on the wheel format for the colors in the spaced set of color samples, rotating by an interactively selectable automated computer subroutine the geometric pattern about the wheel format thereby producing in the image being processed a corresponding change of colors to a new set of referenced hues relatively spaced the same distances apart about the hue wheel, identifying the new set of hues by a single reference control hue as a handle, transferring the new set of referenced hues en masse for further color processing by reference to said handle, and storing the new set of reference hues as an anchor group in a designated storage location for retrieval and further color processing therewith.

20. The method of claim 19 further comprising the step of:
interactively implementing an automatic computer subroutine for maintaining color value for at least one color of the image constant while rotating the colors about the wheel format.

21. The method of claim 19 wherein the image contains lettering defined by two different colors further comprising the step of interactively implementing an automatic computer subroutine for maintaining a legibility contrast of lettering by the two different colors constant while rotating the colors about the wheel format.

22. The method of processing colors of color images as defined in claim 1 further comprising the steps of,
additionally compiling and storing several standard color collections each having designated color sets systematically arranged by hue within a respective color gamut,
reproducing and displaying on the computer selected images referenced to a selected one of the standard color collections with said selected images comprising a selected set of colors arranged by hue to represent a respective first color gamut of the selected color collection,
proportionately arranging a corresponding set of colors arranged by hue to represent the selected set of colors in the computer,
reproducing corresponding selected color images within the first color gamut of the computer system, and
processing the selected color sets in the computer proportionately by the arranged hues to fall within a different color gamut of a further standard color collection to produce corresponding color images.

23. The method of claim 1 wherein the step of processing and storing color images further comprises the steps of:
storing combinations of image colors of selected color images in a gamut being processed, said combinations being individually referenced to a designated control hue identifying a plurality of color samples of corresponding images for inclusion in respective volumes comprising a plurality of satellite hues spaced about the designated control hue, and
creating a set of reference frames between two selected color images to produce a dynamic color change sequence between the two designated images incorporating transition image colors into said set of reference frames.

24. The method of claim 1 further comprising the step of processing changes of color of at least some of the colors in a sample color set selected by reference to a single hue in the in the sample color set as an index instruction handle.

25. The interactive method of processing colors in a color computer system for producing coloring changes in selected images comprising the steps of: visually referencing colors in an image color pattern in an icon anchor pattern format positioning hues of the image colors in ordered positions on a visual simulated hue spectrum, and replacing en-masse the hues in the icon anchor pattern format with a different hue pattern corresponding to designated coloring changes in said images being processed in said color computer system.

26. The method of claim 25 further comprising the steps of:
assembling a grouping of viewable icons displaying recognizable color patterns in said icon anchor pattern format for identifying and comparing different color patterns, and
providing a subroutine for automatically replacing image colors of a selected icon pattern with the colors of a different selected one of the assembled icons to substitute replacement colors in said selected icon pattern.

27. The method of claim 25 further comprising the steps of:
displaying at least two color groups of image colors in hue group patterns arranged on the simulated hue spectrum,
selecting and marking an anchor hue about which satellite hues are arranged in each group pattern for identification of that color group, and
substituting a different set of satellite hues in at least one of the color groups.

28. The method of claim 27 further comprising the steps of:
defining relative to at least one hue group location visible limits encompassing a limited hue spectrum spread zone in which the satellite hues are confined, and
instituting a computer subroutine for rearranging a substituted set of hues to adopt the spread dimension.

29. The method of claim 28 providing an interactive computer subroutine for instituting the rearrangement of hues comprising the steps of:
defining color in the respective color groups by a spacer dimension for controlling hue locations in one of said spread zones, and rearranging hues entering a spread zone in response to implementation of the spacer dimension.

30. The method of claim 25 further comprising the steps of selecting and displaying a plurality of said icon patterns identifying different image colorings in a gridwork comprising a network of interlinked stations, and
providing an automated computerized subroutine for changing colors of a live image being processed to a modified color pattern identified by image coloring of a designated station in the network.

31. The method defined in claim 30 further comprising the steps of:
developing linkages between said stations in said network by establishing and storing a series of intermediate colored transition frames, and
providing an automated computerized subroutine for designating a stored linkage to produce a transition series of colored frames between two designated images in a sequence of images.

32. The method defined in claim 25 further comprising the steps of:
displaying the simulated hue spectrum in a color wheel format, identifying a colored image within the color wheel as a geometric pattern designating a group of hues located about the color wheel, and instituting an automatic computer subroutine for substituting new colors into the colored image identified by a different set of hues encountered upon rotation of the geometric pattern about the wheel.

33. A computer system for coloring, storing and displaying colored images, comprising in combination:
means for storage and display of at least one collection set of colors within a predetermined first color gamut for coloring and reproducing color images,
means for presenting in said computer system a color relationship for said color images represented by an ordered set of hues representing a set of color samples for producing said color images with the hues for the color samples being located in a predetermined hue pattern spaced within said color gamut;
means for presenting color images on a visual monitor screen of said computer system for coloring of images with said color relationship using visual color samples arranged in a corresponding visually ordered set of hues, said computer system comprising an operating system responsive to said first color gamut for coloring images and storing colored images with image coloring being identified by said set of color samples, and means for reproducing the stored images in a different color gamut by adoption of a corresponding set of color samples having a related ordered set of spaced hues in the different color gamut for related display of the color images in a visual format.

34. The computer system of claim 33 further comprising:

means for displaying said color samples of an image on said monitor screen in an icon pattern represented by said ordered set of spaced hues arranged about a wheel with at least representative hues disposed in a pattern representing image colors extending from substantially the pure hue toward both black and white, and means for visually presenting different combinations of the color samples of a set being processed by a geometric pattern rotatable around said wheel to identify different selectable ordered arrays of corresponding spaced hues located about said wheel.

35. The computer system of claim 33, further comprising means for processing at least some colors in said set of color samples of the predetermined color gamut arranged into a sub-family pattern of traveler colors identified by a spaced range of hues with a single hue reference handle, and means for referencing, identifying and visibly locating the sub-family in an ordered color space relationship with reference to hues and to the individual sample colors of said pattern.

36. The computer system of claim 33 further comprising:

means for establishing and maintaining a designated value for the color samples, and operating means for maintaining value of a colored image constant during color changes in the image.

37. The computer system of claim 33 further comprising:

means for displaying lettering in an image produced by contrast of two image colors with a designated legibility level, and accompanying operating means for maintaining that designated legibility level constant when either one of said two image colors is changed.

38. The computer system of claim 33 further comprising; means for visually displaying at least one stored colored image in an anchor pattern icon format including an anchor index hue referenced as a hue pattern derived from the colored image colors having hues positioned in visibly simulated hue spectrum positions.

39. The computer system of claim 38 further comprising means for visually displaying on said icon a group of colors for an image located with corresponding hues confined within a designated spread portion of said hue spectrum, and means for changing one group of image colors in an image being colored to a newly entered group of different colors and modifying the entering group of colors by expanding or condensing the corresponding hues of the entering colorings in a spectrum range fitting into said spread portion of the hue spectrum.

40. The computer system of claim 33 further comprising:

means for displaying on said monitor a plurality of differently colored images of a selected visual pattern, means for designating one of the colored images as a current live image subject to interactive changes of coloring, means for automatically making interactive changes of color in the live image in the plurality of images simultaneously, and means for substituting the colors of any selected one of the differently colored images for those in the live image.

41. The interactive coloring method for operation of a color computer system for processing interactive color changes in a live colored image as defined in claim 33 comprising the steps of:

displaying the selected live colored image on a computer monitor screen for visual reference while being colored interactively, presenting a plurality of differently colored auxiliary versions of the selected image on the monitor screen for comparative viewing, making interactive color changes on all the viewed images simutaneously, and providing an automated computer subroutine for substituting interactively the coloring of a selected auxiliary version of the image for the live image.

42. The computer system of claim 33, wherein continous color change is achieved by a continuous color change progressively changing between two reference hues derived from anchor patterns, further comprising means for dynamically changing color of one image in a sequence of images by traversing selectively through an intermediate set of image frames one-by-one from one reference hue to the next, whereby a substantially continuous color change path of color samples is produced for processing and displaying color images over dynamic color changes between the two reference hues.

43. The computer system of claim 33, wherein the colors of an image are progressively changed at a selected rate over a color change path that traverses intermediate color samples to produce a desired dynamic color change effect, with overall image color value being maintained constant.

44. The computer system of claim 33, further comprising means for processing a sequence of colored images positioned between two differently colored stored images by incrementally changing image coloring over a series of frames interspersed between the two colored images.

* * * * *